United States Patent
Tanigawa

(10) Patent No.: US 10,266,260 B2
(45) Date of Patent: Apr. 23, 2019

(54) REMOTE-OPERATED WORKING DEVICE AND CONTROL METHOD

(71) Applicant: Panasonic Intellectual Property Corporation of America, Torrance, CA (US)

(72) Inventor: Toru Tanigawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 117 days.

(21) Appl. No.: 15/183,810

(22) Filed: Jun. 16, 2016

(65) Prior Publication Data

US 2016/0378105 A1  Dec. 29, 2016

(30) Foreign Application Priority Data

Jun. 25, 2015 (JP) ................................ 2015-127709
Feb. 26, 2016 (JP) ................................ 2016-035647

(51) Int. Cl.
*B64C 39/02* (2006.01)
*B64D 47/08* (2006.01)
(Continued)

(52) U.S. Cl.
CPC .............. *B64C 39/024* (2013.01); *B08B 3/02* (2013.01); *B08B 5/04* (2013.01); *B08B 13/00* (2013.01); *B25J 11/0085* (2013.01); *B64D 47/08* (2013.01); *E04G 23/002* (2013.01); *G05D 1/005* (2013.01); *G05D 1/0016* (2013.01); *A47L 2201/00* (2013.01); *A47L 2201/04* (2013.01); *B64C 2201/027* (2013.01); *B64C 2201/12* (2013.01); *B64C 2201/123* (2013.01); *B64C 2201/146* (2013.01); *G05D 2201/0203* (2013.01); *H04N 5/23245* (2013.01); *H04N 5/23293* (2013.01); *H04N 5/247* (2013.01); *H04N 5/33* (2013.01)

(58) Field of Classification Search
CPC ........ G05D 1/005; G05D 1/0016; B08B 5/04; B08B 3/02; B08B 13/00; B25J 11/0085; E04G 23/002; B64D 47/08; B64C 39/024
See application file for complete search history.

(56) References Cited

U.S. PATENT DOCUMENTS

| 8,299,905 B2 * | 10/2012 | King ...................... G05D 1/005 340/407.1 |
| 2002/0142701 A1 * | 10/2002 | Rosenberg ............. G05D 1/005 446/454 |

(Continued)

FOREIGN PATENT DOCUMENTS

| JP | 5-038683 | 2/1993 |
| JP | 6-343581 | 12/1994 |

*Primary Examiner* — Dale W Hilgendorf
(74) *Attorney, Agent, or Firm* — Greenblum & Bernstein, P.L.C.

(57) ABSTRACT

A remote-operated working device includes a movement controller that controls movement of the remote-operated working device; a working unit that performs a predetermined work on the work target; a first detector that detects contact between the working unit and the target; and a communicator that transmits a signal for vibrating the remote control to the remote control in a case where contact between the working unit and the work target is detected by the first detector.

18 Claims, 33 Drawing Sheets

(51) Int. Cl.
  *B08B 13/00* (2006.01)
  *B25J 11/00* (2006.01)
  *E04G 23/00* (2006.01)
  *G05D 1/00* (2006.01)
  *B08B 3/02* (2006.01)
  *B08B 5/04* (2006.01)
  *H04N 5/247* (2006.01)
  *H04N 5/33* (2006.01)
  *H04N 5/232* (2006.01)

(56) References Cited

U.S. PATENT DOCUMENTS

| | | | |
|---|---|---|---|
| 2010/0041991 A1* | 2/2010 | Roundhill | A61B 8/4281 |
| | | | 600/443 |
| 2011/0295427 A1* | 12/2011 | Motzer et al. | B25J 9/162 |
| | | | 700/258 |
| 2014/0035736 A1* | 2/2014 | Weddle et al. | G05D 1/005 |
| | | | 340/407.2 |

* cited by examiner

FIG. 37
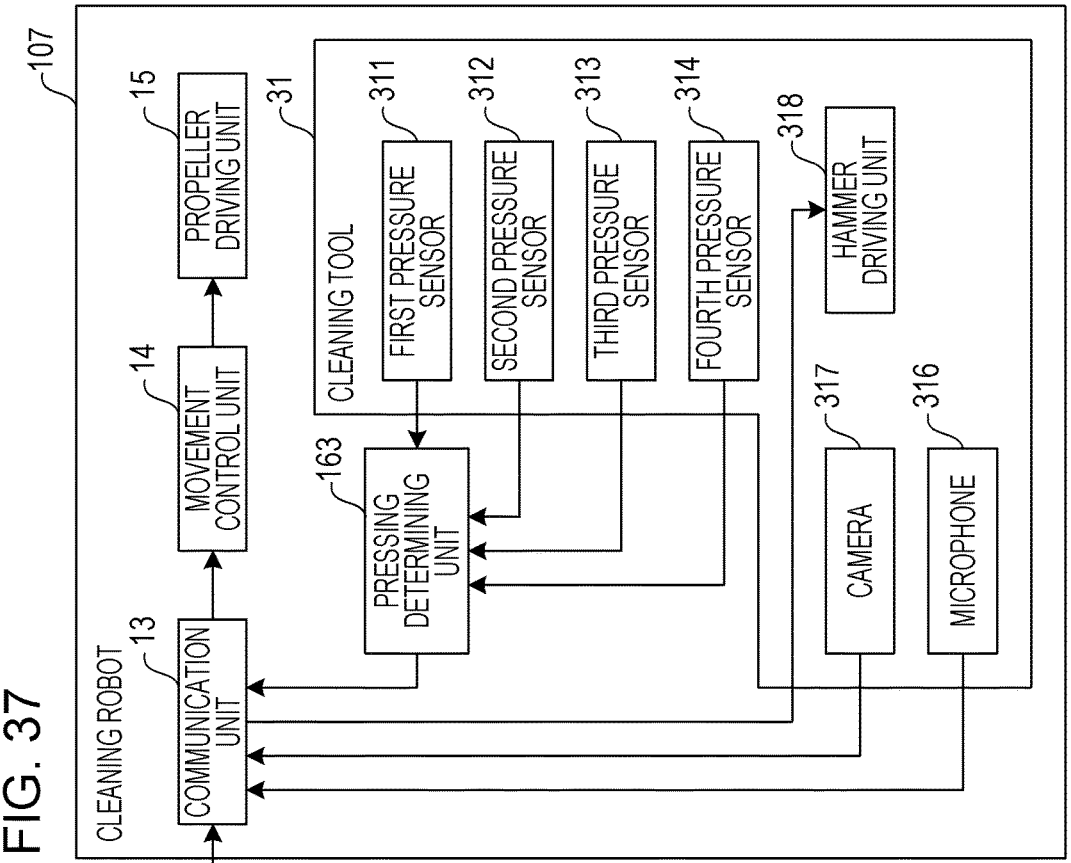
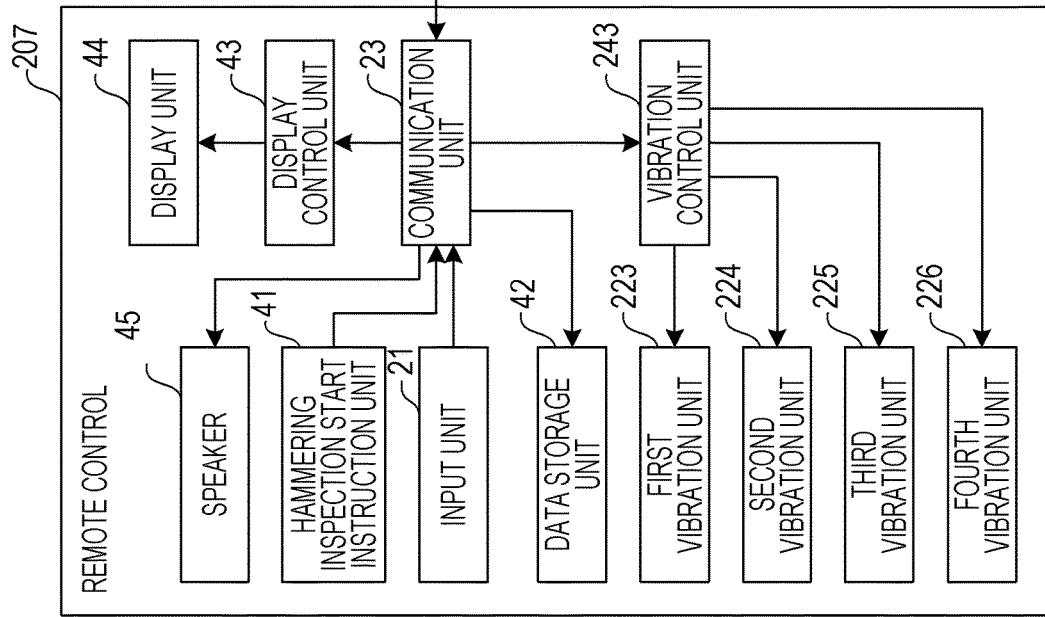

REMOTE-OPERATED WORKING DEVICE AND CONTROL METHOD

BACKGROUND

1. Technical Field

The present disclosure relates to a remote-operated working device that is remotely operated by a remote control and performs a predetermined work on a work target that is in a remote place and a control method for controlling the remote-operated working device.

2. Description of the Related Art

Conventionally, it is very difficult to clean a place (e.g., an exterior wall and windows of a building) that is beyond human's reach and to inspect aging of a bridge or a tunnel. For example, Japanese Unexamined Patent Application Publication No. 6-343581 discloses a high-place cleaning remote-controlled robot that includes a cleaning box including a guide rail fixed to a building, a platform main body that moves along the guide rail, a stretchable bar linked to the platform main body, a monitoring camera that is fixed to an end of the bar and takes an image of a cleaning surface, a cleaning tool, a hand to which the tool is attached, and a remote control unit; and a handy remote control operator that controls movement of the cleaning box and cleaning of a target surface while looking at the image taken by the monitoring camera.

According to this conventional high-place cleaning remote-controlled robot, movement of the cleaning box and cleaning of the target surface are remotely controlled. This makes it possible to replace an outdoor risky operation with an indoor safe and reliable operation.

SUMMARY

In one general aspect, the techniques disclosed here feature a remote-operated working device including: a movement controller that controls movement of the remote-operated working device remotely operated by a remote control; a working unit that performs a predetermined work on the work target in a remote place; a first detector that detects contact between the working unit and the work target; and a communicator that transmits a signal for vibrating the remote control to the remote control in a case where contact between the working unit and the work target is detected by the first detector.

According to the present disclosure, in a case where contact between a working unit and a work target is detected, a signal for vibrating a remote control is transmitted to the remote control, and the remote control thus vibrates. It is therefore possible to notify an operator of contact between the working unit and the work target with certainty.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 37 is a block diagram illustrating a configuration of an inspection system according to Embodiment 7 of the present disclosure;

DETAILED DESCRIPTION

Figure 1:
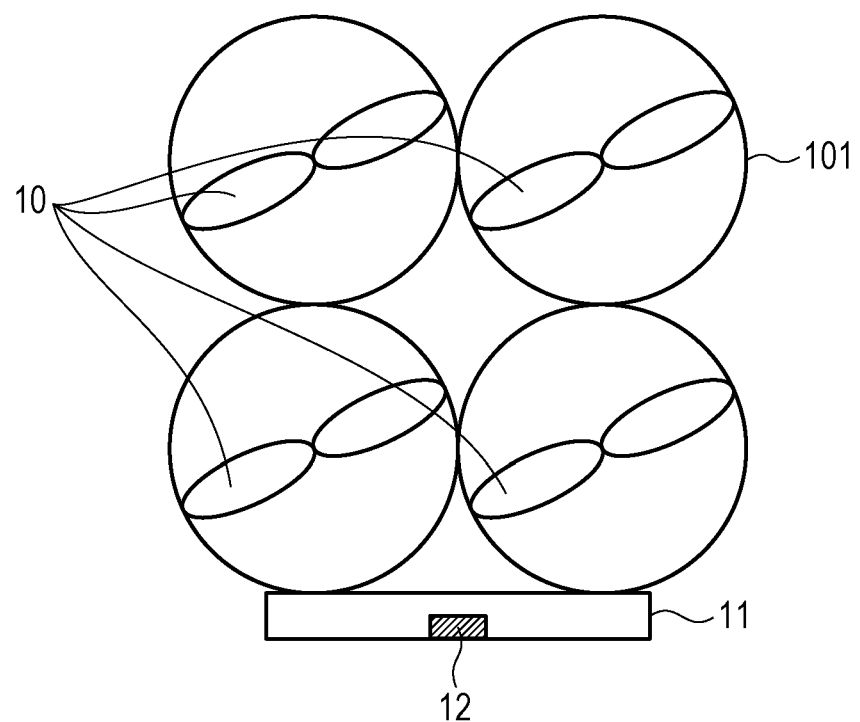
FIG. 1 is a top view illustrating an exterior configuration of a cleaning robot according to Embodiment 1 of the present disclosure.

According to the conventional high-place cleaning remote-controlled robot, an image of the surface to be cleaned can be taken by the monitoring camera, but it is difficult to determine whether or not the cleaning tool is pressed against the surface to be cleaned with certainty, and therefore an operator cannot be notified of contact of the cleaning tool with the target to be cleaned with certainty.

The present disclosure was accomplished to solve the above problems, and provides a remote-operated working device and a control method that can notify an operator of contact between a working unit and a work target with certainty.

A remote-operated working device according to one aspect of the present disclosure is a remote-operated working device including: a movement controller that controls movement of the remote-operated working device remotely operated by a remote control; a working unit that performs a predetermined work on the work target in a remote place; a first detector that detects contact between the working unit and the work target; and a communicator that transmits a signal for vibrating the remote control to the remote control in a case where contact between the working unit and the work target is detected by the first detector.

According to the arrangement, the movement controller controls movement of the remote-operated working device. The working unit performs a predetermined work on the work target in a remote place. Contact between the working unit and the work target is detected. In a case where contact between the working unit and the work target is detected, a signal for vibrating the remote control is transmitted to the remote control.

Since a signal for vibrating the remote control is transmitted to the remote control and the remote control thus vibrates in a case where contact between the working unit and the work target is detected, an operator can be notified of contact between the working unit and the work target with certainty.

The remote-operated working device may be arranged such that the first detector includes a first sensor that detects contact between a right portion of the working unit and the work target and a second sensor that detects contact between a left portion of the working unit and the work target; and the communicator transmits a first signal for vibrating a right side of the remote control to the remote control in a case where contact between the right portion of the working unit and the work target is detected by the first sensor, and the communicator transmits a second signal for vibrating a left side of the remote control to the remote control in a case where contact between the left portion of the working unit and the work target is detected by the second sensor.

According to the arrangement, the first sensor detects contact between the right portion of the working unit and the work target. The second sensor detects contact between the left portion of the working unit and the work target. In a case where contact between the right portion of the working unit and the work target is detected by the first sensor, a first signal for vibrating the right side of the remote control is transmitted to the remote control. In a case where contact between the left portion of the working unit and the work target is detected by the second sensor, a second signal for vibrating the left side of the remote control is transmitted to the remote control.

Since the position of the working unit that is in contact with the work target and the position of vibration of the remote control are associated with each other, it is possible to easily confirm whether the right portion or the left portion of the working unit is in contact with the work target.

The remote-operated working device may be arranged such that the first detector includes a first sensor that detects contact between an upper right portion of the working unit and the work target, a second sensor that detects contact between a lower right portion of the working unit and the work target, a third sensor that detects contact between an upper left portion of the working unit and the work target, and a fourth sensor that detects contact between a lower left portion of the working unit and the work target; and the communicator transmits a first signal for vibrating an upper right side of the remote control to the remote control in a case where contact between the upper right portion of the working unit and the work target is detected by the first sensor, the communicator transmits a second signal for vibrating a lower right side of the remote control to the remote control in a case where contact between the lower right portion of the working unit and the work target is detected by the second sensor, the communicator transmits a third signal for vibrating an upper left side of the remote control to the remote control in a case where contact between the upper left portion of the working unit and the work target is detected by the third sensor, and the communicator transmits a fourth signal for vibrating a lower left side of the remote control to the remote control in a case where contact between the lower left portion of the working unit and the work target is detected by the fourth sensor.

According to the arrangement, the first sensor detects contact between the upper right portion of the working unit and the work target. The second sensor detects contact between the lower right portion of the working unit and the work target. The third sensor detects contact between the upper left portion of the working unit and the work target. The fourth sensor detects contact between the lower left portion of the working unit and the work target. In a case where contact between the upper right portion of the working unit and the work target is detected by the first sensor, a first signal for vibrating the upper right side of the remote control is transmitted to the remote control. In a case where contact between the lower right portion of the working unit and the work target is detected by the second sensor, a second signal for vibrating the lower right side of the remote control is transmitted to the remote control. In a case where contact between the upper left portion of the working unit and the work target is detected by the third sensor, a third signal for vibrating the upper left side of the remote control is transmitted to the remote control. In a case where contact between the lower left portion of the working unit and the work target is detected by the fourth sensor, a fourth signal for vibrating the lower left side of the remote control is transmitted to the remote control.

Since the position of the working unit that is in contact with the work target and the position of vibration of the remote control are associated with each other, it is possible to easily confirm whether the upper right portion, the lower right portion, the upper left portion, or the lower left portion of the working unit is in contact with the work target.

The remote-operated working device may be arranged such that the first detector includes a first sensor that detects contact between a first contact position on a contact surface of the working unit with the work target and the work target and a second sensor that detects contact between a second contact position on the contact surface that is different from the first contact position and the work target; and the communicator transmits a signal for vibrating the remote control to the remote control in a case where contact between the first contact position and the work target is detected by the first sensor and where contact between the second contact position and the work target is detected by the second sensor.

According to the arrangement, the first sensor detects contact between the first contact position on the contact surface of the working unit with the work target and the work target. The second sensor detects contact between the second contact position on the contact surface that is different from the first contact position and the work target. In a case where contact between the first contact position and the work target is detected by the first sensor and where contact between the second contact position and the work target is detected by the second sensor, a signal for vibrating the remote control is transmitted to the remote control.

Since the remote control vibrates in a case where two positions on the contact surface between the working unit and the work target are in contact, an operator can be notified of whether or not the working unit is in contact with the work target with certainty.

The remote-operated working device may be arranged such that the first detector includes a pressure sensor that detects a pressure value of pressure applied to the working unit; and the communicator transmits the pressure value detected by the pressure sensor to the remote control in order to change an amount of vibration of the remote control in accordance with the pressure value.

According to the arrangement, since the pressure value of pressure applied to the working unit is transmitted to the remote control, the remote control can change the amount of vibration in accordance with the pressure value, and the operator can confirm pressure of contact between the working unit and the work target.

The remote-operated working device may be arranged to further include an imager that takes an image of surroundings of the remote-operated working device, the communicator transmitting the image supplied from the imager to the remote control so that information indicating whether or not the working unit and the work target is in contact with each other is displayed on the remote control so as to be superimposed on the image.

According to the arrangement, the imager takes an image of surroundings of the remote-operated working device. The image is transmitted to the remote control, and information indicating whether or not the working unit and the work target are in contact with each other is displayed on the remote control so as to be superimposed on the image supplied from the imager.

This allows the operator to confirm whether or not the working unit and the work target are in contact with each other while checking the image of the surroundings of the remote-operated working device.

The remote-operated working device may be arranged such that the imager takes an image of a contact position where the working unit and the work target are in contact with each other. According to the arrangement, the operator can check the contact position where the working unit and the work target are in contact with each other.

The remote-operated working device may be arranged such that the imager takes an image of the work target which is a destination of the working unit. According to the arrangement, the operator can check the work target which is a destination of the working unit.

The remote-operated working device may be arranged such that the imager switches an imaging mode between a first imaging mode for imaging of a traveling direction of the remote-operated working device and a second imaging mode for imaging of the work target which is a destination of the working unit.

According to the arrangement, since the imaging mode is switched between the first imaging mode for imaging of the traveling direction of the remote-operated working device and the second imaging mode for imaging of the work target which is a destination of the working unit, the remote-operated working device can be moved to the work target with certainty, and a work can be performed on the work target by using the working unit with certainty.

The remote-operated working device may be arranged such that the imager takes an image of a contact position between the working unit and the work target in a case where contact between the working unit and the work target is detected by the first detector, and the imager takes an image of the work target which is a destination of the working unit in a case where contact between the working unit and the work target is not detected by the first detector.

According to the arrangement, an image of a contact position between the working unit and the work target is taken in a case where contact between the working unit and the work target is detected, and an image of the work target which is a destination of the working unit is taken in a case where contact between the working unit and the work target is not detected.

It is therefore possible to automatically switch a target to be imaged in accordance with whether or not contact between the working unit and the work target has been detected.

The remote-operated working device may be arranged such that the remote-operated working device is a drone. According to the arrangement, the remote-operated working device flies in the air and therefore can perform a work on a work target at a high position beyond human reach.

The remote-operated working device may be arranged to further include a second detector that is disposed at a position other than a contact surface between the working unit and the work target and detects contact between the remote-operated working device and an object other than the work target, the communicator transmitting a signal for notifying an operator of a warning to the remote control in a case where contact between the remote-operated working device and the object other than the work target is detected by the second detector.

According to the arrangement, since a signal for notifying an operator of a warning is transmitted to the remote control in a case where contact between the remote-operated working device and an object other than the work target is detected, the operator can be notified of contact between the remote-operated working device and the object other than the work target.

The remote-operated working device may be arranged such that the predetermined work is cleaning of a target to be cleaned that is in a remote place; and the working unit includes at least one of a brush, a mop, a suction device, and a water-discharge device.

According to the arrangement, the remote-operated working device can be applied to cleaning of a target to be cleaned that is in a remote place.

The remote-operated working device may be arranged such that the predetermined work is inspection of a target to be inspected that is in a remote place; and the working unit includes at least one of a camera, an infrared camera, and a hammering inspection device.

According to the arrangement, the remote-operated working device can be applied to inspection of a target to be inspected that is in a remote place.

The remote-operated working device may be arranged such that the communicator receives a marking instruction signal for marking an inspected position from the remote control; and the working unit further includes a marker that marks the target to be inspected in a case where the marking instruction signal is received by the communicator.

According to the arrangement, a marking instruction signal for marking an inspected position is received from the remote control. In a case where the marking instruction signal is received, the target to be inspected is marked. It is therefore possible to mark a target to be inspected that has an abnormality.

The remote-operated working device may be arranged such that the marker attaches, to the target to be inspected, a communication device in which at least one of image identification information for identifying an image of the target to be inspected, infrared image identification information for identifying an infrared image of the target to be inspected, and hit sound identification information for identifying hit sound obtained when the target to be inspected is hit is stored.

According to the arrangement, a communication device in which at least one of image identification information for identifying an image of the target to be inspected, infrared image identification information for identifying an infrared image of the target to be inspected, and hit sound identification information for identifying hit sound obtained when the target to be inspected is hit is stored is attached to the target to be inspected.

It is therefore possible to easily specify at least one of an image, an infrared image, and hit sound of the target to be inspected by reading out at least one of the image identification information, the infrared image identification information, and the hit sound identification information from the communication device attached to the target to be inspected. This makes it possible to easily confirm an inspection result.

The remote-operated working device may be arranged to further include a position measurer that measures a position of the remote-operated working device, the communicator receiving a position measurement instruction signal for measuring an inspected position from the remote control and transmitting, to the remote control, device position information indicative of the position of the remote-operated working device measured by the position measurer as inspected position information indicative of the inspected position.

According to the arrangement, a position measurement instruction signal for measuring an inspected position is received from the remote control. Device position information indicative of the measured position of the remote-operated working device is transmitted to the remote control as inspected position information indicative of the inspected position.

Since the position of the remote-operated working device is transmitted to the remote control as a position inspected by the remote-operated working device, the position inspected by the remote-operated working device can be managed in association with at least one of the image identification information, the infrared image identification information, and the hit sound identification information. It is therefore possible to easily specify a position of a target to be inspected that has an abnormality.

The remote-operated working device may be arranged to further include a storage in which at least one of image identification information for identifying an image of the target to be inspected, infrared image identification information for identifying an infrared image of the target to be inspected, and hit sound identification information for identifying hit sound obtained when the target to be inspected is hit and the inspected position information are stored in association with each other.

According to the arrangement, at least one of image identification information for identifying an image of the target to be inspected, infrared image identification information for identifying an infrared image of the target to be inspected, and hit sound identification information for identifying hit sound obtained when the target to be inspected is hit and the inspected position information are stored in association with each other.

Since the position inspected by the remote-operated working device can be managed in association with at least one of the image identification information, the infrared image identification information, and the hit sound identification information, it is possible to easily specify a position of the target to be inspected that has an abnormality.

A control method according to another aspect of the present disclosure is a control method for controlling a remote-operated working device including: controlling movement of the remote-operated working device remotely operated by a remote control; detecting contact between a working unit that performs a predetermined work on the work target and the work target in a remote place; and transmitting a signal for vibrating the remote control to the remote control in a case where contact between the working unit and the work target is detected.

According to the arrangement, movement of the remote-operated working device is controlled, and contact between a working unit that performs a predetermined work on a work target that is in a remote place and the work target is detected. In a case where contact between the working unit and the work target is detected, a signal for vibrating the remote control is transmitted to the remote control.

Since a signal for vibrating the remote control is transmitted to the remote control and the remote control thus vibrates in a case where contact between the working unit and the work target is detected, the operator can be notified of contact between the working unit and the work target with certainty.

Embodiments of the present disclosure are described below with reference to the attached drawings. Note that the embodiments below are specific examples of the present disclosure and do not limit the technical scope of the present disclosure.

Embodiment 1

Figure 2:
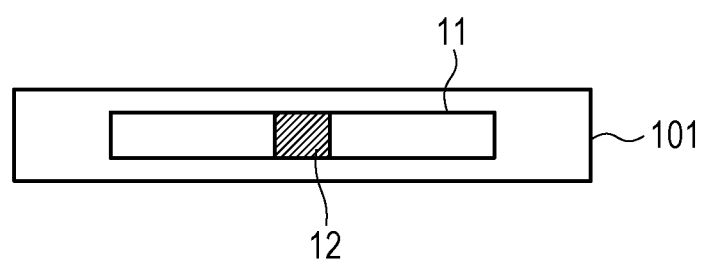
FIG. 2 is a front view illustrating an exterior configuration of the cleaning robot according to Embodiment 1 of the present disclosure.
Figure 3:
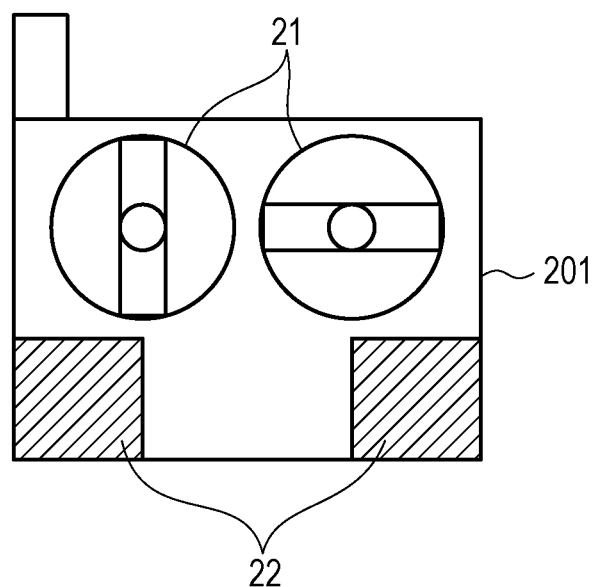
FIG. 3 is a front view illustrating an exterior configuration of a remote control according to Embodiment 1 of the present disclosure.

FIG. 1 is a top view illustrating an exterior configuration of a cleaning robot according to Embodiment 1 of the present disclosure, FIG. 2 is a front view illustrating an exterior configuration of the cleaning robot according to Embodiment 1 of the present disclosure, and FIG. 3 is a front view illustrating an exterior configuration of a remote control according to Embodiment 1 of the present disclosure.

A cleaning robot (remote-operated working device) 101 illustrated in FIGS. 1 and 2 is remotely operated by a remote control 201 and cleans a target to be cleaned that is in a remote place. The target to be cleaned is, for example, an exterior wall or a window of a house or a building. The target to be cleaned may be, for example, a ceiling. The cleaning robot 101 is an example of a remote-operated working device that is remotely operated by a remote control and performs a predetermined work on a work target in a remote place.

The cleaning robot 101 is a drone. The cleaning robot 101 includes a plurality of propellers 10 and is capable of freely flying in the air. In the present embodiment, the cleaning robot 101 includes four propellers 10. However, the present disclosure is not limited to this. The cleaning robot 101 may include eight propellers. The number of propellers is not limited in particular. Furthermore, the cleaning robot 101 may run on a floor.

A cleaning tool (working unit) 11 is provided on a front face of the cleaning robot 101. The cleaning tool 11 cleans the target to be cleaned. For example, the cleaning tool 11 wipes a stain or vacuums up dust or the like. The cleaning tool 11 is an example of a working unit that performs a predetermined work on a work target.

Note that the cleaning tool 11 can be any tool used for cleaning and can be, for example, a nozzle for applying a cleaning substance, a brush for rubbing a cleaning surface, a vacuum nozzle for vacuuming up a dirty liquid, a wiper, or the like. The cleaning tool 11 may include at least one of a brush, a mop, a suction device, and a water-discharge device. The cleaning tool 11 may be detachable and a user may replace the cleaning tool 11 with optimum one according to a target to be cleaned or a cleaning procedure. The cleaning tool 11 is fixed to a main body of the cleaning robot 101. However, the present disclosure is not limited to this, and the cleaning tool 11 may be movable in a vertical direction, a horizontal direction, or the like.

A pressure sensor 12 is disposed at a center of a surface of the cleaning tool 11 that makes contact with the target to be cleaned. The pressure sensor 12 detects pressure applied to the cleaning tool 11. The pressure sensor 12 detects contact between the cleaning tool 11 and the target to be cleaned. That is, the cleaning tool 11 need moderately press the target to be cleaned in order to clean the target to be cleaned, and the pressure sensor 12 detects pressing of the cleaning tool 11 against the target to be cleaned.

In the present embodiment, the cleaning tool 11 has a rectangular shape whose longitudinal direction matches a horizontal direction. However, the present disclosure is not limited to this, and the cleaning tool 11 can have another shape. Furthermore, the cleaning tool 11 may have a rectangular shape whose longitudinal direction matches a vertical direction. The pressure sensor 12 is disposed at the center of the cleaning tool 11, but may be disposed at another position. Furthermore, a sensor other than a pressure sensor may be used as long as the sensor is capable of detecting contact between the cleaning tool 11 and the target to be cleaned.

The remote control 201 illustrated in FIG. 3 includes an input unit 21 for remotely operating the cleaning robot 101. The remote control 201 is held by an operator with both hands. The input unit 21 includes a left stick provided on a left-hand side and a right stick provided on a right-hand side. When the operator tilts the left stick and the right stick, information on a tilt angle is transmitted to the cleaning robot 101, and movement of the cleaning robot 101 is controlled in accordance with the tilt angle.

A vibration unit 22 is provided in the remote control 201. The vibration unit 22 is constituted, for example, by a vibration motor, and the vibration unit 22 is disposed at two positions, i.e., a portion held by the left hand of the operator and a portion held by the right hand of the operator. The two vibration units 22 work in unison and transmit vibration to the left hand and the right hand of the operator, respectively.

The remote control 201 includes two vibration units 22, but may include only a single vibration unit 22. The remote control 201 may be a smartphone or a tablet-type computer and accept an operator's input operation on an operation screen displayed on a touch panel.

Figure 4:
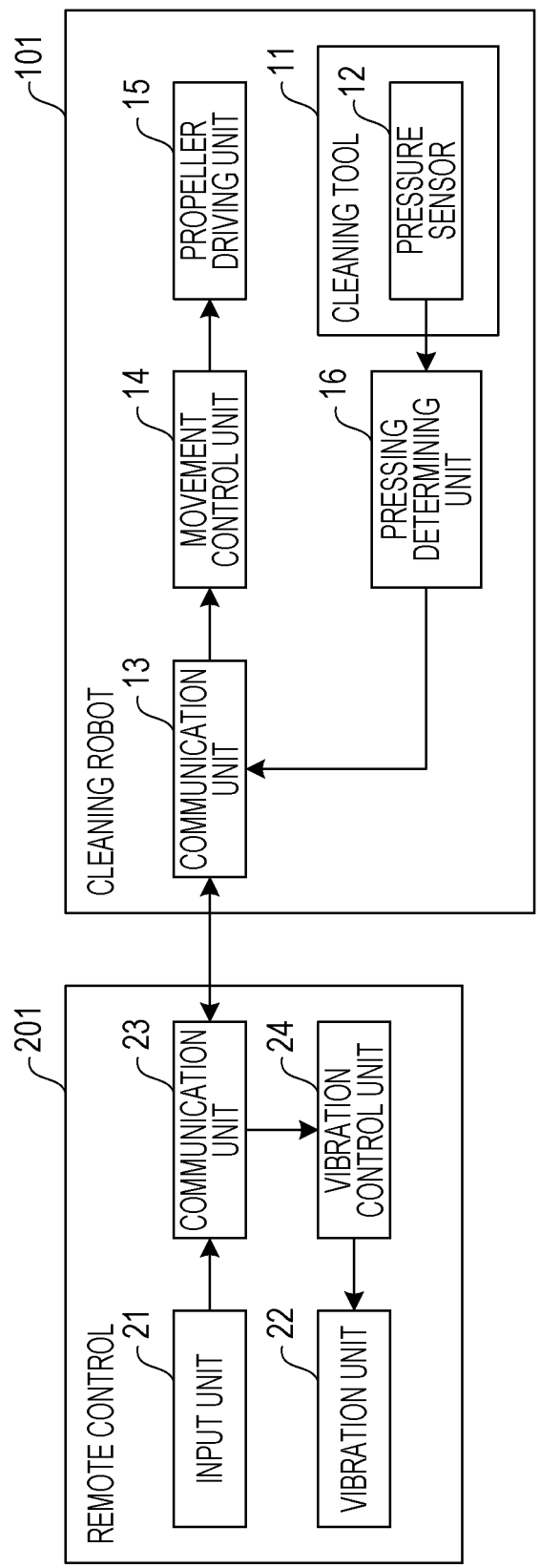
FIG. 4 is a block diagram illustrating a configuration of a cleaning system according to Embodiment 1 of the present disclosure.

FIG. 4 is a block diagram illustrating a configuration of a cleaning system according to Embodiment 1 of the present disclosure. The cleaning system illustrated in FIG. 4 includes the cleaning robot 101 and the remote control 201.

The cleaning robot 101 includes the pressure sensor 12, a communication unit 13, a movement control unit 14, a propeller driving unit 15, and a pressing determining unit 16.

The pressure sensor 12 detects contact between the cleaning tool 11 and the target to be cleaned. The pressure sensor 12 supplies, to the pressing determining unit 16, sensing information indicating whether or not pressure caused by contact with the target to be cleaned has been detected.

The communication unit 13 wirelessly transmits various kinds of information to the remote control 201 and receives various kinds of information from the remote control 201.

The cleaning robot 101 and the remote control 201 are connected so as to be communicable with each other and communicate with each other, for example, through specified low power radio. The communication unit 13 receives an input signal transmitted by the remote control 201. The input signal includes operation information for operating the cleaning robot 101, and the operation information includes, for example, angle information indicative of tilt angles of the left stick and the right stick.

The communication unit 13 may be realized, for example, by an integrated circuit into which the aforementioned operation of the communication unit 13 is incorporated. Alternatively, the communication unit 13 may include a communication circuit and the cleaning robot 101 may include a communication circuit, a processor (not illustrated) and a memory (not illustrated) as a hardware configuration. A program corresponding to the aforementioned operation of the communication unit 13 may be stored in the memory. The processor of cleaning robot 101 may execute the program to control the communication circuit. Also, the communication unit 13 may function when the processor of the cleaning robot executes the program.

The movement control unit 14 controls movement of the cleaning robot 101 and moves the cleaning robot 101 in accordance with an operator's operation. The movement control unit 14 generates a driving signal for driving the plurality of propellers 10 on the basis of the input signal supplied from the communication unit 13 and then supply the generated driving signal to the propeller driving unit 15. The movement control unit 14 may be realized, for example, by an integrated circuit into which the aforementioned operation of the movement control unit 14 is incorporated. Alternatively, a program corresponding to the aforementioned operation of the movement control unit 14 may be stored in the memory (not illustrated) of the cleaning robot 101, and the movement control unit 14 may function when the processor (not illustrated) of the cleaning robot 101 executes the program. The cleaning robot 101 is capable of moving forward, backward, leftward, rightward, upward, and downward by controlling the number of revolutions of each of the plurality of propellers 10. Note that the movement control unit 14 may detect a change of a flight attitude in accordance with output from a triaxial gyrosensor (not illustrated) and a triaxial acceleration sensor (not illustrated) and automatically control movement of the cleaning robot 101 so that the flight attitude is stable.

The propeller driving unit 15 drives each of the plurality of propellers 10 on the basis of the driving signal supplied from the movement control unit 14.

The pressing determining unit 16 determines whether or not the cleaning tool 11 is in contact with the target to be cleaned on the basis of the sensing information supplied from the pressure sensor 12. The pressing determining unit 16 may be realized, for example, by an integrated circuit into which the aforementioned operation of the pressing determining unit 16 is incorporated. Alternatively, a program corresponding to the aforementioned operation of the pressing determining unit 16 may be stored in the memory (not illustrated) of the cleaning robot 101, and the pressing determining unit 16 may function when the processor (not illustrated) of the cleaning robot 101 executes the program. In a case where it is determined that the cleaning tool 11 is in contact with the target to be cleaned, the pressing determining unit 16 supplies, to the communication unit 13, a contact detection signal indicating that the cleaning tool 11 is in contact with the target to be cleaned. The communication unit 13 transmits, to the remote control 201, the contact detection signal supplied from the pressing determining unit 16. In a case where contact between the cleaning tool 11 and the target to be cleaned is detected by the pressure sensor 12, the communication unit 13 transmits the contact detection signal for vibrating the remote control 201 to the remote control 201.

The remote control 201 includes the input unit 21, the vibration units 22, a communication unit 23, and a vibration control unit 24.

The input unit 21 accepts an operator's operation and supplies an input signal including the operation information for operating the cleaning robot 101 to the communication unit 23.

The vibration units 22 each have, for example, a mass body and vibrate the remote control 201 by vibrating the mass body in accordance with a signal received from the vibration control unit 24. The mass body may be an elastic member or may be a rigid member.

The communication unit 23 wirelessly transmits various kinds of information to the cleaning robot 101 and receives various kinds of information from the cleaning robot 101. The communication unit 23 transmits an input signal supplied from the input unit 21 to the cleaning robot 101. The communication unit 23 receives the contact detection signal transmitted by the cleaning robot 101.

The communication unit 23 may be realized, for example, by an integrated circuit into which the aforementioned operation of the communication unit 23 is incorporated. Alternatively, a program corresponding to the aforementioned operation of the communication unit 23 may be stored in a memory (not illustrated) of the remote control 201, and the communication unit 23 may function when a processor (not illustrated) of the remote control 201 executes the program.

The vibration control unit 24 supplies a signal for vibrating the mass bodies of the vibration units 22 (i.e., a signal for vibrating the remote control 201) to the vibration unit 22 in a case where the contact detection signal is received by the communication unit 23. The vibration control unit 24 may be realized, for example, by an integrated circuit into which the aforementioned operation of the vibration control unit 24 is incorporated. Alternatively, a program corresponding to the aforementioned operation of the vibration control unit 24 may be stored in the memory (not illustrated) of the remote control 201, and the vibration control unit 24 may function when the processor (not illustrated) of the remote control 201 executes the program.

Hereinafter, vibrating the mass bodies of the vibration units 22 is referred to as vibrating the vibration unit 22.

Next, operations of the cleaning robot 101 and the remote control 201 according to Embodiment 1 are described.

Figure 5:
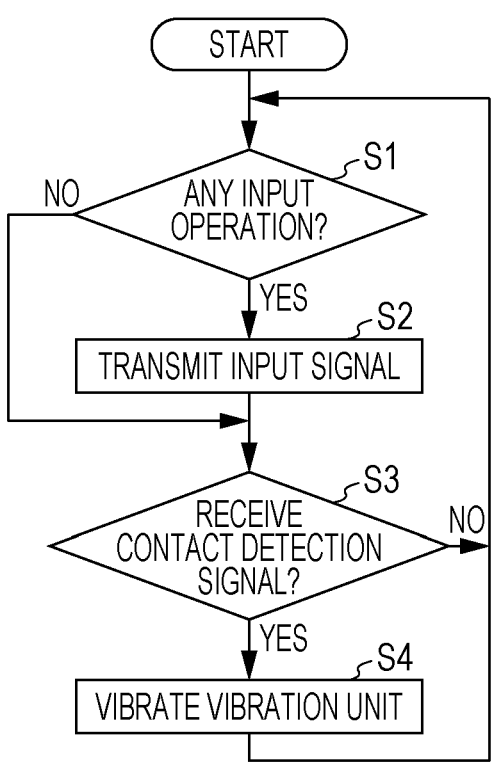
FIG. 5 is a flow chart for explaining an operation of the remote control according to Embodiment 1 of the present disclosure.

FIG. 5 is a flow chart for explaining an operation of the remote control according to Embodiment 1 of the present disclosure.

First, in Step S1, the input unit 21 accepts an operator's input operation and determines whether or not an input operation has been performed by the operator. In a case where it is determined that no input operation has been performed (NO in Step S1), the procedure proceeds to the process in Step S3.

Meanwhile, in a case where it is determined that an input operation has been performed (YES in Step S1), the communication unit 23 transmits an input signal accepted by the input unit 21 to the cleaning robot 101 in Step S2.

Next, in Step S3, the vibration control unit 24 determines whether or not the communication unit 23 has received a contact detection signal transmitted from the cleaning robot 101. In a case where it is determined that the communication unit 23 has received no contact detection signal (NO in Step S3), the procedure returns to the process in Step S1.

Meanwhile, in a case where it is determined that the communication unit 23 has received the contact detection signal (YES in Step S3), the vibration control unit 24 vibrates the vibration units 22 in Step S4. In this way, vibration is transmitted to the hands of the operator, and the operator can be notified of contact between the cleaning tool 11 and the target to be cleaned.

Figure 6:
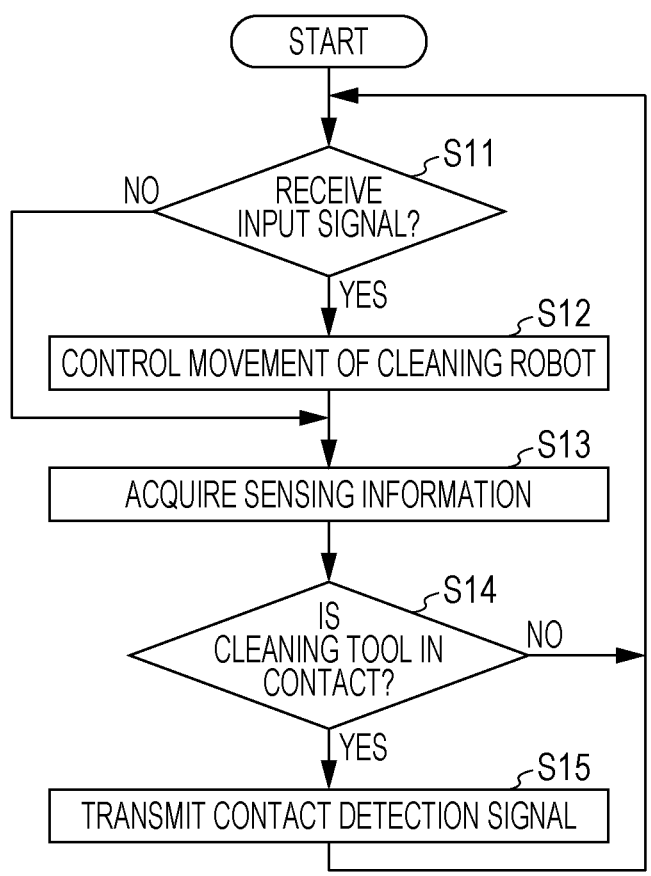
FIG. 6 is a flow chart for explaining an operation of the cleaning robot according to Embodiment 1 of the present disclosure.

FIG. 6 is a flow chart for explaining an operation of the cleaning robot according to Embodiment 1 of the present disclosure.

First, in Step S11, the movement control unit 14 determines whether or not the communication unit 13 has received an input signal transmitted from the remote control 201. In a case where it is determined that the communication unit 13 has received no input signal (NO in Step S11), the procedure proceeds to the process in Step S13.

Meanwhile, in a case where it is determined that the communication unit 13 has received the input signal (YES in Step S11), the movement control unit 14 controls movement of the cleaning robot 101 in accordance with the input signal received by the communication unit 13 in Step S12.

Next, in Step S13, the pressing determining unit 16 requests sensing information from the pressure sensor 12 and thus acquires the sensing information from the pressure sensor 12.

Next, in Step S14, the pressing determining unit 16 determines whether or not the cleaning tool 11 is in contact with the target to be cleaned on the basis of the sensing information acquired from the pressure sensor 12. In a case where the sensing information includes information indicating that pressure has been detected, the pressing determining unit 16 determines that the cleaning tool 11 is in contact with the target to be cleaned. Meanwhile, in a case where the sensing information includes information indicating that no pressure has been detected, the pressing determining unit 16 determines that the cleaning tool 11 is not in contact with the target to be cleaned.

In the case where it is determined that the cleaning tool 11 is not in contact with the target to be cleaned (NO in Step S14), the procedure returns to the process in Step S11.

Meanwhile, in a case where it is determined that the cleaning tool 11 is in contact with the target to be cleaned (YES in Step S14), the communication unit 13 transmits, to the remote control 201, a contact detection signal indicating that the cleaning tool 11 is in contact with the target to be cleaned in Step S15.

As described above, in Embodiment 1, in a case where contact between the cleaning tool 11 and the target to be cleaned is detected, a signal for vibrating the remote control 201 is transmitted to the remote control 201, and the remote control 201 thus vibrates. This allows an operator to be notified of contact between the cleaning tool 11 and the target to be cleaned with certainty.

In particular, in many cases, an operator is watching a cleaning robot while operating the cleaning robot. Therefore, the operator can be notified of contact between the cleaning tool 11 and the target to be cleaned with more certainty in a case where the operator is notified of contact by vibration of the vibration units provided in the remote control 201 than in a case where the operator is notified of contact by information displayed on a display unit provided in the remote control 201.

Embodiment 2

Next, a cleaning robot according to Embodiment 2 is described. The cleaning robot according to Embodiment 1 includes a single pressure sensor, but the cleaning robot according to Embodiment 2 includes two pressure sensors.

Figure 7:
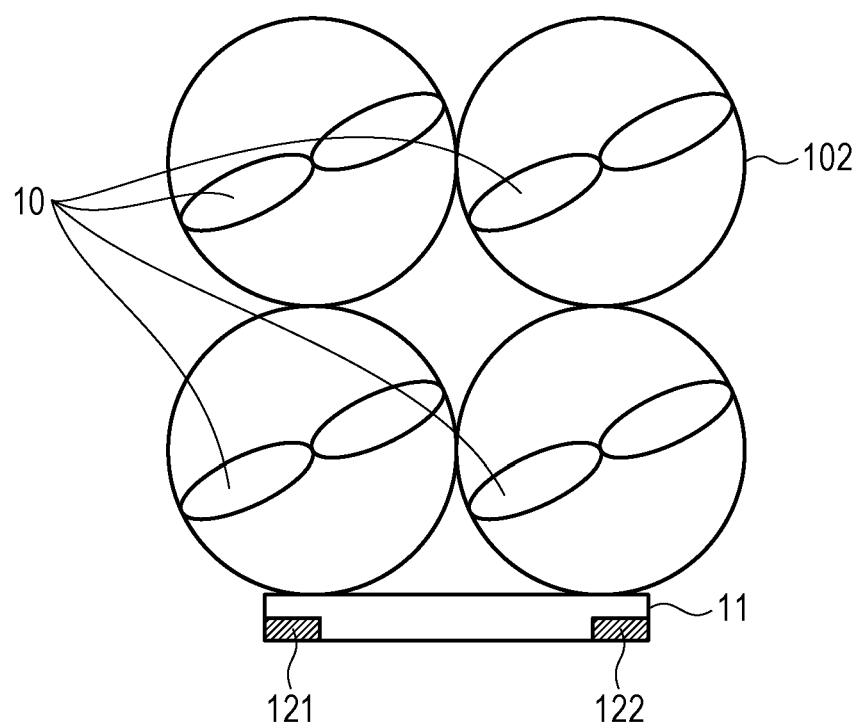
FIG. 7 is a top view illustrating an exterior configuration of a cleaning robot according to Embodiment 2 of the present disclosure.
Figure 8:
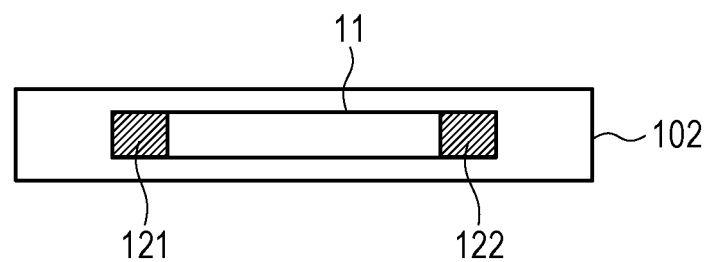
FIG. 8 is a front view illustrating an exterior configuration of the cleaning robot according to Embodiment 2 of the present disclosure.
Figure 9:
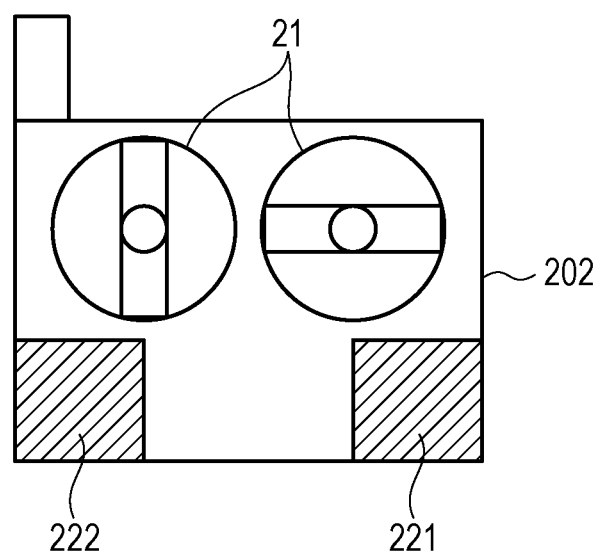
FIG. 9 is a front view illustrating an exterior configuration of a remote control according to Embodiment 2 of the present disclosure.

FIG. 7 is a top view illustrating an exterior configuration of the cleaning robot according to Embodiment 2 of the present disclosure, FIG. 8 is a front view illustrating an exterior configuration of the cleaning robot according to Embodiment 2 of the present disclosure, and FIG. 9 is a front view illustrating an exterior configuration of a remote control according to Embodiment 2 of the present disclosure. In embodiment 2, elements that are identical to those in Embodiment 1 are given identical reference signs, and description thereof is omitted.

A cleaning robot 102 illustrated in FIGS. 7 and 8 is remotely operated by a remote control 202 and cleans a target to be cleaned that is in a remote place. The target to be cleaned is, for example, an exterior wall or a window of a house or a building. The target to be cleaned may be, for example, a ceiling.

The cleaning robot 102 is a drone. A cleaning tool 11 is provided on a front face of the cleaning robot 102.

A first pressure sensor 121 and a second pressure sensor 122 are provided on a surface of the cleaning tool 11 that makes contact with the target to be cleaned. The first pressure sensor 121 is disposed on a right side of the cleaning tool 11, and the second pressure sensor 122 is disposed on a left side of the cleaning tool 11.

The first pressure sensor 121 and the second pressure sensor 122 detect pressure applied to the cleaning tool 11. The first pressure sensor 121 detects contact between a right portion of the cleaning tool 11 and the target to be cleaned. The second pressure sensor 122 detects contact between a left portion of the cleaning tool 11 and the target to be cleaned. Note that it is preferable that the first pressure sensor 121 be disposed at a right end of the cleaning tool 11, and the second pressure sensor 122 be disposed at a left end of the cleaning tool 11.

The remote control 202 illustrated in FIG. 9 includes an input unit 21 for remote operation of the cleaning robot 102. The remote control 202 is held by an operator with both hands. The input unit 21 includes a left stick provided on a left-hand side and a right stick provided on a right-hand side. When the operator tilts the left stick and the right stick, information concerning a tilt angle is transmitted to the cleaning robot 102, and movement of the cleaning robot 102 is controlled in accordance with the tilt angle.

A first vibration unit 221 and a second vibration unit 222 are disposed in the remote control 202. Each of the first vibration unit 221 and the second vibration unit 222 is constituted, for example, by a vibration motor. The first vibration unit 221 is disposed in a portion held by the right hand of the operator and transmits vibration to the right hand of the operator. The second vibration unit 222 is disposed in a portion held by the left hand of the operator and transmits vibration to the left hand of the operator.

Note that the remote control 202 may be a smartphone or a tablet-type computer and accept an operator's input operation on an operation screen displayed on a touch panel.

Figure 10:
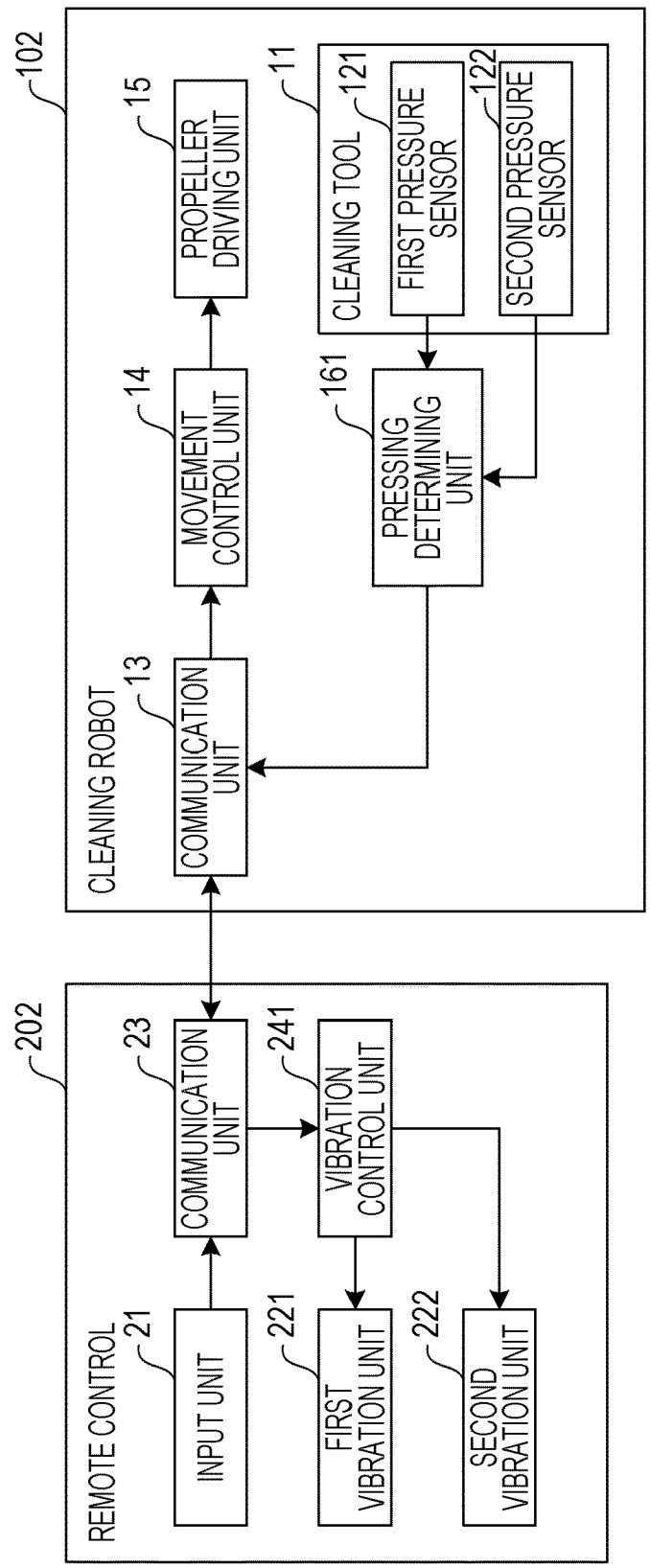
FIG. 10 is a block diagram illustrating a configuration of a cleaning system according to Embodiment 2 of the present disclosure.

FIG. 10 is a block diagram illustrating a configuration of a cleaning system according to Embodiment 2 of the present disclosure. The cleaning system illustrated in FIG. 10 includes the cleaning robot 102 and the remote control 202.

The cleaning robot 102 includes the first pressure sensor 121, the second pressure sensor 122, a communication unit 13, a movement control unit 14, a propeller driving unit 15, and a pressing determining unit 161.

The first pressure sensor 121 supplies, to the pressing determining unit 161, first sensing information indicating whether or not pressure has been detected. The second pressure sensor 122 supplies, to the pressing determining unit 161, second sensing information indicating whether or not pressure has been detected.

The pressing determining unit 161 determines whether or not the right portion of the cleaning tool 11 is in contact with the target to be cleaned on the basis of the first sensing information acquired from the first pressure sensor 121. In a case where it is determined that the right portion of the cleaning tool 11 is in contact with the target to be cleaned, the pressing determining unit 161 supplies, to the communication unit 13, a first contact detection signal indicating that the right portion of the cleaning tool 11 is in contact with the target to be cleaned. Furthermore, the pressing determining unit 161 determines whether or not the left portion of the cleaning tool 11 is in contact with the target to be cleaned on the basis of the second sensing information acquired from the second pressure sensor 122. In a case where it is determined that the left portion of the cleaning tool 11 is in contact with the target to be cleaned, the pressing determining unit 161 supplies, to the communication unit 13, a second contact detection signal indicating that the left portion of the cleaning tool 11 is in contact with the target to be cleaned.

The pressing determining unit 161 may be realized, for example, by an integrated circuit into which the aforementioned operation of the pressing determining unit 161 is incorporated. Alternatively, a program corresponding to the aforementioned operation of the pressing determining unit 161 may be stored in a memory (not illustrated) of the cleaning robot 102, and the pressing determining unit 161 may function when a processor (not illustrated) of the cleaning robot 102 executes the program.

The communication unit 13 transmits, to the remote control 202, the first contact detection signal and the second contact detection signal supplied from the pressing determining unit 161. The communication unit 13 transmits the first contact detection signal for vibrating the right side of the remote control 202 to the remote control 202 in a case where contact between the right portion of the cleaning tool 11 and the target to be cleaned is detected by the first pressure sensor 121. The communication unit 13 transmits the second contact detection signal for vibrating the left side of the remote control 202 to the remote control 202 in a case where contact between the left portion of the cleaning tool 11 and the target to be cleaned is detected by the second pressure sensor 122.

The remote control 202 includes the input unit 21, the first vibration unit 221, the second vibration unit 222, a communication unit 23, and a vibration control unit 241.

The first vibration unit 221 has, for example, a first mass body and vibrates a right side of the remote control 202 by vibrating the first mass body in accordance with a signal received from the vibration control unit 241. The second vibration unit 222 has, for example, a second mass body and vibrates a left side of the remote control 202 by vibrating the second mass body in accordance with a signal received from the vibration control unit 241. The first mass body and the second mass body may be elastic members or may be rigid members.

The communication unit 23 receives the first contact detection signal and the second contact detection signal transmitted by the cleaning robot 102.

The vibration control unit 241 supplies a signal for vibrating the first mass body of the first vibration unit 221 to the first vibration unit 221 in a case where the first contact detection signal is received by the communication unit 23.

The vibration control unit 241 supplies a signal for vibrating the second mass body of the second vibration unit 222 to the second vibration unit 222 in a case where the second contact detection signal is received by the communication unit 23.

The vibration control unit 241 may be realized, for example, by an integrated circuit into which the aforementioned operation of the vibration control unit 241 is incorporated. Alternatively, a program corresponding to the aforementioned operation of the vibration control unit 241 may be stored in a memory (not illustrated) of the remote control 202, and the vibration control unit 241 may function when a processor (not illustrated) of the remote control 202 executes the program.

Hereinafter, vibrating the first mass body of the first vibration unit 221 is referred to as vibrating the first vibration unit 221, and vibrating the second mass body of the second vibration unit 222 is referred to as vibrating the second vibration unit 222.

Next, operations of the cleaning robot 102 and the remote control 202 according to Embodiment 2 are described.

Figure 11:
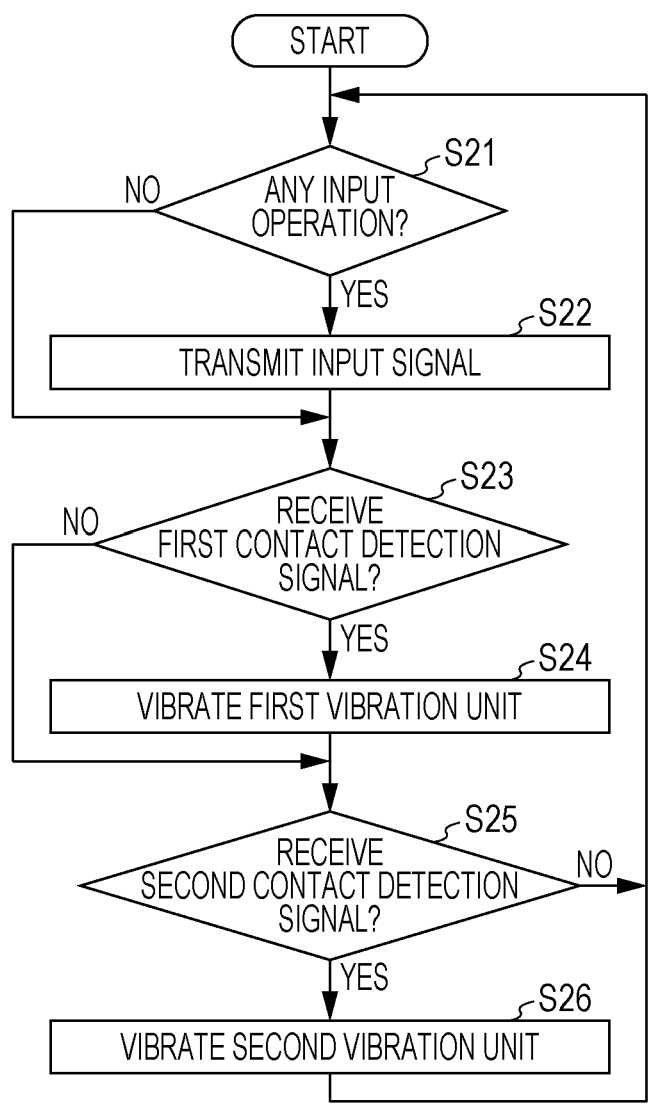
FIG. 11 is a flow chart for explaining an operation of the remote control according to Embodiment 2 of the present disclosure.

FIG. 11 is a flow chart for explaining an operation of the remote control according to Embodiment 2 of the present disclosure.

The processes in Step S21 and Step S22 in FIG. 11 are identical to those in Step S1 and Step S2 in FIG. 5, and description thereof is omitted.

Next, in Step S23, the vibration control unit 241 determines whether or not the communication unit 23 has received the first contact detection signal transmitted by the cleaning robot 102. In a case where it is determined that the communication unit 23 has not received the first contact detection signal (NO in Step S23), the procedure proceeds to the process in Step S25.

Meanwhile, in a case where it is determined that the communication unit 23 has received the first contact detection signal (YES in Step S23), the vibration control unit 241 vibrates the first vibration unit 221 in Step S24. In this way, vibration is transmitted to the right hand of the operator, and the operator is thus notified of contact between the right portion of the cleaning tool 11 and the target to be cleaned.

Next, in Step S25, the vibration control unit 241 determines whether or not the communication unit 23 has received the second contact detection signal transmitted by the cleaning robot 102. In a case where it is determined that the communication unit 23 has not received the second contact detection signal (NO in Step S25), the procedure returns to the process in Step S21.

Meanwhile, in a case where it is determined that the communication unit 23 has received the second contact detection signal (YES in Step S25), the vibration control unit 241 vibrates the second vibration unit 222 in Step S26. In this way, vibration is transmitted to the left hand of the operator, and the operator is thus notified of contact between the left portion of the cleaning tool 11 and the target to be cleaned.

Figure 12:
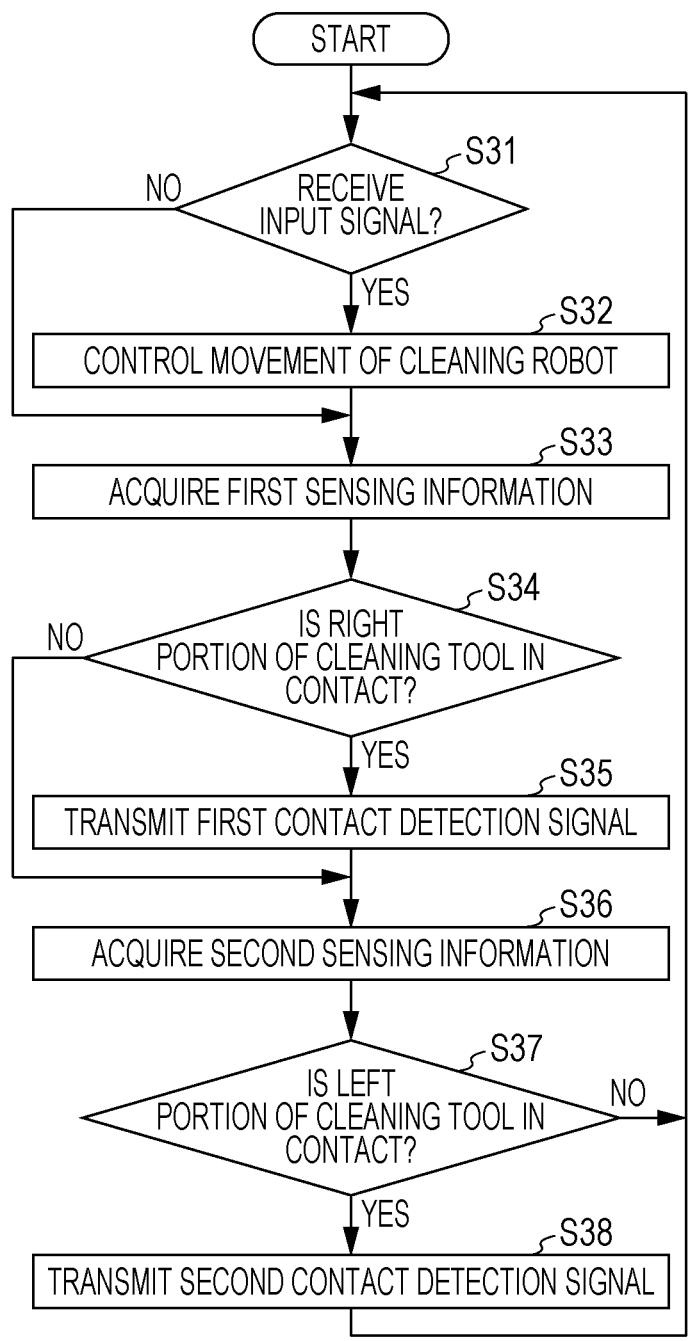
FIG. 12 is a flow chart for explaining an operation of the cleaning robot according to Embodiment 2 of the present disclosure.

FIG. 12 is a flow chart for explaining an operation of the cleaning robot according to Embodiment 2 of the present disclosure.

The processes in Step S31 and Step S32 in FIG. 12 are identical to those in Step S11 and Step S12 in FIG. 6, and therefore description thereof is omitted.

Next, in Step S33, the pressing determining unit 161 requests first sensing information from the first pressure sensor 121 and thus acquires the first sensing information from the first pressure sensor 121.

Next, in Step S34, the pressing determining unit 161 determines whether or not the right portion of the cleaning tool 11 is in contact with the target to be cleaned on the basis of the first sensing information acquired from the first pressure sensor 121. In a case where the first sensing information includes information indicating that pressure has been detected, the pressing determining unit 161 determines that the right portion of the cleaning tool 11 is in contact with the target to be cleaned. Meanwhile, in a case where the first sensing information includes information indicating that no pressure has been detected, the pressing determining unit 161 determines that the right portion of the cleaning tool 11 is not in contact with the target to be cleaned.

In a case where it is determined that the right portion of the cleaning tool 11 is not in contact with the target to be cleaned (NO in Step S34), the procedure proceeds to the process in Step S36.

Meanwhile, in a case where it is determined that the right portion of the cleaning tool 11 is in contact with the target to be cleaned (YES in Step S34), the communication unit 13 transmits, to the remote control 202, a first contact detection signal indicating that the right portion of the cleaning tool 11 is in contact with the target to be cleaned in Step S35.

Next, in Step S36, the pressing determining unit 161 requests second sensing information from the second pressure sensor 122 and thus acquires the second sensing information from the second pressure sensor 122.

Next, in Step S37, the pressing determining unit 161 determines whether or not the left portion of the cleaning tool 11 is in contact with the target to be cleaned on the basis of the second sensing information acquired from the second pressure sensor 122. In a case where the second sensing information includes information indicating that pressure has been detected, the pressing determining unit 161 determines that the left portion of the cleaning tool 11 is in contact with the target to be cleaned. Meanwhile, in a case where the second sensing information includes information indicating that no pressure has been detected, the pressing determining unit 161 determines that the left portion of the cleaning tool 11 is not in contact with the target to be cleaned.

In a case where it is determined that the left portion of the cleaning tool 11 is not in contact with the target to be cleaned (NO in Step S37), the procedure proceeds to the process in Step S31.

Meanwhile, in a case where it is determined that the left portion of the cleaning tool 11 is in contact with the target to be cleaned (YES in Step S37), the communication unit 13 transmits, to the remote control 202, a second contact detection signal indicating that the left portion of the cleaning tool 11 is in contact with the target to be cleaned in Step S38.

In Embodiment 2, in a case where contact between the right portion of the cleaning tool 11 and the target to be cleaned has been detected by the first pressure sensor 121, the communication unit 13 transmits, to the remote control 202, the first contact detection signal for vibrating the right side of the remote control 202, whereas in a case where the contact between the left portion of the cleaning tool 11 and the target to be cleaned has been detected by the second pressure sensor 122, the communication unit 13 transmits, to the remote control 202, the second contact detection signal for vibrating the left side of the remote control 202. However, the present disclosure is not limited to this. The first pressure sensor 121 may detect contact between the target to be cleaned and a first contact position (e.g., the right portion of the cleaning tool 11) on a contact surface of the cleaning tool 11 with the target to be cleaned, and the second pressure sensor 122 may detect contact between the target to be cleaned and a second contact position (e.g., the left portion of the cleaning tool 11) on a contact surface different from the first contact position. Furthermore, the communication unit 13 may transmit a contact detection signal for vibrating the remote control 202 to the remote control 202 in a case where contact between the first contact position of the cleaning tool 11 and the target to be cleaned has been detected by the first pressure sensor 121 and where contact between the second contact position of the cleaning tool 11 and the target to be cleaned has been detected by the second pressure sensor 122. In this case, in a case where the contact detection signal is received by the communication unit 23 of the remote control 202, the vibration control unit 241 vibrates both of the first vibration unit 221 and the second vibration unit 222.

Furthermore, in Embodiment 2, the cleaning robot 102 may include three or more pressure sensors disposed on the contact surface of the cleaning tool 11.

Embodiment 3

Next, a cleaning robot according to Embodiment 3 is described. In Embodiment 3, the magnitude of vibration of a vibration unit is changed depending on a pressure value detected by a pressure sensor although the magnitude of vibration of a vibration unit is constant in Embodiment 1.

Figure 13:
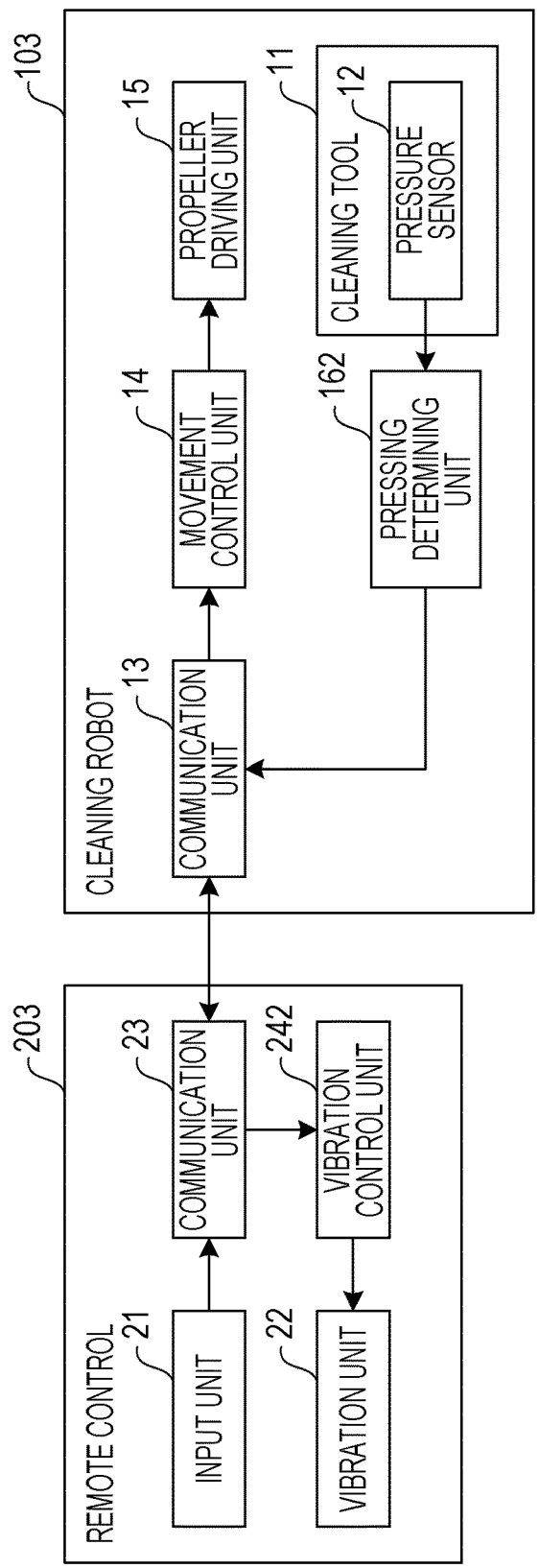
FIG. 13 is a block diagram illustrating a configuration of a cleaning system according to Embodiment 3 of the present disclosure.

FIG. 13 is a block diagram illustrating a configuration of a cleaning system according to Embodiment 3 of the present disclosure. The cleaning system illustrated in FIG. 13 includes a cleaning robot 103 and a remote control 203. Exterior configurations of the cleaning robot 103 and the remote control 203 in Embodiment 3 are identical to those illustrated in FIGS. 1 through 3. In Embodiment 3, elements that are identical to those in Embodiment 1 are given identical reference signs, and description thereof is omitted.

The cleaning robot 103 includes a pressure sensor 12, a communication unit 13, a movement control unit 14, a propeller driving unit 15, and a pressing determining unit 162.

The pressure sensor 12 detects a pressure value of pressure applied to a cleaning tool 11. The pressure sensor 12 supplies sensing information including the detected pressure value to the pressing determining unit 162.

The pressing determining unit 162 determines whether or not the cleaning tool 11 is in contact with a target to be cleaned on the basis of the sensing information acquired from the pressure sensor 12. The pressing determining unit 162 may be realized, for example, by an integrated circuit into which the aforementioned operation of the pressing determining unit 162 is incorporated. Alternatively, a program corresponding to the aforementioned operation of the pressing determining unit 162 may be stored in a memory (not illustrated) of the cleaning robot 103, and the pressing determining unit 162 may function when a processor (not illustrated) of the cleaning robot 103 executes the program. In a case where it is determined that the cleaning tool 11 is in contact with the target to be cleaned, the pressing determining unit 162 supplies, to the communication unit 13, a contact detection signal including the pressure value detected by the pressure sensor 12.

The communication unit 13 transmits, to the remote control 203, the contact detection signal including the pressure value detected by the pressure sensor 12 in order to change the amount of vibration of the remote control 203 in accordance with the pressure value.

The remote control 202 includes an input unit 21, a vibration unit 22, a communication unit 23, and a vibration control unit 242.

The vibration control unit 242 vibrates the vibration unit 22 by an amount corresponding to the pressure value included in the contact detection signal in a case where the contact detection signal is received by the communication unit 23. The vibration control unit 242 determines whether or not the pressure value is equal to or larger than a first threshold value. In a case where the pressure value is equal to or larger than the first threshold value, the vibration control unit 242 determines whether or not the pressure value is equal to or larger than a second threshold value larger than the first threshold value. In a case where the pressure value is equal to or larger than the second threshold value, the vibration control unit 242 vibrates the vibration unit 22 by a large amount. Meanwhile, in a case where the pressure value is smaller than the second threshold value, the vibration control unit 242 vibrates the vibration unit 22 by a small amount.

The vibration control unit 242 may be realized, for example, by an integrated circuit into which the aforementioned operation of the vibration control unit 242 is incorporated. Alternatively, a program corresponding to the aforementioned operation of the vibration control unit 242 may be stored in a memory (not illustrated) of the remote control 203, and the vibration control unit 242 may function when a processor (not illustrated) of the remote control 203 executes the program.

Next, operations of the cleaning robot 103 and the remote control 203 according to Embodiment 3 are described.

Figure 14:
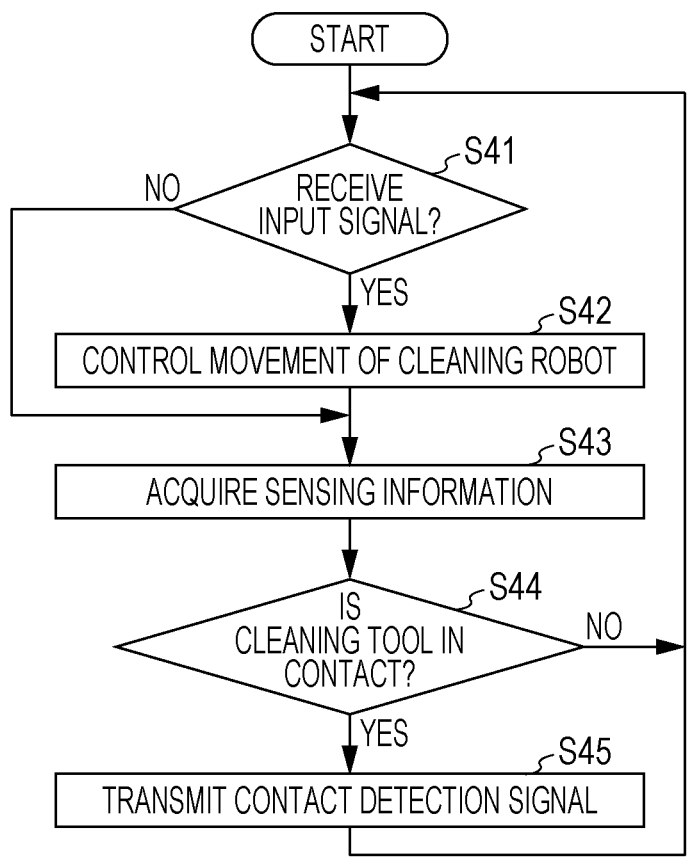
FIG. 14 is a flow chart for explaining an operation of a cleaning robot according to Embodiment 3 of the present disclosure.

FIG. 14 is a flow chart for explaining an operation of the cleaning robot according to Embodiment 3 of the present disclosure.

The processes in Step S41 and Step S42 in FIG. 14 are identical to those in Step S11 and Step S12 in FIG. 6, and therefore description thereof is omitted.

Next, in Step S43, the pressing determining unit 162 requests sensing information from the pressure sensor 12 and thus acquires the sensing information from the pressure sensor 12.

Next, in Step S44, the pressing determining unit 162 determines whether or not the cleaning tool 11 is in contact with the target to be cleaned on the basis of the sensing information acquired from the pressure sensor 12. In a case where the sensing information includes a pressure value, the pressing determining unit 162 determines that the cleaning tool 11 is in contact with the target to be cleaned. In a case where the sensing information includes no pressure value, the pressing determining unit 162 determines that the cleaning tool 11 is not in contact with the target to be cleaned.

In a case where it is determined that the cleaning tool 11 is not in contact with the target to be cleaned (NO in Step S44), the procedure returns to the process in Step S41.

Meanwhile, in a case where it is determined that the cleaning tool 11 is in contact with the target to be cleaned (YES in Step S44), the communication unit 13 transmits, to the remote control 201, a contact detection signal indicating that the cleaning tool 11 is in contact with the target to be cleaned and including the pressure value in Step S45.

Figure 15:
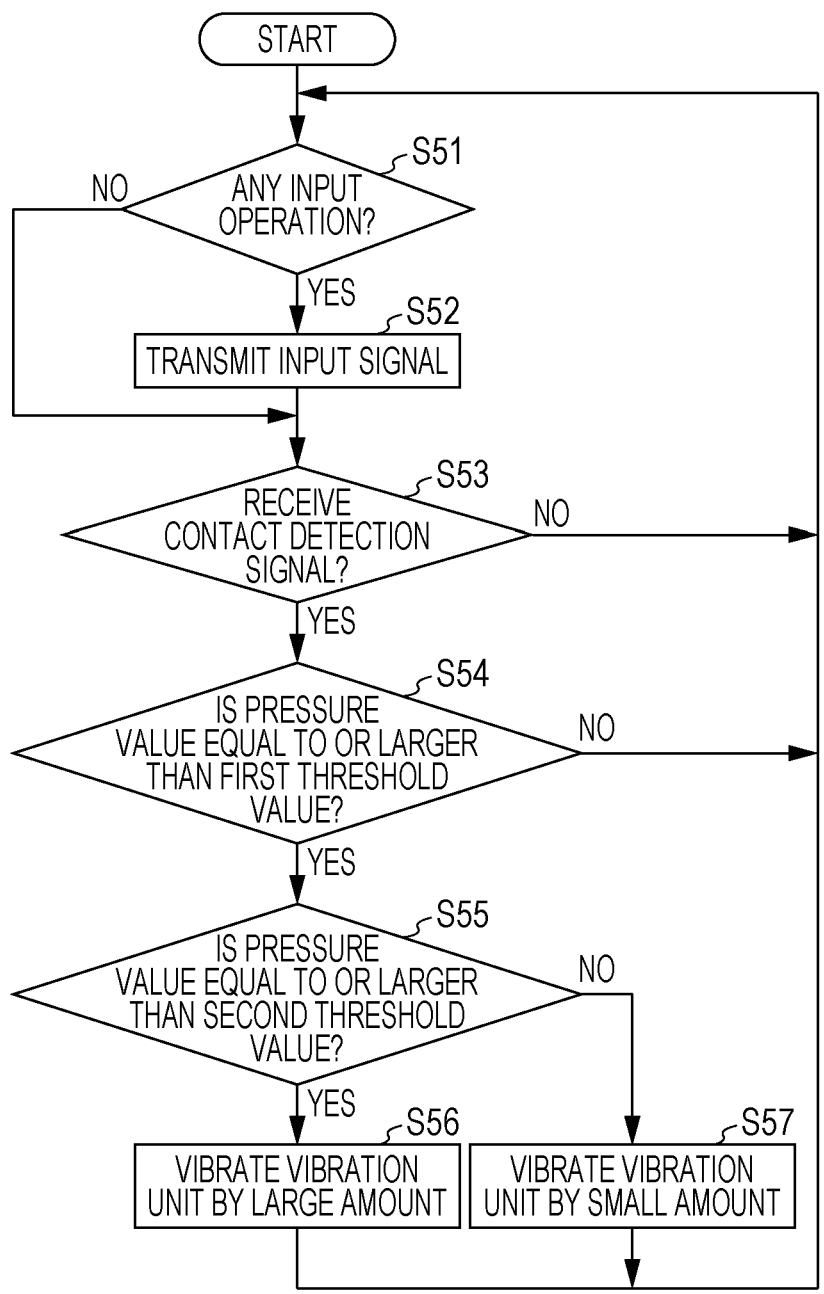
FIG. 15 is a flow chart for explaining an operation of a remote control according to Embodiment 3 of the present disclosure.

FIG. 15 is a flow chart for explaining an operation of the remote control according to Embodiment 3 of the present disclosure.

The processes in Step S51 through Step S53 in FIG. 15 are identical to those in Step S1 through Step S3 in FIG. 5, and therefore description thereof is omitted.

In a case where the communication unit 23 has received a contact detection signal (YES in Step S53), the vibration control unit 24 determines in Step S54 whether or not a pressure value included in the contact detection signal is equal to or larger than the first threshold value.

In a case where it is determined that the pressure value is smaller than the first threshold value (NO in Step S54), the procedure returns to the process in Step S51.

Meanwhile, in a case where it is determined that the pressure value is equal to or larger than the first threshold value (YES in Step S54), the vibration control unit 24 determines in Step S55 whether or not the pressure value included in the contact detection signal is equal to or larger than the second threshold value that is larger than the first threshold value.

In a case where it is determined that the pressure value is equal to or larger than the second threshold value (YES in Step S55), the vibration control unit 24 vibrates the vibration unit 22 by a large amount in Step S56. That is, in a case where it is determined that the pressure value is equal to or larger than the second threshold value, the vibration control unit 24 vibrates the vibration unit 22 by a first vibration amount.

Meanwhile, in a case where it is determined that the pressure value is smaller than the second threshold value (NO in Step S55), the vibration control unit 24 vibrates the vibration unit 22 by a small amount in Step S57. That is, in a case where it is determined that the pressure value is smaller than the second threshold value, the vibration control unit 24 vibrates the vibration unit 22 by a second vibration amount that is smaller than the first vibration amount. For example, the vibration control unit 24 vibrates the vibration unit 22 by the second vibration amount that is smaller than the first vibration amount by reducing the number of revolutions of a motor of the vibration unit 22.

In Embodiment 3, the cleaning robot 103 transmits a pressure value detected by the pressure sensor 12 to the remote control 203, and the remote control 203 determines whether or not the pressure value is equal to or larger than the first threshold value and the second threshold value and changes the amount of vibration of the vibration unit. However, the present disclosure is not limited to this. The pressing determining unit 162 of the cleaning robot 103 may determine whether or not the pressure value detected by the pressure sensor 12 is equal to or larger than the first threshold value, and in a case where it is determined that the pressure value is equal to or larger than the first threshold value, the pressing determining unit 162 may determine whether or not the pressure value is equal to or larger than the second threshold value. In a case where it is determined that the pressure value is equal to or larger than the second threshold value, the pressing determining unit 162 may transmit, to the remote control 203, a first vibration control signal for vibrating the vibration unit by a large amount. Meanwhile, in a case where it is determined that the pressure value is smaller than the second threshold value, the pressing determining unit 162 may transmit, to the remote control 203, a second vibration control signal for vibrating the vibration unit by a small amount. The vibration control unit 242 of the remote control 203 may determine whether or not the first vibration control signal has been received. In a case where it is determined that the first vibration control signal has been received, the vibration control unit 242 vibrates the vibration unit by a large amount. Meanwhile, in a case where it is determined that the first vibration control signal has not been received, the vibration control unit 242 may determine whether or not the second vibration control signal has been received. In a case where the second vibration control signal has been received, the vibration control unit 242 vibrates the vibration unit by a small amount.

In Embodiment 3, the cleaning robot 103 includes a single pressure sensor. However, the present disclosure is not limited to this. The cleaning robot 103 may include two or more pressure sensors as in Embodiment 2.

Embodiment 4

Next, a cleaning robot according to Embodiment 4 is described. The cleaning robot according to Embodiment 4 includes four pressure sensors although the cleaning robot according to Embodiment 1 includes a single pressure sensor.

Figure 16:
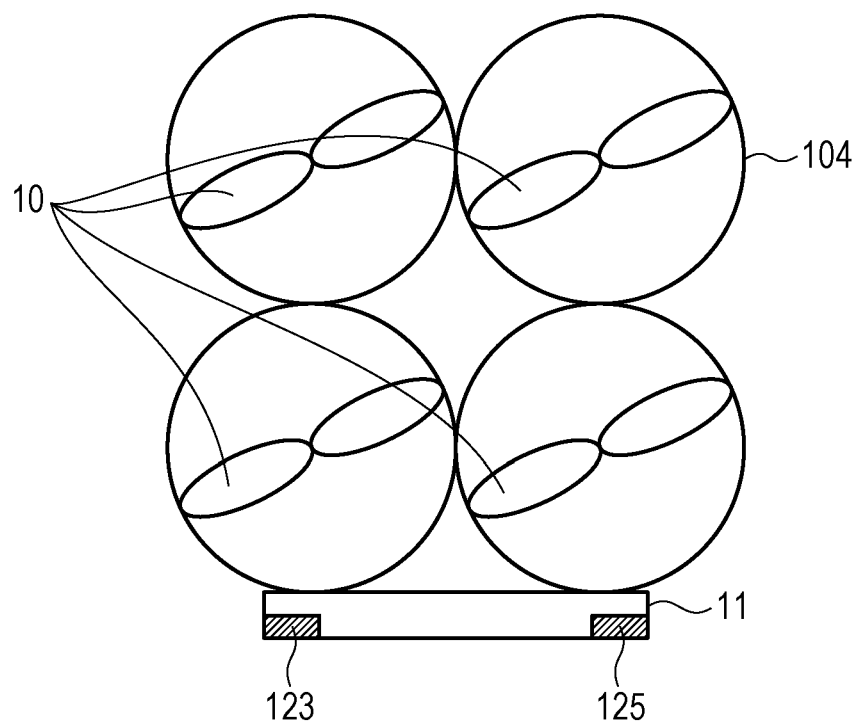
FIG. 16 is a top view illustrating an exterior configuration of a cleaning robot according to Embodiment 4 of the present disclosure.
Figure 17:
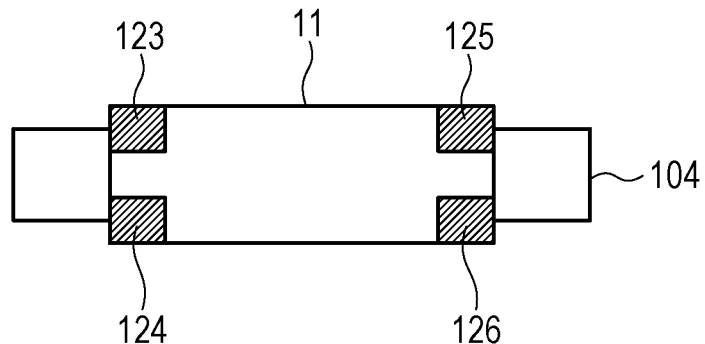
FIG. 17 is a front view illustrating an exterior configuration of a cleaning robot according to Embodiment 4 of the present disclosure.
Figure 18:
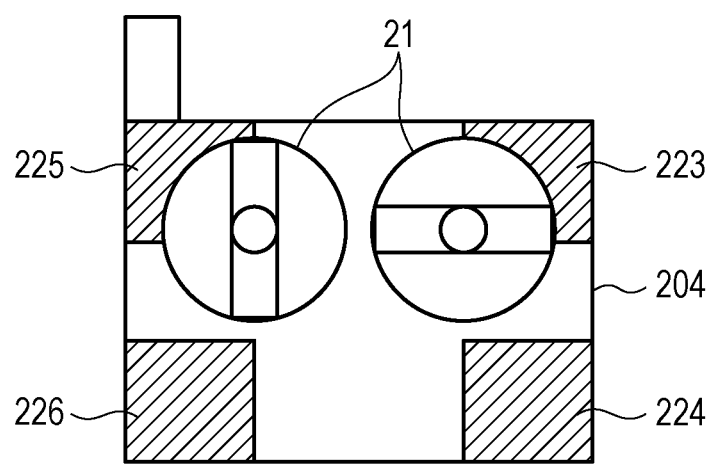
FIG. 18 is a front view illustrating an exterior configuration of a remote control according to Embodiment 4 of the present disclosure.

FIG. 16 is a top view illustrating an exterior configuration of the cleaning robot according to Embodiment 4 of the present disclosure, FIG. 17 is a front view illustrating an exterior configuration of the cleaning robot according to Embodiment 4 of the present disclosure, and FIG. 18 is a front view illustrating an exterior configuration of a remote control according to Embodiment 4 of the present disclosure. In Embodiment 4, elements that are identical to those in Embodiments 1 and 2 are given identical reference signs, and description thereof is omitted.

A cleaning robot 104 illustrated in FIGS. 16 and 17 is remotely operated by a remote control 204 and cleans a target to be cleaned that is in a remote place. The target to be cleaned is, for example, an exterior wall or a window of a house or a building. The target to be cleaned may be, for example, a ceiling.

The cleaning robot 104 is a drone. A cleaning tool 11 is provided on a front face of the cleaning robot 104.

A first pressure sensor 123, a second pressure sensor 124, a third pressure sensor 125, and a fourth pressure sensor 126 are disposed on a surface of the cleaning tool 11 that makes contact with the target to be cleaned. The first pressure sensor 123 is disposed on an upper right side of the cleaning tool 11, the second pressure sensor 124 is disposed on a lower right side of the cleaning tool 11, the third pressure sensor 125 is disposed on an upper left side of the cleaning tool 11, and the fourth pressure sensor 126 is disposed on a lower left side of the cleaning tool 11.

The first pressure sensor 123, the second pressure sensor 124, the third pressure sensor 125, and the fourth pressure sensor 126 detect pressure applied to the cleaning tool 11. The first pressure sensor 123 detects contact between an upper right portion of the cleaning tool 11 and the target to be cleaned. The second pressure sensor 124 detects contact between a lower right portion of the cleaning tool 11 and the target to be cleaned. The third pressure sensor 125 detects contact between an upper left portion of the cleaning tool 11 and the target to be cleaned. The fourth pressure sensor 126 detects contact between a lower left portion of the cleaning tool 11 and the target to be cleaned. Note that it is preferable that the first pressure sensor 123 be disposed at an upper right end of the cleaning tool 11, the second pressure sensor 124 be disposed at a lower right end of the cleaning tool 11, the third pressure sensor 125 be disposed at an upper left end of the cleaning tool 11, and the fourth pressure sensor 126 be disposed at a lower left end of the cleaning tool 11.

The remote control 204 illustrated in FIG. 18 includes an input unit 21 for remote operation of the cleaning robot 104. The remote control 204 is held by an operator with both hands. The input unit 21 includes a left stick provided on a left-hand side and a right stick provided on a right-hand side. When the operator tilts the left stick and the right stick, information concerning a tilt angle is transmitted to the cleaning robot 102, and movement of the cleaning robot 102 is controlled in accordance with the tilt angle.

A first vibration unit 223, a second vibration unit 224, a third vibration unit 225, and a fourth vibration unit 226 are disposed in the remote control 204. Each of the first vibration unit 223, the second vibration unit 224, the third vibration unit 225, and the fourth vibration unit 226 is constituted, for example, by a vibration motor. The first vibration unit 223 is disposed at an upper right end of the remote control 204 that is held by the right hand of the operator and transmits vibration to the right hand of the operator. The second vibration unit 224 is disposed at a lower right end of the remote control 204 that is held by the right hand of the operator and transmits vibration to the right hand of the operator. The third vibration unit 225 is disposed at an upper left end of the remote control 204 that is held by the left hand of the operator and transmits vibration to the left hand of the operator. The fourth vibration unit 226 is disposed at a lower left end of the remote control 204 that is held by the left hand of the operator and transmits vibration to the left hand of the operator.

The remote control 204 may be a smartphone or a tablet-type computer and accept an operator's input operation on an operation screen displayed on a touch panel.

Figure 19:
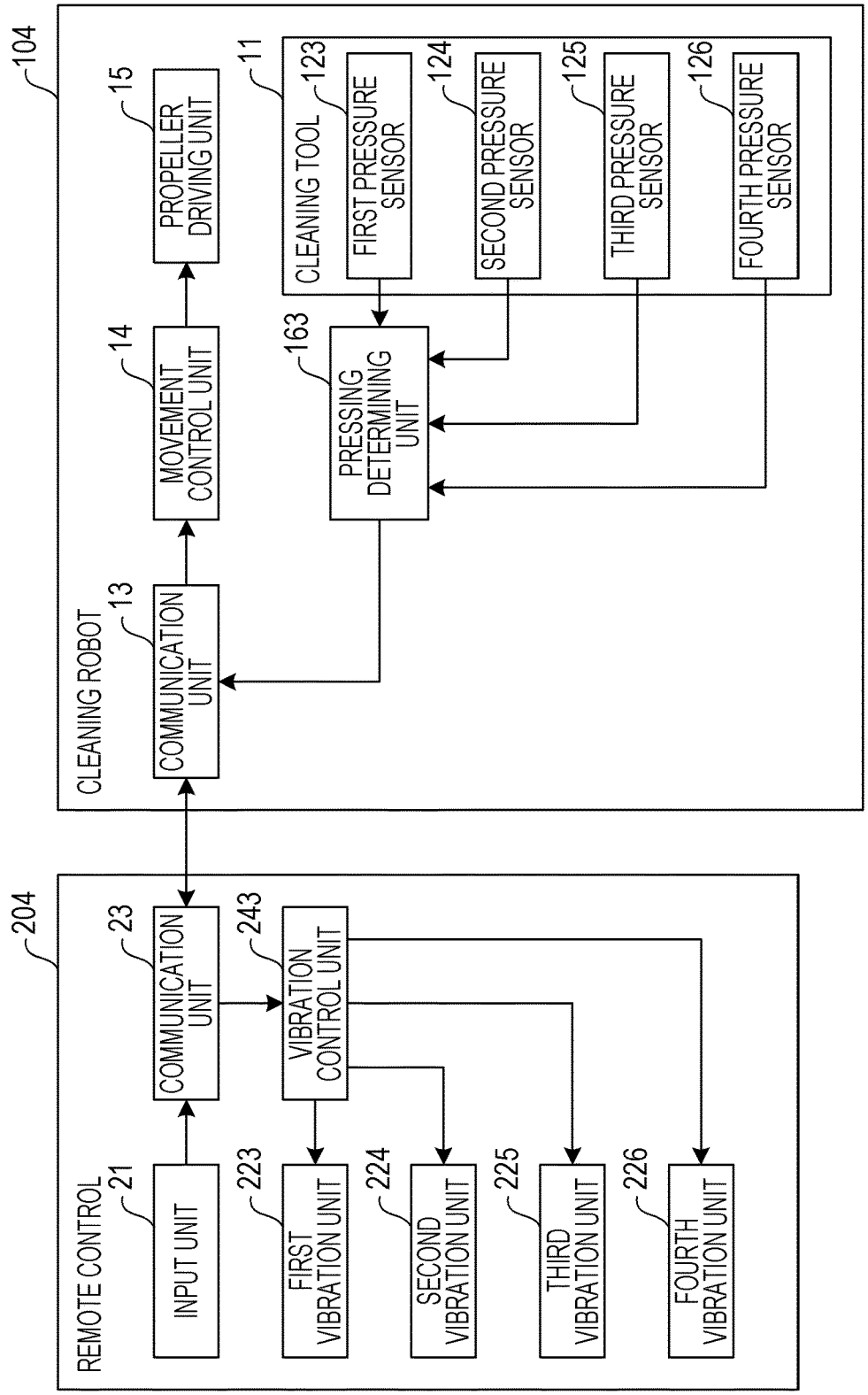
FIG. 19 is a block diagram illustrating a configuration of a cleaning system according to Embodiment 4 of the present disclosure.

FIG. 19 is a block diagram illustrating a configuration of a cleaning system according to Embodiment 4 of the present disclosure. The cleaning system illustrated in FIG. 19 includes the cleaning robot 104 and the remote control 204.

The cleaning robot 104 includes the first pressure sensor 123, the second pressure sensor 124, the third pressure sensor 125, the fourth pressure sensor 126, a communication unit 13, a movement control unit 14, a propeller driving unit 15, and a pressing determining unit 163.

The first pressure sensor 123 supplies, to the pressing determining unit 163, first sensing information indicating whether or not pressure has been detected. The second pressure sensor 124 supplies, to the pressing determining unit 163, second sensing information indicating whether or not pressure has been detected. The third pressure sensor 125 supplies, to the pressing determining unit 163, third sensing information indicating whether or not pressure has been detected. The fourth pressure sensor 126 supplies, to the pressing determining unit 163, fourth sensing information indicating whether or not pressure has been detected.

The pressing determining unit 163 determines whether or not the upper right portion of the cleaning tool 11 is in contact with the target to be cleaned on the basis of the first sensing information acquired from the first pressure sensor 123. In a case where it is determined that the upper right portion of the cleaning tool 11 is in contact with the target to be cleaned, the pressing determining unit 163 supplies, to the communication unit 13, a first contact detection signal indicating that the upper right portion of the cleaning tool 11 is in contact with the target to be cleaned.

The pressing determining unit 163 determines whether or not the lower right portion of the cleaning tool 11 is in contact with the target to be cleaned on the basis of the second sensing information acquired from the second pressure sensor 124. In a case where it is determined that the lower right portion of the cleaning tool 11 is in contact with the target to be cleaned, the pressing determining unit 163 supplies, to the communication unit 13, a second contact detection signal indicating that the lower right portion of the cleaning tool 11 is in contact with the target to be cleaned.

The pressing determining unit 163 determines whether or not the upper left portion of the cleaning tool 11 is in contact with the target to be cleaned on the basis of the third sensing information acquired from the third pressure sensor 125. In a case where it is determined that the upper left portion of the cleaning tool 11 is in contact with the target to be cleaned, the pressing determining unit 163 supplies, to the communication unit 13, a third contact detection signal indicating that the upper left portion of the cleaning tool 11 is in contact with the target to be cleaned.

The pressing determining unit 163 determines whether or not the lower left portion of the cleaning tool 11 is in contact with the target to be cleaned on the basis of the fourth sensing information acquired from the fourth pressure sensor 126. In a case where it is determined that the lower left portion of the cleaning tool 11 is in contact with the target to be cleaned, the pressing determining unit 163 supplies, to the communication unit 13, a fourth contact detection signal indicating that the lower left portion of the cleaning tool 11 is in contact with the target to be cleaned.

The pressing determining unit 163 may be realized, for example, by an integrated circuit into which the aforementioned operation of the pressing determining unit 163 is incorporated. Alternatively, a program corresponding to the aforementioned operation of the pressing determining unit 163 may be stored in a memory (not illustrated) of the cleaning robot 104, and the pressing determining unit 163 may function when a processor (not illustrated) of the cleaning robot 104 executes the program.

The communication unit 13 transmits, to the remote control 204, the first contact detection signal, the second contact detection signal, the third contact detection signal, and the fourth contact detection signal supplied by the pressing determining unit 163.

In a case where contact between the upper right portion of the cleaning tool 11 and the target to be cleaned has been detected by the first pressure sensor 123, the communication unit 13 transmits, to the remote control 204, the first contact detection signal for vibrating the upper right side of the remote control 204. In a case where contact between the lower right portion of the cleaning tool 11 and the target to be cleaned has been detected by the second pressure sensor 124, the communication unit 13 transmits, to the remote control 204, the second contact detection signal for vibrating the lower right side of the remote control 204. In a case where contact between the upper left portion of the cleaning tool 11 and the target to be cleaned has been detected by the third pressure sensor 125, the communication unit 13 transmits, to the remote control 204, the third contact detection signal for vibrating the upper left side of the remote control 204. In a case where contact between the lower left portion of the cleaning tool 11 and the target to be cleaned has been detected by the fourth pressure sensor 126, the communication unit 13 transmits, to the remote control 204, the fourth contact detection signal for vibrating the lower left side of the remote control 204.

The remote control 204 includes the input unit 21, the first vibration unit 223, the second vibration unit 224, the third vibration unit 225, the fourth vibration unit 226, a communication unit 23, and a vibration control unit 243.

The first vibration unit 223 has, for example, a first mass body and vibrates the upper right side of the remote control 204 by vibrating the first mass body in accordance with a signal received from the vibration control unit 243. The second vibration unit 224 has, for example, a second mass body and vibrates the lower right side of the remote control 204 by vibrating the second mass body in accordance with a signal received from the vibration control unit 243. The third vibration unit 225 has, for example, a third mass body and vibrates the upper left side of the remote control 204 by vibrating the third mass body in accordance with a signal received from the vibration control unit 243. The fourth vibration unit 226 has, for example, a fourth mass body and vibrates the lower left side of the remote control 204 by vibrating the fourth mass body in accordance with a signal received from the vibration control unit 243.

The communication unit 23 receives the first contact detection signal, the second contact detection signal, the third contact detection signal, and the fourth contact detection signal transmitted by the cleaning robot 104.

The vibration control unit 243 supplies, to the first vibration unit 223, a signal for vibrating the first mass body of the first vibration unit 223 in a case where the first contact detection signal has been received by the communication unit 23.

The vibration control unit 243 supplies, to the second vibration unit 224, a signal for vibrating the second mass body of the second vibration unit 224 in a case where the second contact detection signal has been received by the communication unit 23.

The vibration control unit 243 supplies, to the third vibration unit 225, a signal for vibrating the third mass body of the third vibration unit 225 in a case where the third contact detection signal has been received by the communication unit 23.

The vibration control unit 243 supplies, to the fourth vibration unit 226, a signal for vibrating the fourth mass body of the fourth vibration unit 226 in a case where the fourth contact detection signal has been received by the communication unit 23.

The first mass body, the second mass body, the third mass body, and the fourth mass body may be elastic members or may be rigid members.

The vibration control unit 243 may be realized, for example, by an integrated circuit into which the aforementioned operation of the vibration control unit 243 is incorporated. Alternatively, a program corresponding to the aforementioned operation of the vibration control unit 243 may be stored in a memory (not illustrated) of the remote control 204, and the vibration control unit 243 may function when a processor (not illustrated) of the remote control 204 executes the program.

Hereinafter, vibrating the first mass body of the first vibration unit 223 is referred to as vibrating the first vibration unit 223.

Hereinafter, vibrating the second mass body of the second vibration unit 224 is referred to as vibrating the second vibration unit 224.

Hereinafter, vibrating the third mass body of the third vibration unit 225 is referred to as vibrating the third vibration unit 225.

Hereinafter, vibrating the fourth mass body of the fourth vibration unit 226 is referred to as vibrating the fourth vibration unit 226.

Next, operations of the cleaning robot 104 and the remote control 204 according to Embodiment 4 are described.

Figure 20:
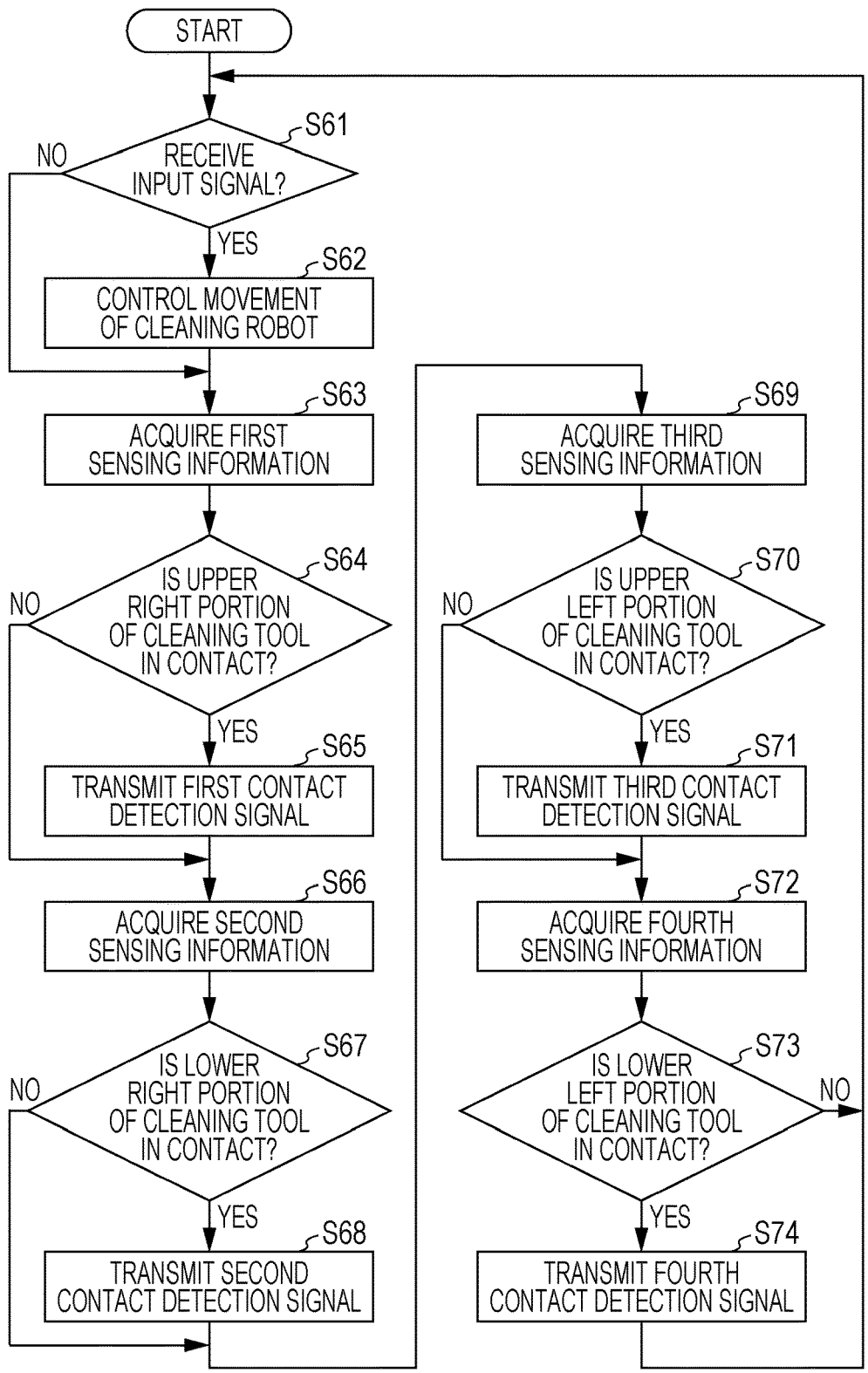
FIG. 20 is a flow chart for explaining an operation of the cleaning robot according to Embodiment 4 of the present disclosure.

FIG. 20 is a flow chart for explaining an operation of the cleaning robot according to Embodiment 4 of the present disclosure.

The processes in Step S61 and Step S62 in FIG. 20 are identical to those in Step S11 and Step S12 in FIG. 6, and therefore description thereof is omitted.

Next, in Step S63, the pressing determining unit 163 requests first sensing information from the first pressure sensor 123 and thus acquires the first sensing information from the first pressure sensor 123.

Next, in Step S64, the pressing determining unit 163 determines whether or not the upper right portion of the cleaning tool 11 is in contact with the target to be cleaned on the basis of the first sensing information acquired from the first pressure sensor 123. In a case where the first sensing information includes information indicating that pressure has been detected, the pressing determining unit 163 determines that the upper right portion of the cleaning tool 11 is in contact with the target to be cleaned. Meanwhile, in a case where the first sensing information includes information indicating that no pressure has been detected, the pressing determining unit 163 determines that the upper right portion of the cleaning tool 11 is not in contact with the target to be cleaned.

In a case where it is determined that the upper right portion of the cleaning tool 11 is not in contact with the target to be cleaned (NO in Step S64), the procedure proceeds to the process in Step S66.

Meanwhile, in a case where it is determined that the upper right portion of the cleaning tool 11 is in contact with the target to be cleaned (YES in Step S64), the communication unit 13 transmits, to the remote control 204, a first contact detection signal indicating that the upper right portion of the cleaning tool 11 is in contact with the target to be cleaned in Step S65.

Next, in Step S66, the pressing determining unit 163 requests second sensing information from the second pressure sensor 124 and thus acquires the second sensing information from the second pressure sensor 124.

Next, in Step S67, the pressing determining unit 163 determines whether or not the lower right portion of the cleaning tool 11 is in contact with the target to be cleaned on the basis of the second sensing information acquired from the second pressure sensor 124. In a case where the second sensing information includes information indicating that pressure has been detected, the pressing determining unit 163 determines that the lower right portion of the cleaning tool 11 is in contact with the target to be cleaned. Meanwhile, in a case where the second sensing information includes information indicating that no pressure has been detected, the pressing determining unit 163 determines that the lower right portion of the cleaning tool 11 is not in contact with the target to be cleaned.

In a case where it is determined that the lower right portion of the cleaning tool 11 is not in contact with the target to be cleaned (NO in Step S67), the procedure proceeds to the process in Step S69.

Meanwhile, in a case where it is determined that the lower right portion of the cleaning tool 11 is in contact with the target to be cleaned (YES in Step S67), the communication unit 13 transmits, to the remote control 204, a second contact detection signal indicating that the lower right portion of the cleaning tool 11 is in contact with the target to be cleaned in Step S68.

Next, in Step S69, the pressing determining unit 163 requests third sensing information from the third pressure sensor 125 and thus acquires the third sensing information from the third pressure sensor 125.

Next, in Step S70, the pressing determining unit 163 determines whether or not the upper left portion of the cleaning tool 11 is in contact with the target to be cleaned on the basis of the third sensing information acquired from the third pressure sensor 125. In a case where the third sensing information includes information indicating that pressure has been detected, the pressing determining unit 163 determines that the upper left portion of the cleaning tool 11 is in contact with the target to be cleaned. Meanwhile, in a case where the third sensing information includes information indicating that no pressure has been detected, the pressing determining unit 163 determines that the upper left portion of the cleaning tool 11 is not in contact with the target to be cleaned.

In a case where it is determined that the upper left portion of the cleaning tool 11 is not in contact with the target to be cleaned (NO in Step S70), the procedure proceeds to the process in Step S72.

Meanwhile, in a case where it is determined that the upper left portion of the cleaning tool 11 is in contact with the target to be cleaned (YES in Step S70), the communication unit 13 transmits, to the remote control 204, a third contact detection signal indicating that the upper left portion of the cleaning tool 11 is in contact with the target to be cleaned in Step S71.

Next, in Step S72, the pressing determining unit 163 requests fourth sensing information from the fourth pressure sensor 126 and thus acquires the fourth sensing information from the fourth pressure sensor 126.

Next, in Step S73, the pressing determining unit 163 determines whether or not the lower left portion of the cleaning tool 11 is in contact with the target to be cleaned on the basis of the fourth sensing information acquired from the fourth pressure sensor 126. In a case where the fourth sensing information includes information indicating that pressure has been detected, the pressing determining unit 163 determines that the lower left portion of the cleaning tool 11 is in contact with the target to be cleaned. In a case where the fourth sensing information includes information indicating that no pressure has been detected, the pressing determining unit 163 determines that the lower left portion of the cleaning tool 11 is not in contact with the target to be cleaned.

In a case where it is determined that the lower left portion of the cleaning tool 11 is not in contact with the target to be cleaned (NO in Step S73), the procedure returns to the process in Step S61.

Meanwhile, in a case where it is determined that the lower left portion of the cleaning tool 11 is in contact with the target to be cleaned (YES in Step S73), the communication unit 13 transmits, to the remote control 204, a fourth contact detection signal indicating that the lower left portion of the cleaning tool 11 is in contact with the target to be cleaned in Step S74.

Figure 21:
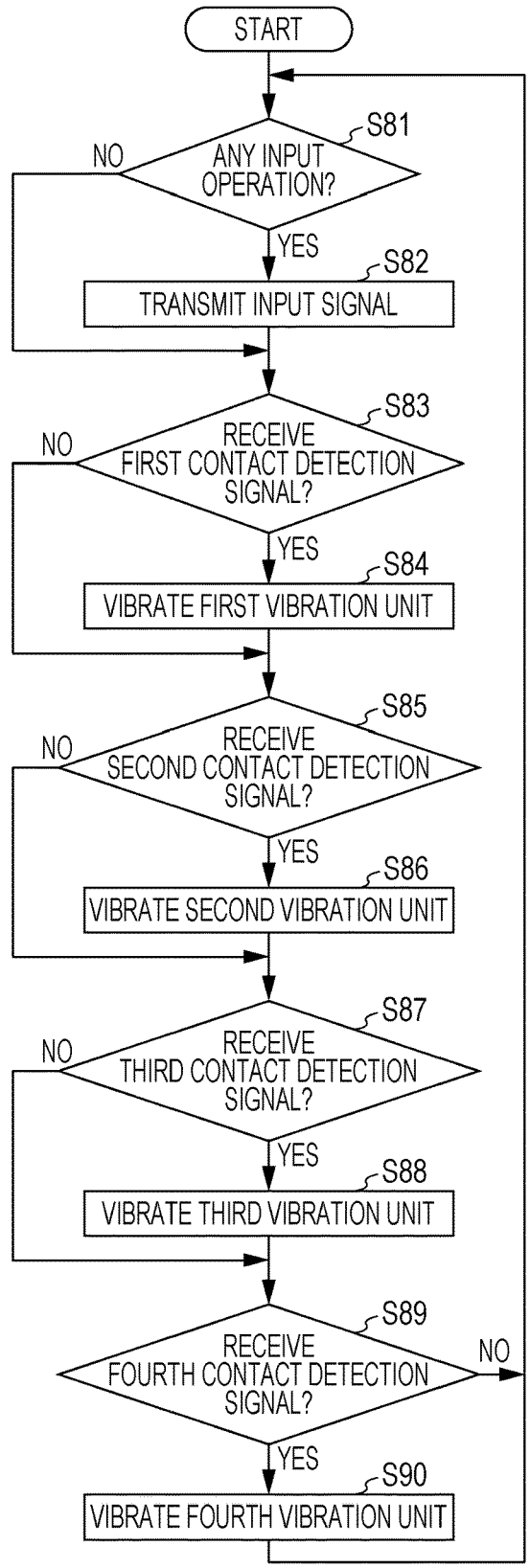
FIG. 21 is a flow chart for explaining an operation of the remote control according to Embodiment 4 of the present disclosure.

FIG. 21 is a flow chart for explaining an operation of the remote control according to Embodiment 4 of the present disclosure.

The processes in Step S81 and Step S82 in FIG. 21 are identical to those in Step S1 and Step S2 in FIG. 5, and therefore description thereof is omitted.

Next, in Step S83, the vibration control unit 243 determines whether or not the communication unit 23 has received the first contact detection signal transmitted by the cleaning robot 104. In a case where it is determined that the communication unit 23 has not received the first contact detection signal (NO in Step S83), the procedure proceeds to the process in Step S85.

Meanwhile, in a case where it is determined that the communication unit 23 has received the first contact detection signal (YES in Step S83), the vibration control unit 243 vibrates the first vibration unit 223 in Step S84. This vibrates the upper right portion of the remote control 204, and the vibration is transmitted to the right hand of the operator. As a result, the operator can be notified of contact between the upper right portion of the cleaning tool 11 and the target to be cleaned.

Next, in Step S85, the vibration control unit 243 determines whether or not the communication unit 23 has received the second contact detection signal transmitted by the cleaning robot 104. In a case where it is determined that the communication unit 23 has not received the second contact detection signal (NO in Step S85), the procedure proceeds to the process in Step S87.

Meanwhile, in a case where it is determined that the communication unit 23 has received the second contact detection signal (YES in Step S85), the vibration control unit 243 vibrates the second vibration unit 224 in Step S86. This vibrates the lower right portion of the remote control 204, and the vibration is transmitted to the right hand of the operator. As a result, the operator can be notified of contact between the lower right portion of the cleaning tool 11 and the target to be cleaned.

Next, in Step S87, the vibration control unit 243 determines whether or not the communication unit 23 has received the third contact detection signal transmitted by the cleaning robot 104. In a case where it is determined that the communication unit 23 has not received the third contact detection signal (NO in Step S87), the procedure proceeds to the process in Step S89.

Meanwhile, in a case where it is determined that the communication unit 23 has received the third contact detection signal (YES in Step S87), the vibration control unit 243 vibrates the third vibration unit 225 in Step S88. This vibrates the upper left portion of the remote control 204, and the vibration is transmitted to the left hand of the operator. As a result, the operator can be notified of contact between the upper left portion of the cleaning tool 11 and the target to be cleaned.

Next, in Step S89, the vibration control unit 243 determines whether or not the communication unit 23 has received the fourth contact detection signal transmitted by the cleaning robot 104. In a case where it is determined that the communication unit 23 has not received the fourth contact detection signal (NO in Step S89), the procedure returns to the process in Step S81.

Meanwhile, in a case where it is determined that the communication unit 23 has received the fourth contact detection signal (YES in Step S89), the vibration control unit 243 vibrates the fourth vibration unit 226 in Step S90. This vibrates the lower left portion of the remote control 204, and the vibration is transmitted to the left hand of the operator. As a result, the operator can be notified of contact between the lower left portion of the cleaning tool 11 and the target to be cleaned.

In Embodiment 4, it is also possible to employ an arrangement in which a pressure value is detected by each pressure sensor and each vibration unit changes the amount of vibration in accordance with the pressure value, as in Embodiment 3.

Embodiment 5

Next, a cleaning robot according to Embodiment 5 is described. In Embodiment 5, the cleaning robot includes an imaging unit that takes an image of surroundings of the cleaning robot, and a remote control displays the image taken by the imaging unit.

Figure 22:
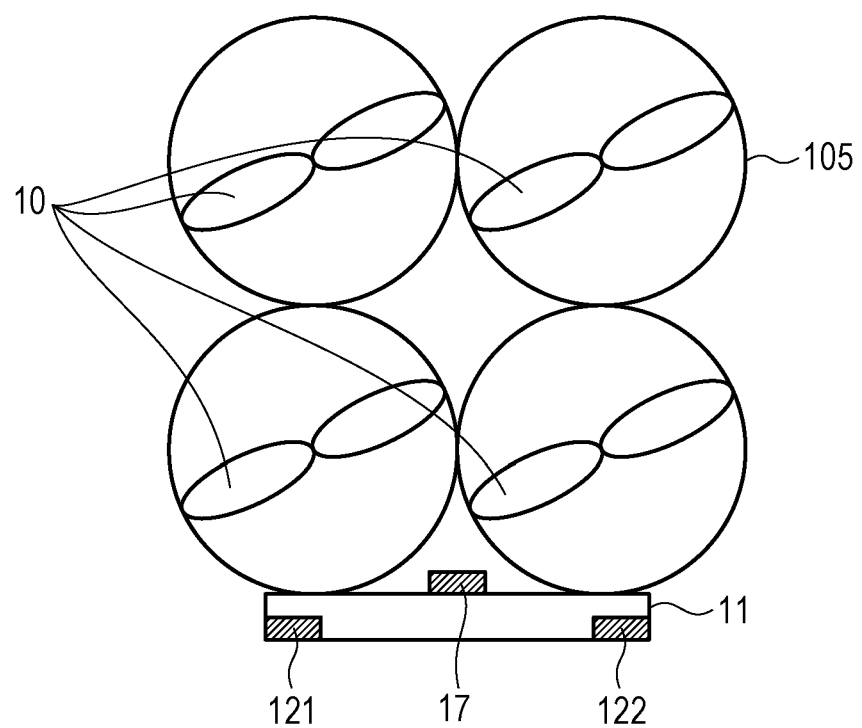
FIG. 22 is a top view illustrating an exterior configuration of a cleaning robot according to Embodiment 5 of the present disclosure.
Figure 23:
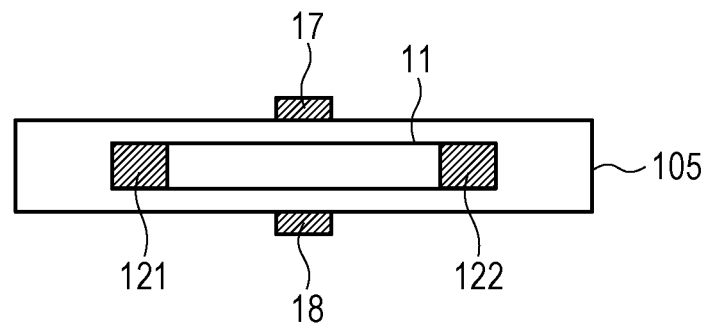
FIG. 23 is a front view illustrating an exterior configuration of the cleaning robot according to Embodiment 5 of the present disclosure.
Figure 24:
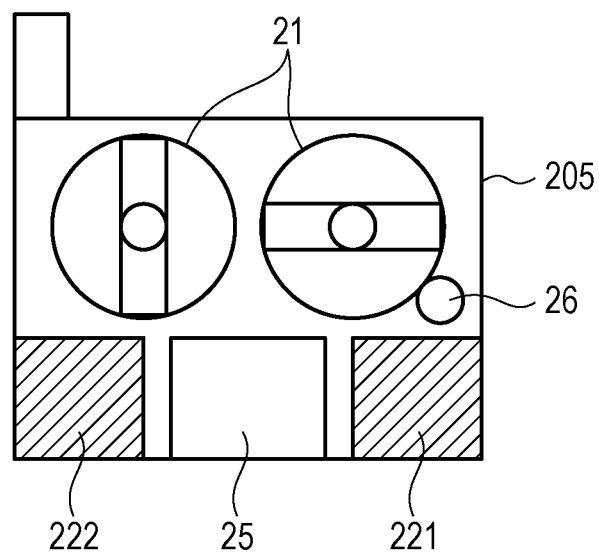
FIG. 24 is a front view illustrating an exterior configuration of a remote control according to Embodiment 5 of the present disclosure.

FIG. 22 is a top view illustrating an exterior configuration of the cleaning robot according to Embodiment 5 of the present disclosure, FIG. 23 is a front view illustrating an exterior configuration of the cleaning robot according to Embodiment 5 of the present disclosure, and FIG. 24 is a front view illustrating an exterior configuration of a remote control according to Embodiment 5 of the present disclosure. In Embodiment 5, elements that are identical to those in Embodiment 2 are given identical reference signs, and description thereof is omitted.

A cleaning robot 105 illustrated in FIGS. 22 and 23 is remotely operated by a remote control 205 and cleans a target to be cleaned that is in a remote place. The target to be cleaned is, for example, an exterior wall or a window of a house or a building. The target to be cleaned may be, for example, a ceiling.

The cleaning robot 105 is a drone. A cleaning tool 11 is provided on a front face of the cleaning robot 105.

A first pressure sensor 121 and a second pressure sensor 122 are provided on a surface of the cleaning tool 11 that makes contact with a target to be cleaned.

Furthermore, a first camera 17 that takes an image of surroundings of an upper-surface side of the cleaning robot 105 is disposed on an upper portion of the cleaning robot 105, and a second camera 18 that takes an image of surroundings of a lower-surface side of the cleaning robot 105 is disposed on a lower portion of the cleaning robot 105. The first camera 17 and the second camera 18 are, for example, PTZ (pan/tilt/zoom) cameras. The first camera 17 and the second camera 18 move lenses thereof leftward, rightward, upward, and downward and change focal distances of the lenses.

The remote control 205 illustrated in FIG. 24 includes an input unit 21 for remote operation of the cleaning robot 105. The remote control 205 is held by an operator with both hands. The input unit 21 includes a left stick provided on a left-hand side and a right stick provided on a right-hand side. When the operator tilts the left stick and the right stick, information concerning a tilt angle is transmitted to the cleaning robot 105, and movement of the cleaning robot 105 is controlled in accordance with the tilt angle.

Furthermore, the remote control 205 includes an image switching button 26 for switching an imaging mode between a first imaging mode for imaging of a traveling direction of the cleaning robot 105 and a second imaging mode for imaging of the target to be cleaned which is a destination of the cleaning tool 11. For example, in a case where the image switching button 26 is turned on, the imaging mode is switched to the first imaging mode, whereas in a case where the image switching button 26 is turned off, the imaging mode is switched to the second imaging mode.

A first vibration unit 221 and a second vibration unit 222 are disposed in the remote control 205.

Furthermore, the remote control 205 includes a display unit 25 that displays an image taken by the first camera 17 or the second camera 18 of the cleaning robot 105. The display unit 25 is, for example, a liquid crystal display device.

Note that the remote control 205 may be a smartphone or a tablet-type computer and accept an operator's input operation displayed on an operation screen displayed on a touch panel.

Figure 25:
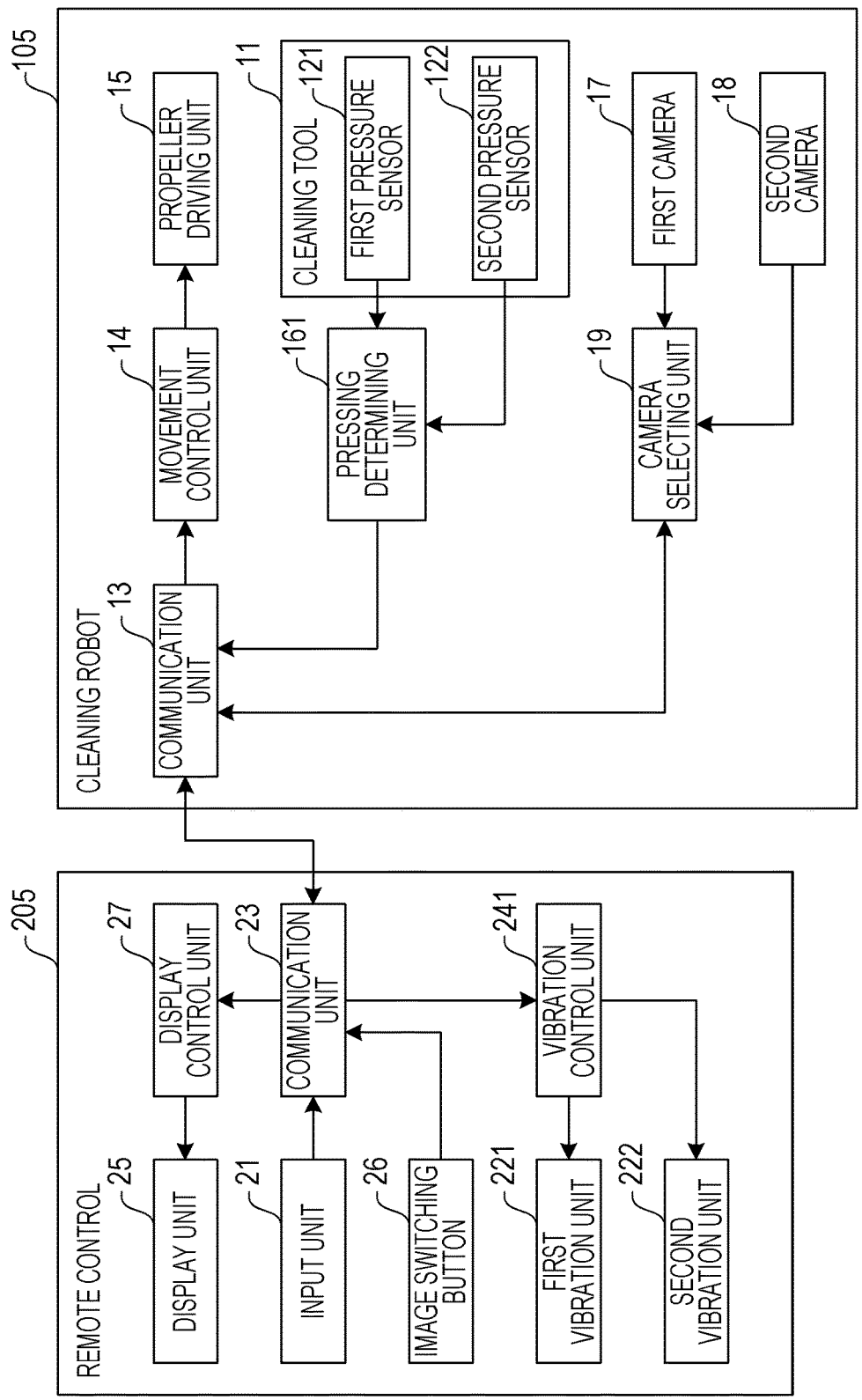
FIG. 25 is a block diagram illustrating a configuration of a cleaning system according to Embodiment 5 of the present disclosure.

FIG. 25 is a block diagram illustrating a configuration of a cleaning system according to Embodiment 5 of the present disclosure. The cleaning system illustrated in FIG. 25 includes the cleaning robot 105 and the remote control 205.

The cleaning robot 105 includes the first pressure sensor 121, the second pressure sensor 122, a communication unit 13, a movement control unit 14, a propeller driving unit 15, the first camera 17, the second camera 18, a camera selecting unit 19, and a pressing determining unit 161.

The communication unit 13 receives mode selection information indicating which of the first imaging mode for imaging of a traveling direction of the cleaning robot 105 and the second imaging mode for imaging of the target to be cleaned which is a destination of the cleaning tool 11 has been selected.

The camera selecting unit 19 selects the image taken by the first camera 17 or the image taken by the second camera 18 on the basis of the traveling direction of the cleaning robot 105 in a case where the first imaging mode is being selected, and then supplies the selected image to the communication unit 13.

The camera selecting unit 19 selects the image taken by the first camera 17 in a case where the second imaging mode is being selected and then supplies the selected image to the communication unit 13. In this case, the first camera 17 takes an image of the target to be cleaned which is a destination of the cleaning tool 11.

The camera selecting unit 19 may be realized, for example, by an integrated circuit into which the aforementioned operation of the camera selecting unit 19 is incorporated. Alternatively, a program corresponding to the aforementioned operation of the camera selecting unit 19 may be stored in a memory (not illustrated) of the cleaning robot 105, and the camera selecting unit 19 may function when a processor (not illustrated) of the cleaning robot 105 executes the program.

The communication unit 13 transmits the image supplied from the first camera 17 or the second camera 18 to the remote control 205 so that information indicating whether or not the cleaning tool 11 and the target to be cleaned are in contact with each other is displayed on the remote control 205 so as to be superimposed on the image.

The remote control 205 includes the input unit 21, the first vibration unit 221, the second vibration unit 222, a communication unit 23, the display unit 25, the image switching button 26, a display control unit 27, and a vibration control unit 241.

The image switching button 26 accepts selection of the first imaging mode for imaging of the traveling direction of the cleaning robot 105 and the second imaging mode for imaging of the target to be cleaned which is a destination of the cleaning tool 11. In a case where the image switching button 26 is turned on, the first imaging mode is selected, whereas in a case where the image switching button 26 is turned off, the second imaging mode is selected. The communication unit 23 transmits, to the cleaning robot 105, mode selection information indicating which of the first imaging mode and the second imaging mode has been selected. Note that the communication unit 23 transmits the mode selection information when ON/OFF of the image switching button 26 is switched. The camera selecting unit 19 of the cleaning robot 105 may store therein selection of the first imaging mode or the second imaging mode on the basis of the mode selection information.

The communication unit 23 receives the image transmitted by the cleaning robot 105.

The display control unit 27 causes the image received by the communication unit 23 to be displayed on the display unit 25. The display control unit 27 causes the information indicating whether or not the cleaning tool 11 and the target to be cleaned are in contact with each other to be displayed so as to be superimposed on the image supplied from the first camera 17 or the second camera 18.

The display control unit 27 may be realized, for example, by an integrated circuit into which the aforementioned operation of the display control unit 27 is incorporated. Alternatively, a program corresponding to the aforementioned operation of the display control unit 27 may be stored in a memory (not illustrated) of the remote control 205, and the display control unit 27 may function when a processor (not illustrated) of the remote control 205 executes the program.

Next, operations of the cleaning robot 105 and the remote control 205 according to Embodiment 5 are described.

Figure 26:
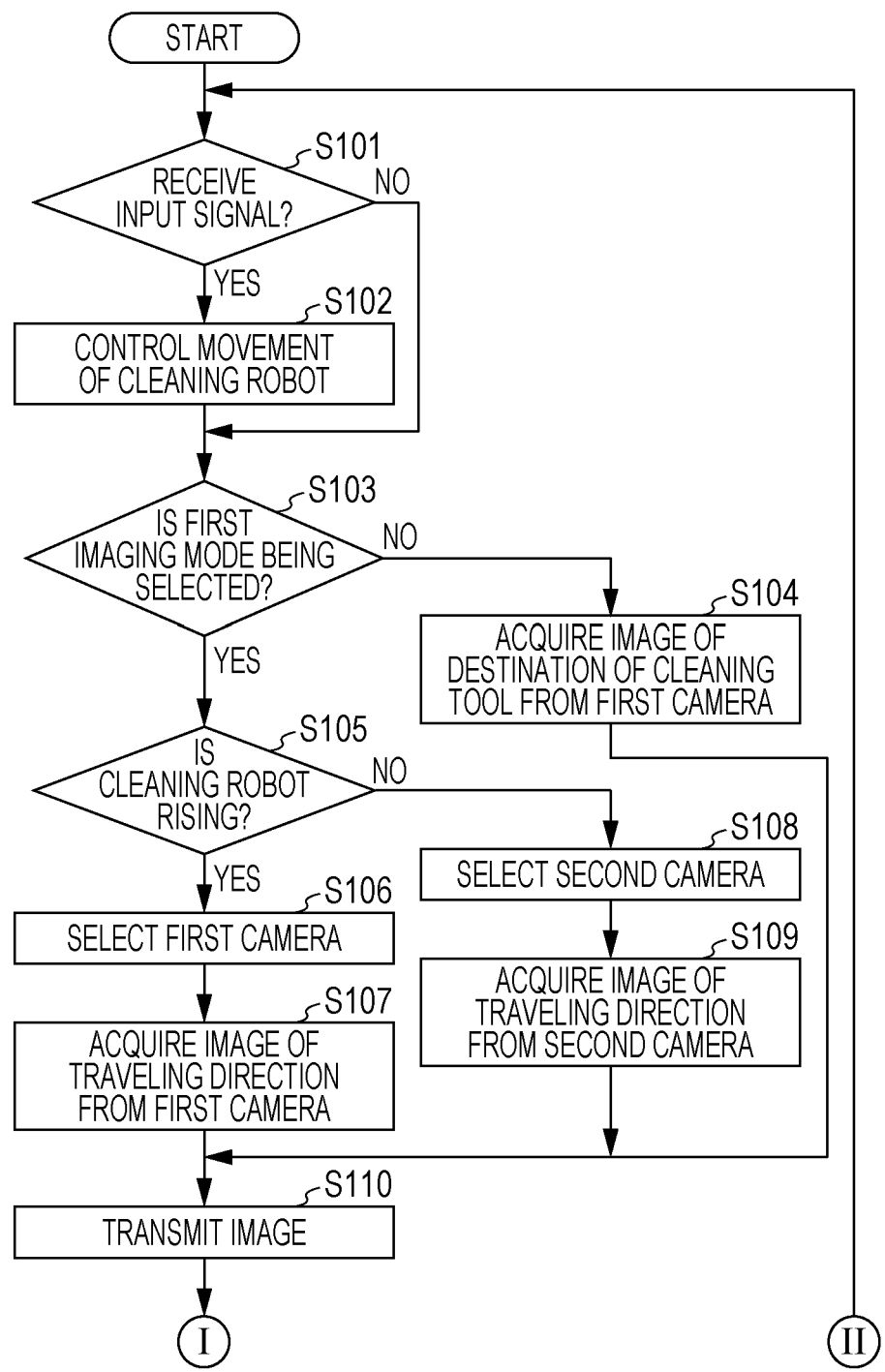
FIG. 26 is a first flow chart for explaining an operation of the cleaning robot according to Embodiment 5 of the present disclosure.
Figure 27:
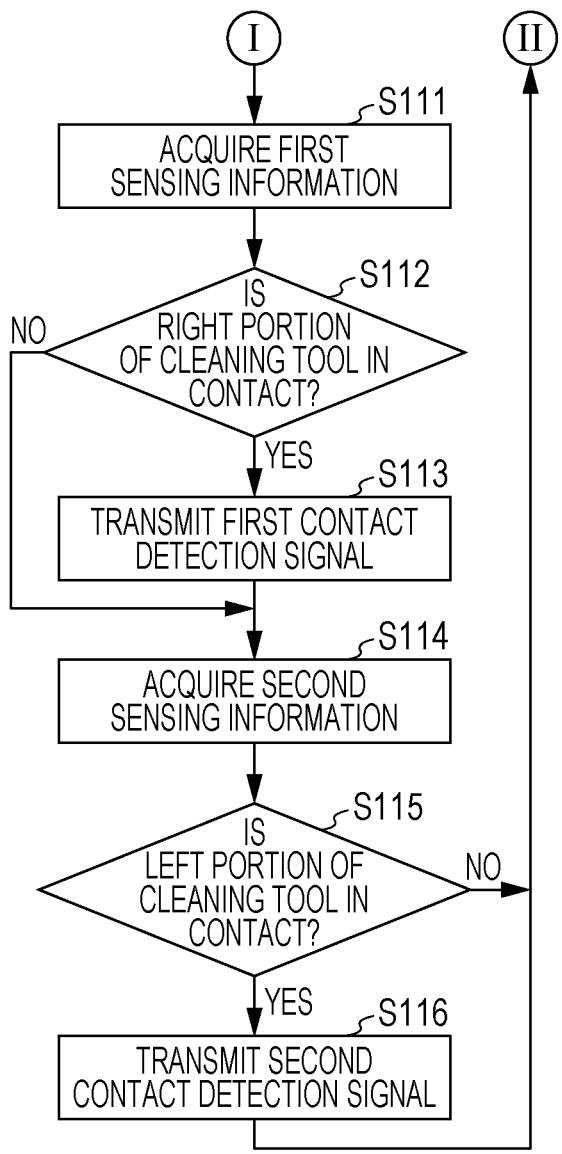
FIG. 27 is a second flow chart for explaining an operation of the cleaning robot according to Embodiment 5 of the present disclosure.

FIG. 26 is a first flow chart for explaining an operation of the cleaning robot according to Embodiment 5 of the present disclosure, and FIG. 27 is a second flow chart for explaining an operation of the cleaning robot according to Embodiment 5 of the present disclosure.

The processes in Step S101 and Step S102 in FIG. 26 are identical to those in Step S11 and Step S12 in FIG. 6, and therefore description thereof is omitted.

Next, in Step S103, the camera selecting unit 19 determines whether or not the first imaging mode is being selected. In a case where it is determined that the first imaging mode is not being selected, i.e., in a case where the second imaging mode is being selected (NO in Step S103), the camera selecting unit 19 acquires an image of the destination of the cleaning tool 11 from the first camera 17 in Step S104.

Meanwhile, in a case where the first imaging mode is being selected (YES in Step S103), the camera selecting unit 19 determines whether or not the cleaning robot 105 is rising in Step S105. In a case where it is determined that the cleaning robot 105 is rising (YES in Step S105), the camera selecting unit 19 selects the first camera 17 in Step S106.

Next, in Step S107, the camera selecting unit 19 acquires an image of the traveling direction from the first camera 17.

Meanwhile, in a case where it is determined that the cleaning robot 105 is not rising (NO in Step S105), the camera selecting unit 19 selects the second camera 18 in Step S108.

Next, in Step S109, the camera selecting unit 19 acquires an image of the traveling direction from the second camera 18.

Next, in Step S110, the communication unit 13 transmits the image acquired by the camera selecting unit 19 to the remote control 205.

The processes in Step S111 through Step S116 in FIG. 27 are identical to those in Step S33 through Step S38 in FIG. 12, and therefore description thereof is omitted.

Figure 28:
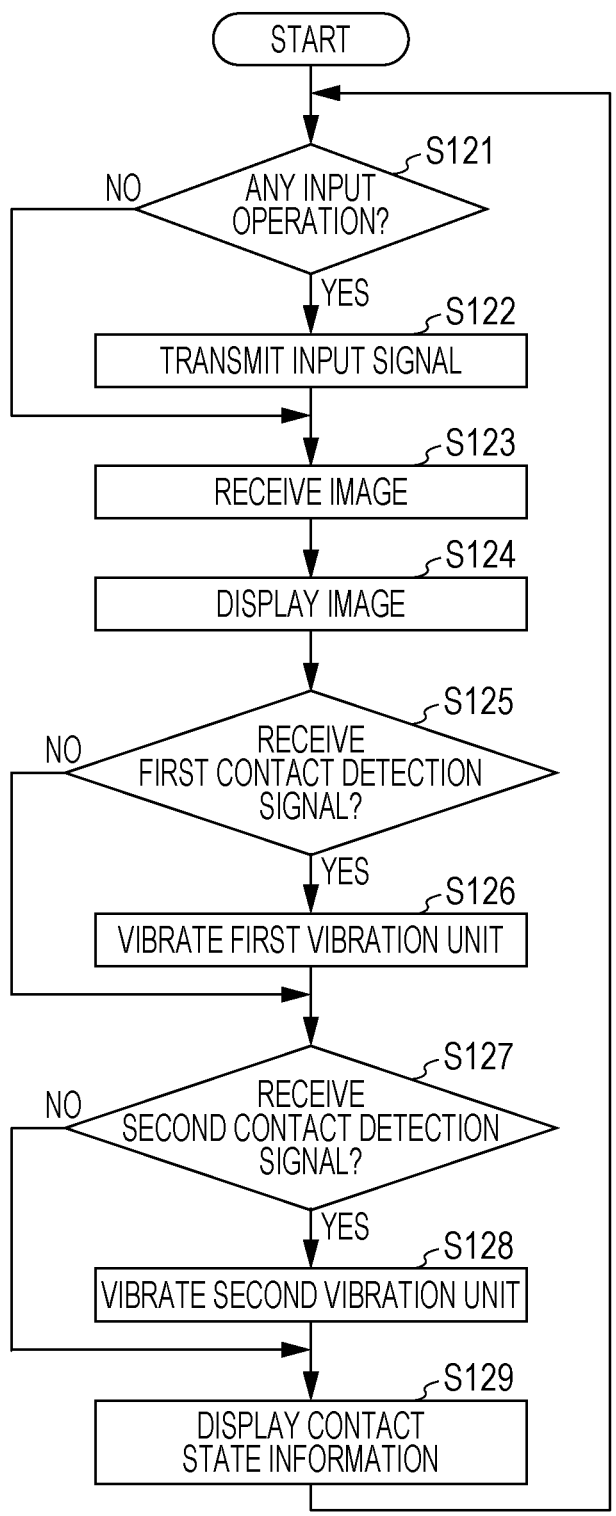
FIG. 28 is a flow chart for explaining an operation of the remote control according to Embodiment 5 of the present disclosure.

FIG. 28 is a flow chart for explaining an operation of the remote control according to Embodiment 5 of the present disclosure.

The processes in Step S121 and Step S122 in FIG. 28 are identical to those in Step S1 and Step S2 in FIG. 5, and therefore description thereof is omitted.

Next, in Step S123, the communication unit 23 receives the image transmitted from the cleaning robot 105.

Next, in Step S124, the display control unit 27 causes the image received by the communication unit 23 to be displayed on the display unit 25.

The processes in Step S125 through Step S127 in FIG. 28 are identical to those in Step S23 through Step S25 in FIG. 11, and therefore description thereof is omitted.

In a case where it is determined in Step S127 that the communication unit 23 has not received the second contact detection signal (NO in Step S127), the procedure proceeds to the process in Step S129.

Meanwhile, in a case where it is determined that the communication unit 23 has received the second contact detection signal (YES in Step S127), the vibration control unit 241 vibrates the second vibration unit 222 in Step S128.

Next, in Step S129, the display control unit 27 causes contact state information indicating whether or not the right portion of the cleaning tool 11 and the target to be cleaned are in contact with each other and contact state information indicating whether or not the left portion of the cleaning tool 11 and the target to be cleaned are in contact with each other to be displayed on the display unit 25 so as to be superimposed on the image.

Figure 29:
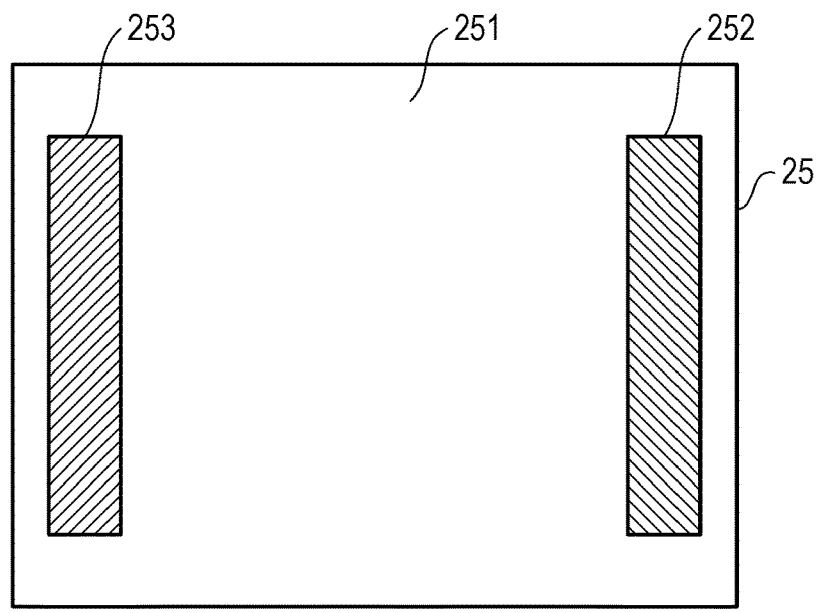
FIG. 29 is a diagram illustrating an example of an image and contact state information displayed on a display unit according to Embodiment 5 of the present disclosure.

FIG. 29 is a diagram illustrating an example of the image and the contact state information displayed on the display unit in Embodiment 5 of the present disclosure.

As illustrated in FIG. 29, an image 251 received from the cleaning robot 105 is displayed on a screen of the display unit 25. Furthermore, a band-like first contact state display region 252 is displayed on a right side of the screen. The first contact state display region 252 represents the contact state information indicating whether or not the right portion of the cleaning tool 11 and the target to be cleaned are in contact with each other. For example, in a case where the right portion of the cleaning tool 11 and the target to be cleaned are in contact with each other, the first contact state display region 252 is displayed in blue. Meanwhile, in a case where the right portion of the cleaning tool 11 and the target to be cleaned are not in contact with each other, the first contact state display region 252 is displayed in red.

Furthermore, a band-like second contact state display region 253 is displayed on a left side of the screen. The second contact state display region 253 represents the contact state information indicating whether or not the left portion of the cleaning tool 11 and the target to be cleaned are in contact with each other. For example, in a case where the left portion of the cleaning tool 11 and the target to be cleaned are in contact with each other, the second contact state display region 253 is displayed in blue. Meanwhile, in a case where the left portion of the cleaning tool 11 and the target to be cleaned are not in contact with each other, the second contact state display region 253 is displayed in red.

By thus changing a display form depending on whether or not the cleaning tool 11 and the target to be cleaned are in contact with each other, the operator can confirm whether or not the cleaning tool 11 and the target to be cleaned are in contact with each other not only by vibration but also by the screen displayed on the display unit 25.

Note that the first camera 17 and the second camera 18 may take an image of a contact position where the cleaning tool 11 and the target to be cleaned are in contact with each other. Furthermore, the first camera 17 or the second camera 18 may take an image of a contact position where the cleaning tool 11 and the target to be cleaned are in contact with each other in a case where contact between the cleaning tool 11 and the target to be cleaned has been detected by the pressing determining unit 161 and may take an image of the target to be cleaned which is a destination of the cleaning tool 11 in a case where contact between the cleaning tool 11 and the target to be cleaned has not been detected by the pressing determining unit 161.

In Embodiment 5, in a case where the second imaging mode is being selected, the camera selecting unit 19 selects an image taken by the first camera 17 and then supplies the selected image to the communication unit 13. However, the present disclosure is not limited to this. In a case where the second imaging mode is being selected, the camera selecting unit 19 may select an image taken by the second camera 18 and then supply the selected image to the communication unit 13. In this case, the second camera 18 takes an image of the target to be cleaned which is a destination of the cleaning tool 11.

Embodiment 6

Next, a cleaning robot according to Embodiment 6 is described. In Embodiments 1 through 5, a pressure sensor is disposed only in a cleaning tool. Meanwhile, in Embodiment 6, a pressure sensor that detects contact between a cleaning robot and an object other than a target to be cleaned is additionally disposed at a position other than a contact surface between a cleaning tool and the target to be cleaned.

Figure 30:
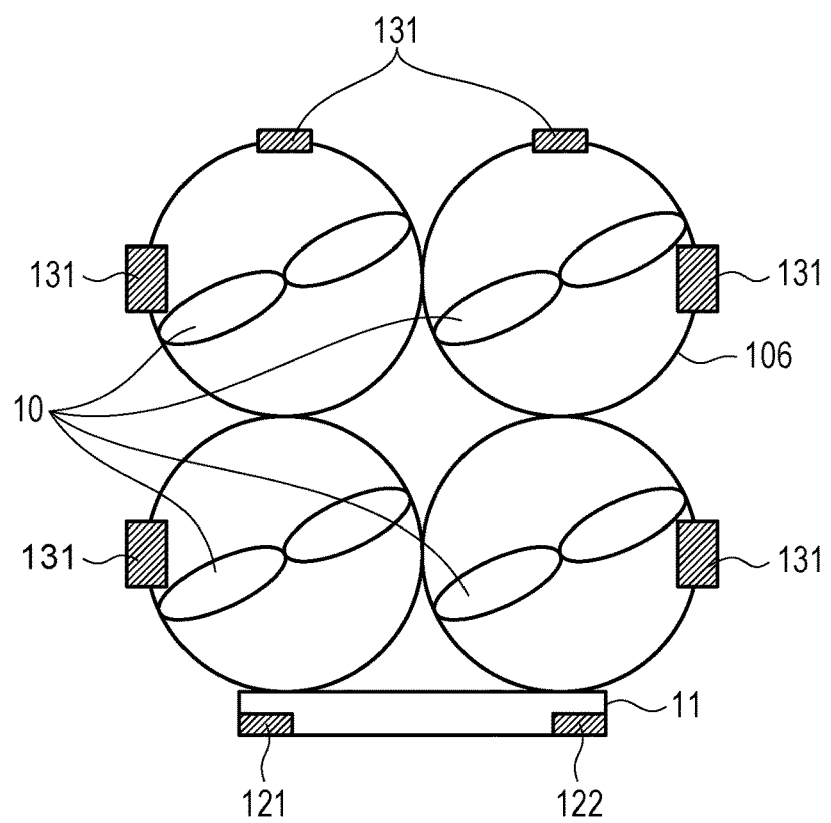
FIG. 30 is a top view illustrating an exterior configuration of a cleaning robot according to Embodiment 6 of the present disclosure.
Figure 31:
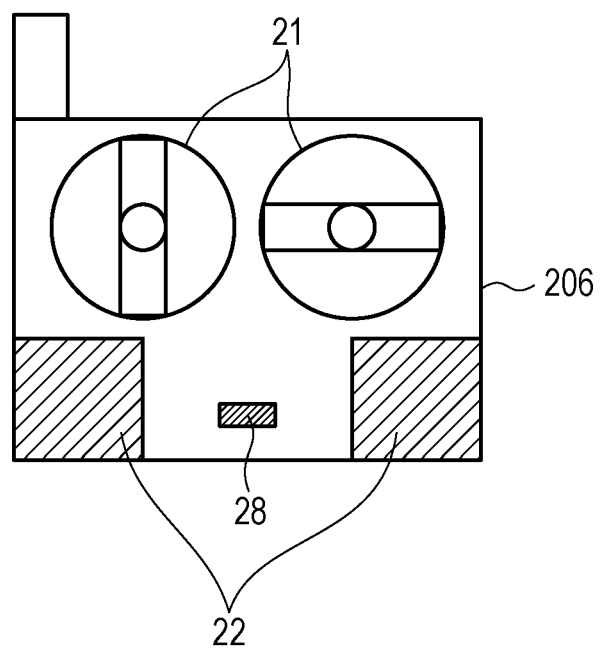
FIG. 31 is a front view illustrating an exterior configuration of a remote control according to Embodiment 6 of the present disclosure.

FIG. 30 is a top view illustrating an exterior configuration of the cleaning robot according to Embodiment 6 of the present disclosure, and FIG. 31 is a front view illustrating an exterior configuration of a remote control according to Embodiment 6 of the present disclosure. In Embodiment 6, elements that are identical to those in Embodiments 1 and 2 are given identical reference signs, and description thereof is omitted.

A cleaning robot 106 illustrated in FIG. 30 is remotely operated by a remote control 206 and cleans a target to be cleaned that is in a remote place. The target to be cleaned is, for example, an exterior wall or a window of a house or a building. The target to be cleaned may be, for example, a ceiling.

The cleaning robot 106 is a drone. A cleaning tool 11 is provided on a front face of the cleaning robot 106.

A first pressure sensor 121 and a second pressure sensor 122 are disposed on a surface of the cleaning tool 11 that makes contact with the target to be cleaned.

Furthermore, a pressure sensor group 131 including a plurality of pressure sensors is disposed on a surface other than the surface of the cleaning tool 11 that makes contact with the target to be cleaned. For example, two pressure sensors are disposed side by side in a horizontal direction on a right side surface of the cleaning robot 106, two pressure sensors are disposed side by side in a horizontal direction on a left side surface of the cleaning robot 106, and two pressure sensors are disposed side by side in a horizontal direction on a rear surface of the cleaning robot 106. Note that the position of the pressure sensor group 131 is not limited in particular. The pressure sensor group 131 is preferably disposed on a surface that has a possibility of making contact with an object.

The remote control 206 illustrated in FIG. 31 includes an input unit 21 for remote operation of the cleaning robot 106. The remote control 206 is held by an operator with both hands. The input unit 21 includes a left stick provided on a left-hand side and a right stick provided on a right-hand side. When the operator tilts the left stick and the right stick, information concerning a tilt angle is transmitted to the cleaning robot 106, and movement of the cleaning robot 106 is controlled in accordance with the tilt angle.

A vibration unit 22 is disposed in the remote control 206.

Furthermore, the remote control 206 includes a speaker 28 that outputs sound.

Note that the remote control 206 may be a smartphone or a tablet-type computer and accept an operator's input operation on an operation screen displayed on a touch panel.

Figure 32:
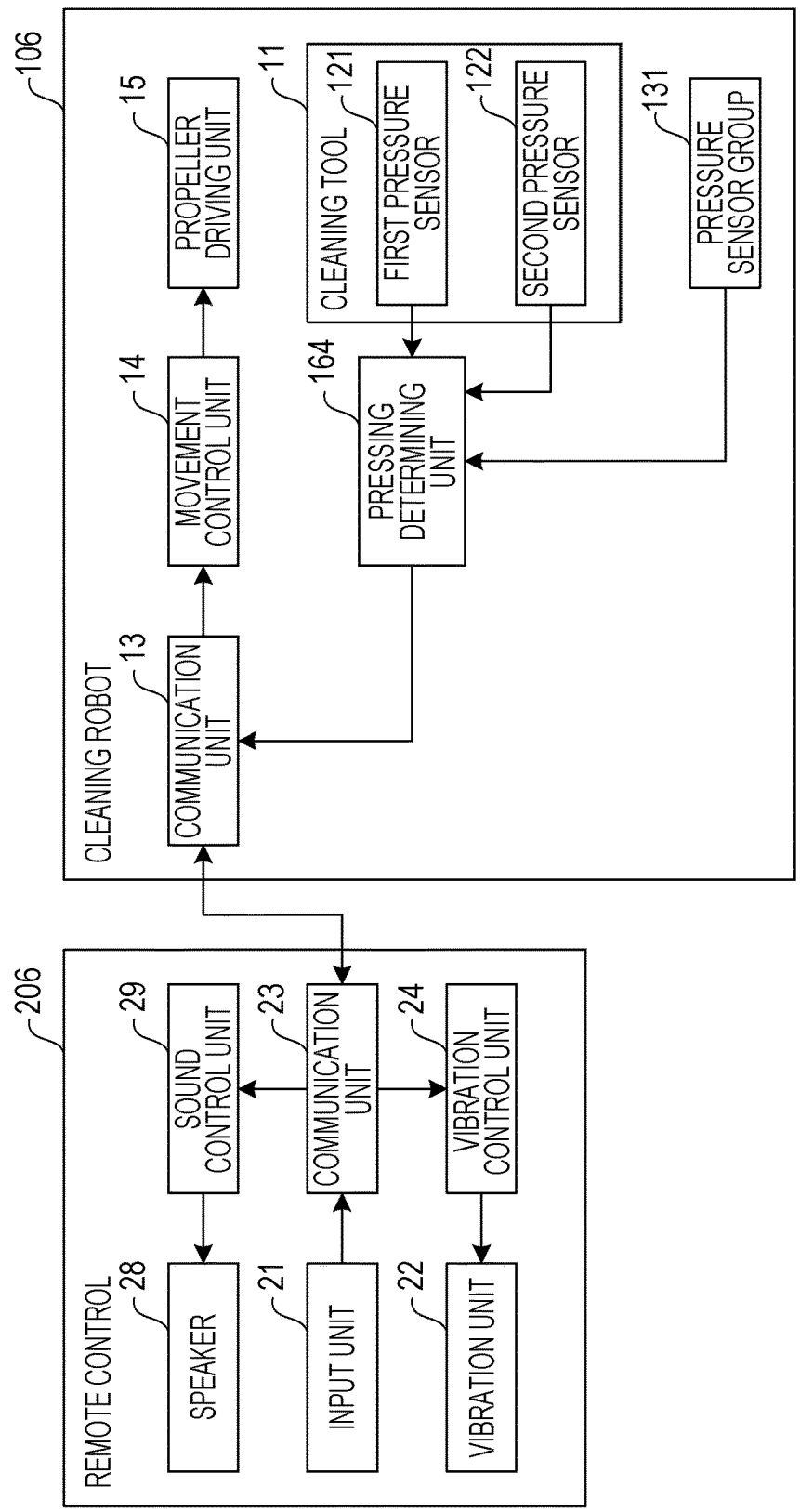
FIG. 32 is a block diagram illustrating a configuration of a cleaning system according to Embodiment 6 of the present disclosure.

FIG. 32 is a block diagram illustrating a configuration of a cleaning system according to Embodiment 6 of the present disclosure. The cleaning system illustrated in FIG. 32 includes the cleaning robot 106 and the remote control 206.

The cleaning robot 106 includes the first pressure sensor 121, the second pressure sensor 122, a communication unit 13, a movement control unit 14, a propeller driving unit 15, the pressure sensor group 131, and a pressing determining unit 164.

The pressure sensor group 131 is disposed at a position other than the contact surface between the cleaning tool 11 and the target to be cleaned and detects contact between the cleaning robot 106 and an object other than the target to be cleaned. Each of the pressure sensors that constitute the pressure sensor group 131 supplies sensing information indicating whether or not pressure has been detected to the pressing determining unit 164.

The pressing determining unit 164 determines whether or not a right portion of the cleaning tool 11 is in contact with the target to be cleaned on the basis of first sensing information acquired from the first pressure sensor 121. Furthermore, the pressing determining unit 164 determines whether or not a left portion of the cleaning tool 11 is in contact with the target to be cleaned on the basis of second sensing information acquired from the second pressure sensor 122. In a case where it is determined that the right portion of the cleaning tool 11 is in contact with the target to be cleaned and where it is determined that the left portion of the cleaning tool 11 is in contact with the target to be cleaned, the pressing determining unit 164 supplies, to the communication unit 13, a contact detection signal indicating that the cleaning tool 11 is in contact with the target to be cleaned.

Furthermore, the pressing determining unit 164 determines whether or not a portion other than the cleaning tool 11 is in contact on the basis of sensing information acquired from the pressure sensor group 131. In a case where it is determined that the portion other than the cleaning tool 11 is in contact, the pressing determining unit 164 supplies a warning notification signal for notifying the operator of a warning to the communication unit 13.

The pressing determining unit 164 may be realized, for example, by an integrated circuit into which the aforementioned operation of the pressing determining unit 164 is incorporated. Alternatively, a program corresponding to the aforementioned operation of the pressing determining unit 164 may be stored in a memory (not illustrated) of the cleaning robot 106, and the pressing determining unit 164 may function when a processor (not illustrated) of the cleaning robot 106 executes the program. In a case where contact between the cleaning robot 106 and an object other than the target to be cleaned has been detected by the pressure sensor group 131, the communication unit 13 transmits the warning notification signal for notifying the operator of a warning to the remote control 206.

The remote control 206 includes the input unit 21, the vibration unit 22, a communication unit 23, a vibration control unit 24, the speaker 28, and a sound control unit 29.

The communication unit 23 receives the contact detection signal and the warning notification signal transmitted by the cleaning robot 106.

In a case where the warning notification signal is received by the communication unit 23, the sound control unit 29 causes warning sound to be output from the speaker 28.

The sound control unit 29 may be realized, for example, by an integrated circuit into which the aforementioned operation of the sound control unit 29 is incorporated. Alternatively, a program corresponding to the aforementioned operation of the sound control unit 29 may be stored in a memory (not illustrated) of the remote control 206, and the sound control unit 29 may function when a processor (not illustrated) of the remote control 206 executes the program.

Next, operations of the cleaning robot 106 and the remote control 206 according to Embodiment 6 are described.

Figure 33:
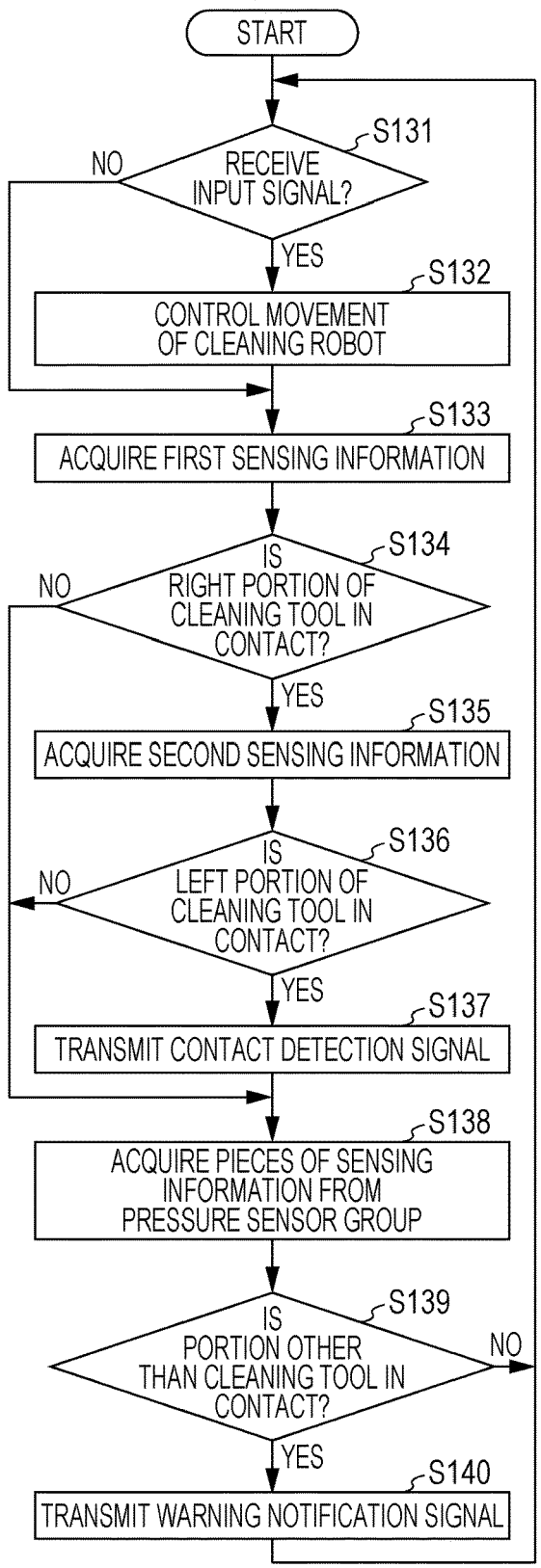
FIG. 33 is a flow chart for explaining an operation of the cleaning robot according to Embodiment 6 of the present disclosure.

FIG. 33 is a flow chart for explaining an operation of the cleaning robot according to Embodiment 6 of the present disclosure.

The processes in Step S131 and Step S132 in FIG. 33 are identical to those in Step S11 and Step S12 in FIG. 6, and therefore description thereof is omitted.

Next, in Step S133, the pressing determining unit 164 requests first sensing information from the first pressure sensor 121 and thus acquires the first sensing information from the first pressure sensor 121.

Next, in Step S134, the pressing determining unit 164 determines whether or not the right portion of the cleaning tool 11 is in contact with the target to be cleaned on the basis of the first sensing information acquired from the first pressure sensor 121. In a case where the first sensing information includes information indicating that pressure has been detected, the pressing determining unit 164 determines that the right portion of the cleaning tool 11 is in contact with the target to be cleaned. Meanwhile, in a case where the first sensing information includes information indicating that no pressure has been detected, the pressing determining unit 164 determines that the right portion of the cleaning tool 11 is not in contact with the target to be cleaned.

In a case where it is determined that the right portion of the cleaning tool 11 is not in contact with the target to be cleaned (NO in Step S134), the procedure proceeds to the process in Step S138.

Meanwhile, in a case where it is determined that the right portion of the cleaning tool 11 is in contact with the target to be cleaned (YES in Step S134), the pressing determining unit 164 requests second sensing information from the second pressure sensor 122 and thus acquires the second sensing information from the second pressure sensor 122 in Step S135.

Next, in Step S136, the pressing determining unit 164 determines whether or not the left portion of the cleaning tool 11 is in contact with the target to be cleaned on the basis of the second sensing information acquired from the second pressure sensor 122. In a case where the second sensing information includes information indicating that pressure has been detected, the pressing determining unit 164 determines that the left portion of the cleaning tool 11 is in contact with the target to be cleaned. Meanwhile, in a case where the second sensing information includes information indicating that no pressure has been detected, the pressing determining unit 164 determines that the left portion of the cleaning tool 11 is not in contact with the target to be cleaned.

In a case where it is determined that the left portion of the cleaning tool 11 is not in contact with the target to be cleaned (NO in Step S136), the procedure proceeds to the process in Step S138.

Meanwhile, in a case where it is determined that the left portion of the cleaning tool 11 is in contact with the target to be cleaned (YES in Step S136), the communication unit 13 transmits, to the remote control 206, a contact detection signal indicating that the cleaning tool 11 is in contact with the target to be cleaned in Step S137. As described above, in Embodiment 6, a contact detection signal is transmitted to the remote control 206 in a case where it is determined that both of the right portion and the left portion of the cleaning tool 11 are in contact with the target to be cleaned.

Next, in Step S138, the pressing determining unit 164 requests sensing information from each of the pressure sensors that constitute the pressure sensor group 131 and thus acquires the sensing information from each of the pressure sensors that constitute the pressure sensor group 131.

Next, in Step S139, the pressing determining unit 164 determines whether or not a portion other than the cleaning tool 11 is in contact on the basis of the plurality of pieces of sensing information acquired from the respective pressure sensors that constitute the pressure sensor group 131. In a case where the plurality of pieces of sensing information include sensing information including information indicating that pressure has been detected, the pressing determining unit 164 determines that a portion other than the cleaning tool 11 is in contact. Meanwhile, in a case where the plurality of pieces of sensing information include no sensing information including information indicating that pressure has been detected, the pressing determining unit 164 determines that a portion other than the cleaning tool 11 is not in contact with an object.

In a case where it is determined that a portion other than the cleaning tool 11 is not in contact (NO in Step S139), the procedure returns to the process in Step S131.

Meanwhile, in a case where it is determined that a portion other than the cleaning tool 11 is in contact (YES in Step S139), the communication unit 13 transmits, to the remote control 206, a warning notification signal indicating that the portion other than the cleaning tool 11 is in contact in Step S140.

Figure 34:
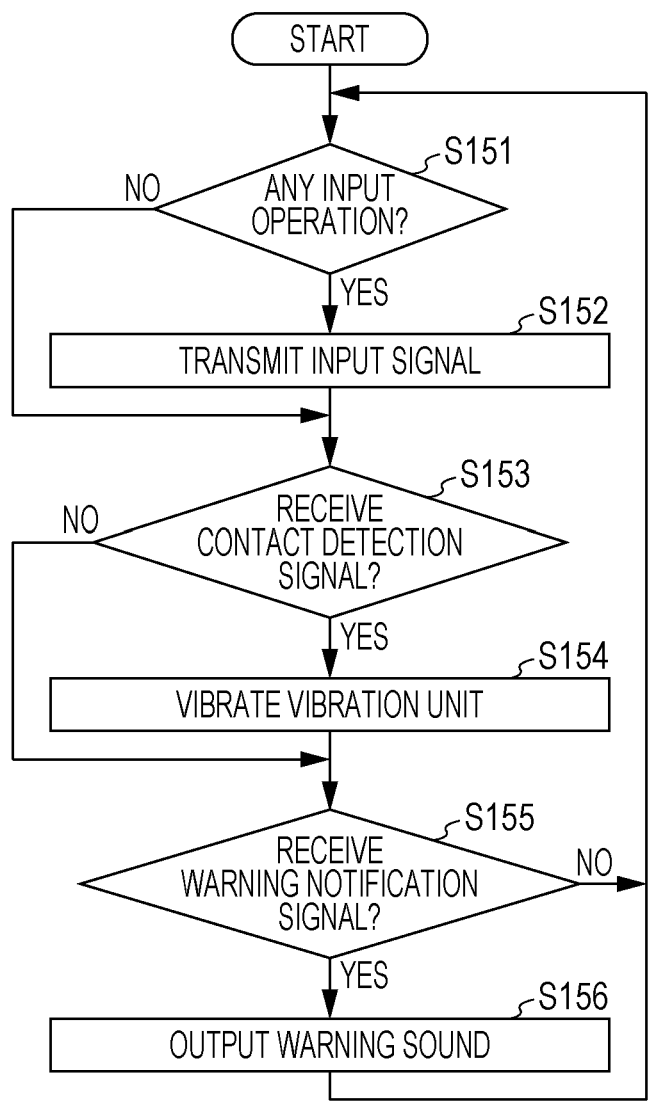
FIG. 34 is a flow chart for explaining an operation of the remote control according to Embodiment 6 of the present disclosure.

FIG. 34 is a flow chart for explaining an operation of the remote control according to Embodiment 6 of the present disclosure.

The processes in Step S151 and Step S152 in FIG. 34 are identical to those in Step S1 and Step S2 in FIG. 5, and therefore description thereof is omitted.

Next, in Step S153, the vibration control unit 24 determines whether or not the communication unit 23 has received the contact detection signal transmitted by the cleaning robot 106. In a case where it is determined that the communication unit 23 has not received the contact detection signal (NO in Step S153), the procedure proceeds to the process in Step S155.

Meanwhile, in a case where it is determined that the communication unit 23 has received the contact detection signal (YES in Step S153), the vibration control unit 24 vibrates the vibration unit 22 in Step S154.

Next, in Step S155, the vibration control unit 24 determines whether or not the communication unit 23 has received a warning notification signal transmitted by the cleaning robot 106. In a case where it is determined that the communication unit 23 has not received the warning notification signal (NO in Step S155), the procedure returns to the process in Step S151.

Meanwhile, in a case where it is determined that the communication unit 23 has received the warning notification signal (YES in Step S155), the sound control unit 29 causes warning sound to be output from the speaker 28 in Step S156.

As described above, in a case where a portion other than the cleaning tool 11 of the cleaning robot 106 is in contact with a some sort of object, warning sound is output. This allows an operator to safely operate the cleaning robot 106.

Embodiment 7

Next, an inspection robot according to Embodiment 7 is described. In Embodiments 1 through 6, a cleaning robot including a cleaning tool that cleans a target to be cleaned has been described. In Embodiment 7, an inspection robot including an inspection tool that inspects a target to be inspected is described.

Figure 35:
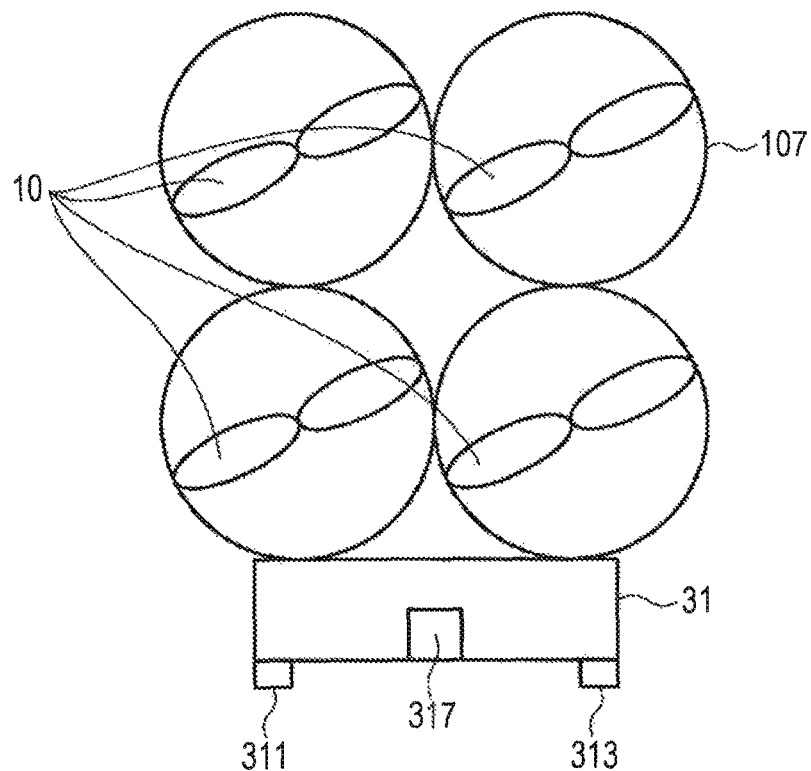
FIG. 35 is a top view illustrating an exterior configuration of an inspection robot according to Embodiment 7 of the present disclosure.
Figure 36:
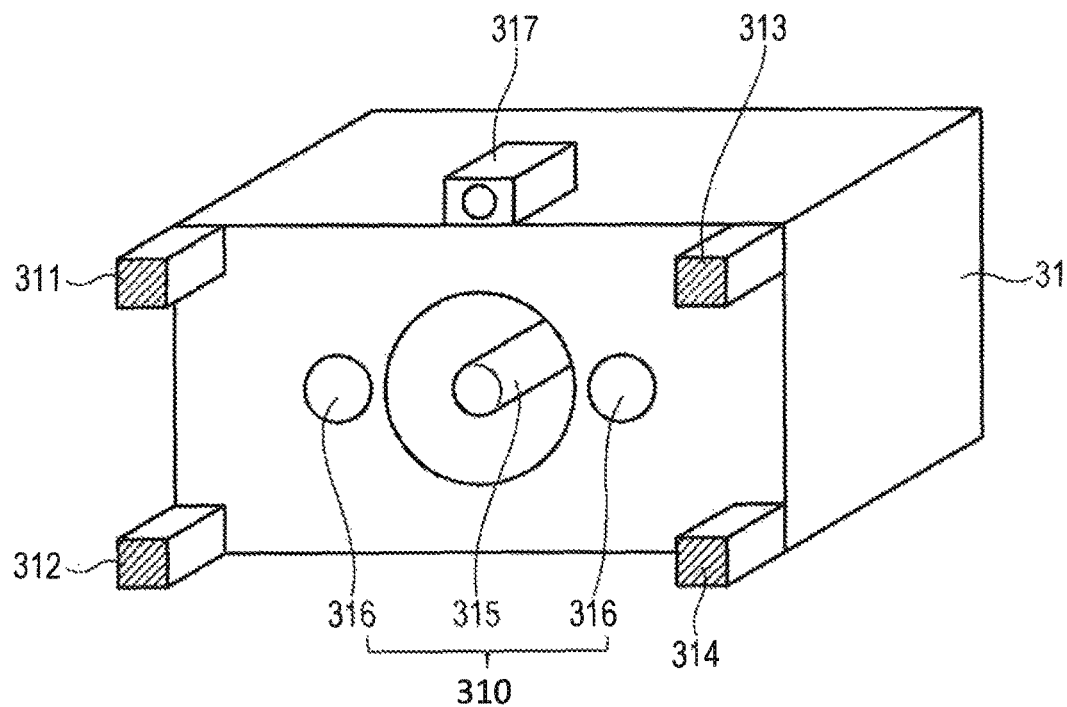
FIG. 36 is a perspective view illustrating an exterior configuration of an inspection tool according to Embodiment 7 of the present disclosure.

FIG. 35 is a top view illustrating an exterior configuration of an inspection robot according to Embodiment 7 of the present disclosure, and FIG. 36 is a perspective view illustrating an exterior configuration of an inspection tool according to Embodiment 7 of the present disclosure. In Embodiment 7, elements that are identical to those in Embodiments 1 through 6 are given identical reference signs, and description thereof is omitted.

An inspection robot (remote-operated working device) 107 illustrated in FIGS. 35 and 36 is remotely operated by a remote control and inspects a target to be inspected that is in a remote place. The target to be inspected is, for example, an exterior wall of a house, a building, a bridge, or the like or an inner wall of a tunnel. The inspection robot 107 inspects damage or degradation of a structure at a high place beyond the reach of a worker. The inspection robot 107 is an example of a remote-operated working device that is remotely operated by a remote control and performs a predetermined work on a work target in a remote place.

The inspection robot 107 is a drone. An inspection tool (working unit) 31 is provided on a front face of the inspection robot 107. The inspection tool 31 includes a hammering inspection device 310, a first pressure sensor 311, a second pressure sensor 312, a third pressure sensor 313, a fourth pressure sensor 314, and a camera 317. The inspection tool 31 is an example of a working unit that performs a predetermined work on a work target.

The first pressure sensor 311, the second pressure sensor 312, the third pressure sensor 313, and the fourth pressure sensor 314 are disposed on a surface of the inspection tool 31 that makes contact with the target to be inspected. The first pressure sensor 311 is disposed on an upper right side of the inspection tool 31, the second pressure sensor 312 is disposed on a lower right side of the inspection tool 31, the third pressure sensor 313 is disposed on an upper left side of the inspection tool 31, and the fourth pressure sensor 314 is disposed on a lower left side of the inspection tool 31.

The first pressure sensor 311, the second pressure sensor 312, the third pressure sensor 313, and the fourth pressure sensor 314 detect pressure applied to the inspection tool 31. The first pressure sensor 311 detects contact between an upper right portion of the inspection tool 31 and the target to be inspected. The second pressure sensor 312 detects contact between a lower right portion of the inspection tool 31 and the target to be inspected. The third pressure sensor 313 detects contact between an upper left portion of the inspection tool 31 and the target to be inspected. The fourth pressure sensor 314 detects contact between a lower left portion of the inspection tool 31 and the target to be inspected. Note that it is preferable that the first pressure sensor 311 be disposed at an upper right end of the inspection tool 31, the second pressure sensor 312 be disposed at a lower right end of the inspection tool 31, the third pressure sensor 313 is disposed at an upper left end of the inspection tool 31, and the fourth pressure sensor 314 be disposed at a lower left end of the inspection tool 31.

The hammering inspection device 310 includes a hammer 315 and a microphone 316.

The hammer 315 is disposed at a center of the surface of the inspection tool 31 that makes contact with the target to be inspected. A recess is formed at the center of the surface of the inspection tool 31 that makes contact with the target to be inspected, and the bar-like hammer 315 is disposed in the recess. The hammer 315 is movable forward and backward (in a horizontal direction) and hits the target to be inspected by protruding from the recess.

The microphone 316 is disposed in the vicinity of the hammer 315 and picks up hit sound obtained when the hammer 315 hits the target to be inspected. Note that the hammering inspection device 310 include two microphones 316, but the number of microphones 316 is not limited in particular.

The camera 317 is disposed at an upper portion of the surface of the inspection tool 31 that makes contact with the target to be inspected and takes an image of the target to be inspected.

In Embodiment 7, the inspection tool 31 includes four pressure sensors. However, the present disclosure is not limited to this. As in the other embodiments, the inspection tool 31 may include a single pressure sensor, may include two pressure sensors, or may include three pressure sensors, and the number of pressure sensors is not limited in particular.

FIG. 37 is a block diagram illustrating a configuration of an inspection system according to Embodiment 7 of the present disclosure. The inspection system illustrated in FIG. 37 includes the inspection robot 107 and the remote control 207.

The inspection robot 107 includes the first pressure sensor 311, the second pressure sensor 312, the third pressure sensor 313, the fourth pressure sensor 314, the microphones 316, the camera 317, a hammer driving unit 318, a communication unit 13, a movement control unit 14, a propeller driving unit 15, and a pressing determining unit 163.

The first pressure sensor 311 supplies, to the pressing determining unit 163, first sensing information indicating whether or not pressure has been detected. The second pressure sensor 312 supplies, to the pressing determining unit 163, second sensing information indicating whether or not pressure has been detected. The third pressure sensor 313 supplies, to the pressing determining unit 163, third sensing information indicating whether or not pressure has been detected. The fourth pressure sensor 314 supplies, to the pressing determining unit 163, fourth sensing information indicating whether or not pressure has been detected.

The pressing determining unit 163 determines whether or not the upper right portion of the inspection tool 31 is in contact with the target to be inspected on the basis of the first sensing information acquired from the first pressure sensor 311. In a case where it is determined that the upper right portion of the inspection tool 31 is in contact with the target to be inspected, the pressing determining unit 163 supplies, to the communication unit 13, a first contact detection signal indicating that the upper right portion of the inspection tool 31 is in contact with the target to be inspected.

Furthermore, the pressing determining unit 163 determines whether or not the lower right portion of the inspection tool 31 is in contact with the target to be inspected on the basis of the second sensing information acquired from the second pressure sensor 312. In a case where it is determined that the lower right portion of the inspection tool 31 is in contact with the target to be inspected, the pressing determining unit 163 supplies, to the communication unit 13, a second contact detection signal indicating that the lower right portion of the inspection tool 31 is in contact with the target to be inspected.

Furthermore, the pressing determining unit 163 determines whether or not the upper left portion of the inspection tool 31 is in contact with the target to be inspected on the basis of the third sensing information acquired from the third pressure sensor 313. In a case where it is determined that the upper left portion of the inspection tool 31 is in contact with the target to be inspected, the pressing determining unit 163 supplies, to the communication unit 13, a third contact detection signal indicating that the upper left portion of the inspection tool 31 is in contact with the target to be inspected.

Furthermore, the pressing determining unit 163 determines whether or not the lower left portion of the inspection tool 31 is in contact with the target to be inspected on the basis of the fourth sensing information acquired from the fourth pressure sensor 314. In a case where it is determined that the lower left portion of the inspection tool 31 is in contact with the target to be inspected, the pressing determining unit 163 supplies, to the communication unit 13, a fourth contact detection signal indicating that the lower left portion of the inspection tool 31 is in contact with the target to be inspected.

The pressing determining unit 163 may be realized, for example, by an integrated circuit into which the aforementioned operation of the pressing determining unit 163 is incorporated. Alternatively, a program corresponding to the aforementioned operation of the pressing determining unit 163 may be is stored in a memory (not illustrated) of the inspection robot 107, and the pressing determining unit 163 may function when a processor (not illustrated) of the inspection robot 107 executes the program. The communication unit 13 transmits, to the remote control 207, the first contact detection signal, the second contact detection signal, the third contact detection signal, and the fourth contact detection signal supplied by the pressing determining unit 163.

The communication unit 13 transmits, to the remote control 207, the first contact detection signal for vibrating an upper right side of the remote control 207 in a case where contact between the upper right portion of the inspection tool 31 and the target to be inspected has been detected by the first pressure sensor 311. The communication unit 13 transmits, to the remote control 207, the second contact detection signal for vibrating a lower right side of the remote control 207 in a case where contact between the lower right portion of the inspection tool 31 and the target to be inspected has been detected by the second pressure sensor 312. The communication unit 13 transmits, to the remote control 207, the third contact detection signal for vibrating an upper left side of the remote control 207 in a case where contact between the upper left portion of the inspection tool 31 and the target to be inspected has been detected by the third pressure sensor 313. The communication unit 13 transmits, to the remote control 207, the fourth contact detection signal for vibrating a lower left side of the remote control 207 in a case where contact between the lower left portion of the inspection tool 31 and the target to be inspected has been detected by the fourth pressure sensor 314.

The communication unit 13 receives an inspection start signal for starting hammering inspection. In a case where the inspection start signal has been received by the communication unit 13, the hammer driving unit 318 drives the hammer 315 to hit the target to be inspected. The microphones 316 pick up hit sound obtained when the hammer 315 hits the target to be inspected. The microphones 316 convert the analog hit sound thus picked up into digital hit sound data and then supplies the hit sound data to the communication unit 13. The camera 317 takes an image of the target to be inspected and then supplies image data thus obtained to the communication unit 13.

The communication unit 13 transmits, to the remote control 207, the hit sound data obtained by the microphones 316. Furthermore, the communication unit 13 transmits, to the remote control 207, the image data obtained by the camera 317.

Note that the communication unit 13 may transmit hit sound data and image data separately. Furthermore, the communication unit 13 may transmit hit sound data and image data of an image taken when the hit sound data is obtained in association with each other.

The remote control 207 includes an input unit 21, a first vibration unit 223, a second vibration unit 224, a third vibration unit 225, a fourth vibration unit 226, a communication unit 23, a vibration control unit 243, a hammering inspection start instruction unit 41, a data storage unit 42, a display control unit 43, a display unit 44, and a speaker 45.

The first vibration unit 223 vibrates the upper right side of the remote control 207. The second vibration unit 224 vibrates the lower right side of the remote control 207. The third vibration unit 225 vibrates the upper left side of the remote control 207. The fourth vibration unit 226 vibrates the lower left side of the remote control 207.

The communication unit 23 receives the first contact detection signal, the second contact detection signal, the third contact detection signal, and the fourth contact detection signal transmitted by the inspection robot 107.

The vibration control unit 243 vibrates the first vibration unit 223 in a case where the first contact detection signal is received by the communication unit 23, vibrates the second vibration unit 224 in a case where the second contact detection signal is received by the communication unit 23, vibrates the third vibration unit 225 in a case where the third contact detection signal is received by the communication unit 23, and vibrates the fourth vibration unit 226 in a case where the fourth contact detection signal is received by the communication unit 23.

The hammering inspection start instruction unit 41 accepts an operator's inspection start instruction for starting hammering inspection. Note that the hammering inspection start instruction unit 41 is, for example, constituted by a button and accepts the inspection start instruction when the button is pressed. In a case where the inspection start instruction has been accepted by the hammering inspection start instruction unit 41, the communication unit 23 transmits an inspection start signal for starting hammering inspection to the inspection robot 107.

The communication unit 23 receives the hit sound data transmitted by the inspection robot 107 and then causes the received hit sound data to be stored in the data storage unit 42. The data storage unit 42 stores the hit sound data therein.

Furthermore, the communication unit 23 supplies the received hit sound data to the speaker 45. The speaker 45 outputs the hit sound data received by the communication unit 23 to an outside. This allows a user to hear the hit sound output by the speaker 45 and check whether the hit sound is clear sound or dull sound.

Furthermore, the communication unit 23 receives the image data transmitted by the inspection robot 107. The display control unit 43 causes the image data received by the communication unit 23 to be displayed on the display unit 44. The display unit 44 displays the image of the target to be inspected.

Note that the communication unit 23 may cause the image data and the hit sound data transmitted by the inspection robot 107 to be stored in association with each other in the data storage unit 42.

In Embodiment 7, the communication unit 13 of the inspection robot 107 transmits hit sound data and image data to the remote control 207. However, the present disclosure is not limited to this. The communication unit 13 may transmit hit sound data and image data to a terminal device that is different from the remote control 207. In this case, the terminal device is, for example, a smartphone, a tablet-type computer, a notebook computer, or a personal computer.

In Embodiment 7, the hit sound data is output from the speaker 45. However, the present disclosure is not limited to this. It is also possible to employ an arrangement in which the hit sound data is just stored in the data storage unit 42 and is not output from the speaker 45.

The remote control 207 may include a calculation unit that calculates an amplitude or a frequency distribution of hit sound data, and the display control unit 43 may cause the calculated amplitude or frequency distribution of the hit sound data to be displayed on the display unit 44. In this case, the remote control 207 need not include the speaker 45. This allows a user to check whether or not the target to be inspected has an abnormality by visually checking the amplitude or frequency distribution of the hit sound data. Furthermore, the remote control 207 may include a determination unit that analyzes the amplitude or frequency distribution of the hit sound data and automatically determines whether or not the target to be inspected has an abnormality. The remote control 207 may notify the user of an abnormality of the target to be inspected only in a case where it is determined that the target to be inspected has an abnormality.

In Embodiment 7, the remote control 207 includes four vibration units. However, the present disclosure is not limited to this. As in the other embodiments, the remote control 207 may include a single vibration unit or may include two vibration units, and the number of vibration units is not limited in particular.

Next, operations of the inspection robot 107 and the remote control 207 according to Embodiment 7 are described.

Figure 38:
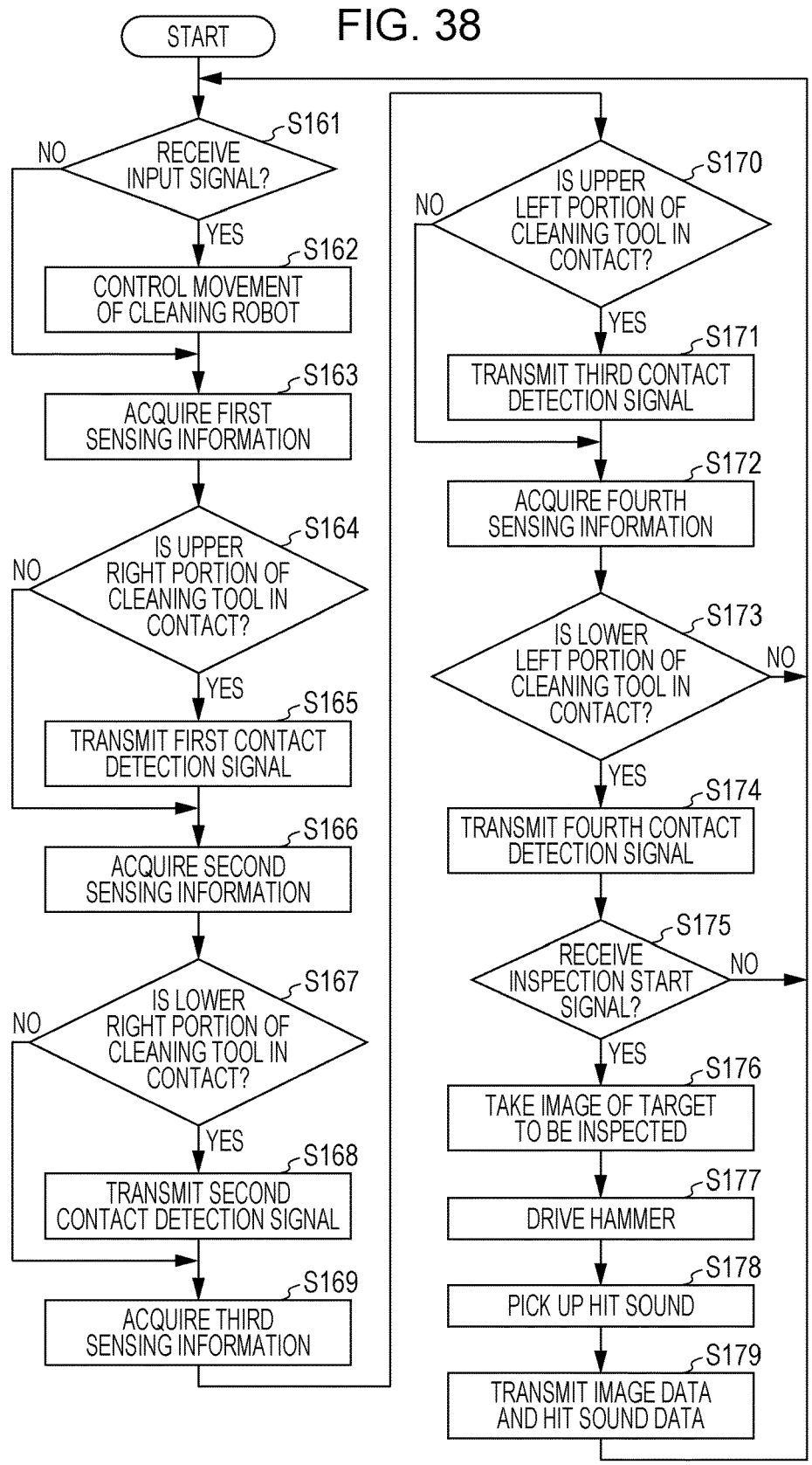
FIG. 38 is a flow chart for explaining an operation of the inspection robot according to Embodiment 7 of the present disclosure.

FIG. 38 is a flow chart for explaining an operation of the inspection robot according to Embodiment 7 of the present disclosure.

The processes in Step S161 through Step S174 in FIG. 38 are identical to those in Step S61 through Step S74 in FIG. 20, and therefore description thereof is omitted.

Next, in Step S175, it is determined whether or not the communication unit 13 has received an inspection start signal for starting hammering inspection. In a case where it is determined that the inspection start signal has not been received (NO in Step S175), the procedure returns to the process in Step S161.

Meanwhile, in a case where it is determined that the inspection start signal has been received (YES in Step S175), the camera 317 takes an image of the target to be inspected and then supplies image data of the image thus taken to the communication unit 13 in Step S176.

Next, in Step S177, the hammer driving unit 318 drives the hammer 315 to hit the target to be inspected.

Next, in Step S178, the microphones 316 pick up hit sound generated when the target to be inspected is hit by the hammer 315 and then supplies hit sound data of the hit sound thus picked up to the communication unit 13.

Next, in Step S179, the communication unit 13 transmits, to the remote control 207, inspection data including the image data acquired by the camera 317 and the hit sound data acquired by the microphone 316 and then returns to the process in Step S161.

Figure 39:
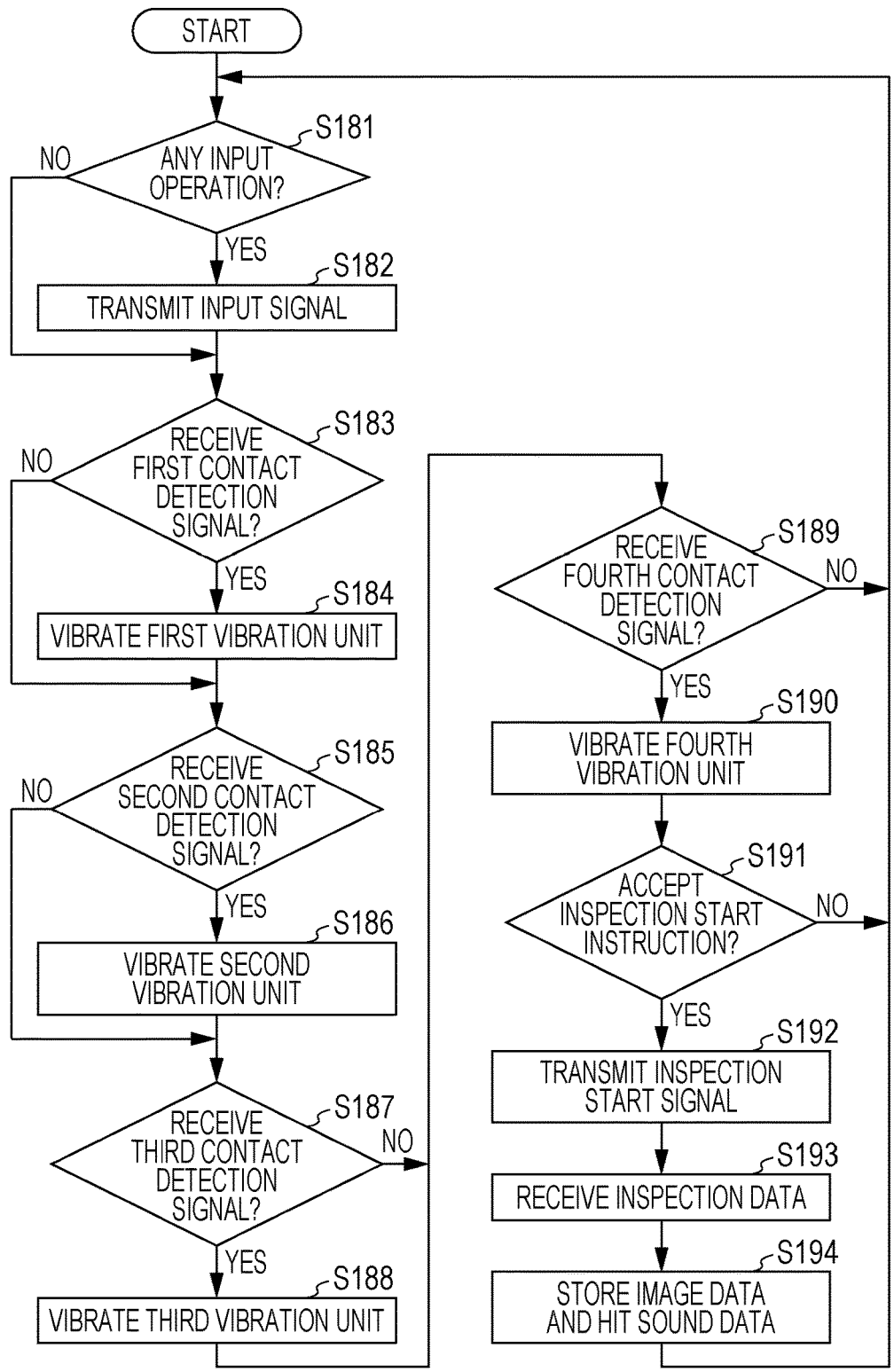
FIG. 39 is a flow chart for explaining an operation of a remote control according to Embodiment 7 of the present disclosure.

FIG. 39 is a flow chart for explaining an operation of the remote control according to Embodiment 7 of the present disclosure.

The processes in Step S181 through Step S190 in FIG. 39 are identical to those in Step S81 through Step S90 in FIG. 21, and therefore description thereof is omitted.

Next, in Step S191, the communication unit 23 determines whether or not the hammering inspection start instruction unit 41 has accepted an operator's inspection start instruction for starting hammering inspection. In a case where it is determined that the inspection start instruction has not been accepted (NO in Step S191), the procedure returns to the process in Step S181.

Meanwhile, in a case where it is determined that the inspection start instruction has been accepted (YES in Step S191), the communication unit 23 transmits, to the inspection robot 107, the inspection start signal for starting hammering inspection in Step S192.

Next, in Step S193, the communication unit 23 receives inspection data including the image data and the hit sound data from the inspection robot 107 in Step S193. Note that the procedure may return to the process in Step S181 in a case where inspection data is not received from the inspection robot 107 even after elapse of a predetermined period.

Next, in Step S194, the communication unit 23 causes the image data and the hit sound data included in the received inspection data to be stored in the data storage unit 42.

In Embodiment 7, the inspection tool 31 includes the camera 317 that takes an image of the target to be inspected and the hammering inspection device 310 that performs hammering inspection. However, the present disclosure is not limited to this. The inspection tool 31 may include only one of the camera 317 and the hammering inspection device 310. Furthermore, the inspection tool 31 may include an infrared camera that takes an infrared image. A peeled portion of a surface of a structure to be inspected can be detected through analysis of the infrared image. The inspection tool 31 may include at least one of a camera, an infrared camera, and a hammering inspection device.

Furthermore, the inspection tool 31 may include an X-ray camera that takes an X-ray image of the target to be inspected. Furthermore, the inspection tool 31 may include an ultrasonic wave inspection device that obtains an image indicative of a state of an inside of the target to be inspected by discharging an ultrasonic wave to the target to be inspected and receiving the ultrasonic wave reflected by the target to be inspected.

In a case where an abnormal portion is found by hammering inspection, it is necessary to repair the abnormal portion. It is therefore preferable that the inspection tool 31 marks the abnormal portion. In view of this, the remote control 207 may further include a marking instruction unit that accepts user's input of a marking instruction for marking an inspected position. The communication unit 23 transmits, to the inspection robot 107, a marking instruction signal for marking the inspected position. The communication unit 13 of the inspection robot 107 receives the marking instruction signal from the remote control 207. The inspection tool 31 may further include a marking unit that marks the target to be inspected in a case where the marking instruction signal is received by the communication unit 13.

The marking unit may attach, to the target to be inspected, an RF (Radio Frequency) tag in which at least one of image identification information for identifying an image of the target to be inspected, infrared image identification information for identifying an infrared image of the target to be inspected, and hit sound identification information for identifying hit sound obtained when the target to be inspected is hit is stored. The marking unit stores, in the RF tag, at least one of the image identification information, the infrared image identification information, and the hit sound identification information and attaches the RF tag to the target to be inspected. The RF tag is an example of a communication device and transmits stored information to a reader, for example, through near field communication.

The inspection tool 31 may include a repairing unit that repairs an abnormal portion found in the target to be inspected. For example, the repairing unit injects a resin into a crack found in the target to be inspected.

The inspection robot 107 may further include a position measurement unit that measures the position of the inspection robot 107. The position measurement unit is, for example, a GPS (Global Positioning System) or a gyrosensor and measures the position of the inspection robot 107. The position of the inspection robot 107 is expressed, for example, by latitude, longitude, altitude, and a tilt angle.

The remote control 207 may further include a position measurement instruction unit that accepts user's input of a position measurement instruction for measuring an inspected position. The communication unit 23 transmits, to the inspection robot 107, a position measurement instruction signal for measuring the inspected position. The communication unit 13 of the inspection robot 107 receives the position measurement instruction signal from the remote control 207 and transmits, to the remote control 207, device position information indicative of the position of the inspection robot 107 measured by the position measurement unit as inspected position information indicative of the inspected position. The communication unit 23 of the remote control 207 causes the received inspected position information to be stored in the data storage unit 42 in association with hit sound data and image data obtained immediately before the position measurement instruction from the user is accepted. This makes it possible to store the position of an abnormal portion found in the target to be inspected.

The data storage unit 42 of the remote control 207 stores therein the inspected position information in associated with hit sound data and image data. However, the present disclosure is not limited to this. The inspection robot 107 may further include a data storage unit in which at least one of image identification information for identifying an image of the target to be inspected, infrared image identification information for identifying an infrared image of the target to be inspected, and hit sound identification information for identifying hit sound obtained when the target to be inspected is hit and the inspected position information are stored in association with each other.

In the present disclosure, all of or some of the units, devices, members, or sections or all of or some of the functional blocks in the block diagrams illustrated in FIGS. 4, 10, 13, 19, 25, 32, and 37 may be realized by one or a plurality of electronic circuits including semiconductor devices, semiconductor integrated circuits (ICs), or LSIs (large scale integrations). The LSIs or ICs may be integrated as a single chip or may be realized by a plurality of chips. For example, functional blocks other than a storage element may be integrated as a single chip. The terms "LSI" and "IC" are used, but the term "system LSI", "VLSI (very large scale integration)", or "ULSI (ultra large scale integration)" may be used depending on the degree of integration. An FPGA (Field Programmable Gate Array) that can be programmed after production of an LSI or a reconfigurable logic device in which reconfiguration of connection or setup of circuit cells inside an LSI is possible can be also used for the same purpose.

Furthermore, functions or operations of all of or some of the units, devices, members, or sections can be realized by software processing. In this case, software is stored in one or a plurality of non-transitory storage media such as ROMs, optical discs, or hard disc drives, and when the software is executed by a processing device (processor), a function specified by the software is executed by the processing device (processor) and a peripheral device. The system or the device may include one or a plurality of non-transitory storage media in which software is stored, a processing device (processor), and a necessary hardware device such as an interface.

A remote-operated working device and a control method according to the present disclosure can notify an operator of contact between a working unit and a work target with certainty and are useful as a remote-operated working device that is remotely operated by a remote control and performs a predetermined work on a work target in a remote place and a method for controlling the remote-operated working device.

What is claimed is:

1. A remote-operated working device comprising:
a movement controller that includes a processor and that controls movement of the remote-operated working device remotely operated by a remote control;
a tool that performs a predetermined work on a work target in a remote place;
a first detector that detects contact between the tool and the work target; and
a communicator that transmits a signal for vibrating the remote control to the remote control in a case where contact between the tool and the work target is detected by the first detector,
wherein the first detector includes a first sensor that detects contact between a right portion of the tool and the work target and a second sensor that detects contact between a left portion of the tool and the work target, and
wherein the communicator transmits a first signal for vibrating a right side of the remote control to the remote control in a case where contact between the right portion of the tool and the work target is detected by the first sensor, and the communicator transmits a second signal for vibrating a left side of the remote control to the remote control in a case where contact between the left portion of the tool and the work target is detected by the second sensor.

2. The remote-operated working device according to claim 1, wherein
the first detector includes a pressure sensor that detects a pressure value of pressure applied to the tool; and
the communicator transmits the pressure value detected by the pressure sensor to the remote control in order to change an amount of vibration of the remote control in accordance with the pressure value.

3. The remote-operated working device according to claim 1, further comprising an imager that takes an image of surroundings of the remote-operated working device,
the communicator transmitting the image supplied from the imager to the remote control so that information indicating whether or not the tool and the work target is in contact with each other is displayed on the remote control so as to be superimposed on the image.

4. The remote-operated working device according to claim 3, wherein
the imager takes an image of a contact position where the tool and the work target are in contact with each other.

5. The remote-operated working device according to claim 3, wherein
the imager takes an image of the work target which is a destination of the tool.

6. The remote-operated working device according to claim 3, wherein
the imager switches an imaging mode between a first imaging mode for imaging of a traveling direction of the remote-operated working device and a second imaging mode for imaging of the work target which is a destination of the tool.

7. The remote-operated working device according to claim 3, wherein
the imager takes an image of a contact position between the tool and the work target in a case where contact between the tool and the work target is detected by the first detector, and the imager takes an image of the work target which is a destination of the tool in a case where contact between the tool and the work target is not detected by the first detector.

8. The remote-operated working device according to claim 1, wherein the remote-operated working device is a drone.

9. The remote-operated working device according to claim 1, further comprising a second detector that is disposed at a position other than a contact surface between the tool and the work target and detects contact between the remote-operated working device and an object other than the work target,
the communicator transmitting a signal for notifying an operator of a warning to the remote control in a case where contact between the remote-operated working device and the object other than the work target is detected by the second detector.

10. The remote-operated working device according to claim 1, wherein
the predetermined work is cleaning of a target to be cleaned that is in a remote place; and
the tool includes at least one of a brush, a mop, a suction device, and a water-discharge device.

11. The remote-operated working device according to claim 1, wherein
the predetermined work is inspection of a target to be inspected that is in a remote place; and
the tool includes at least one of a camera, an infrared camera, and a hammering inspection device.

12. The remote-operated working device according to claim 11, wherein
the communicator receives a marking instruction signal for marking an inspected position from the remote control; and
the tool further includes a marker that marks the target to be inspected in a case where the marking instruction signal is received by the communicator.

13. The remote-operated working device according to claim 12, wherein
the marker attaches, to the target to be inspected, a communication device in which at least one of image identification information for identifying an image of the target to be inspected, infrared image identification information for identifying an infrared image of the target to be inspected, and hit sound identification information for identifying hit sound obtained when the target to be inspected is hit is stored.

14. The remote-operated working device according to claim 11, further comprising a third sensor that includes at least one from among a Global Positioning System (GPS) sensor and a gyrosensor and that measures a position of the remote-operated working device,
the communicator receiving a position measurement instruction signal for measuring an inspected position from the remote control and transmitting, to the remote control, device position information indicative of the position of the remote-operated working device measured by the third sensor as inspected position information indicative of the inspected position.

15. The remote-operated working device according to claim 14, further comprising a storage in which at least one of image identification information for identifying an image of the target to be inspected, infrared image identification information for identifying an infrared image of the target to be inspected, and hit sound identification information for identifying hit sound obtained when the target to be inspected is hit and the inspected position information are stored in association with each other.

16. A remote-operated working device comprising:
a movement controller that includes a processor and that controls movement of the remote-operated working device remotely operated by a remote control;
a tool that performs a predetermined work on a work target in a remote place;
a first detector that detects contact between the worker and the work target; and
a communicator that transmits a signal for vibrating the remote control to the remote control in a case where contact between the tool and the work target is detected by the first detector,
wherein the first detector includes a first sensor that detects contact between an upper right portion of the tool and the work target, a second sensor that detects contact between a lower right portion of the tool and the work target, a third sensor that detects contact between an upper left portion of the tool and the work target, and a fourth sensor that detects contact between a lower left portion of the tool and the work target; and
wherein the communicator transmits a first signal for vibrating an upper right side of the remote control to the remote control in a case where contact between the upper right portion of the tool and the work target is detected by the first sensor, the communicator transmits a second signal for vibrating a lower right side of the remote control to the remote control in a case where contact between the lower right portion of the tool and the work target is detected by the second sensor, the communicator transmits a third signal for vibrating an upper left side of the remote control to the remote control in a case where contact between the upper left portion of the tool and the work target is detected by the third sensor, and the communicator transmits a fourth signal for vibrating a lower left side of the remote control to the remote control in a case where contact between the lower left portion of the tool and the work target is detected by the fourth sensor.

17. A remote-operated working device comprising:
a movement controller that includes a processor and that controls movement of the remote-operated working device remotely operated by a remote control;
a tool that performs a predetermined work on a work target in a remote place;
a first detector that detects contact between the tool and the work target; and
a communicator that transmits a signal for vibrating the remote control to the remote control in a case where contact between the tool and the work target is detected by the first detector,
wherein the first detector includes a first sensor that detects contact between a first contact position on a contact surface of the tool with the work target and the work target and a second sensor that detects contact between a second contact position on the contact surface that is different from the first contact position and the work target; and
wherein the communicator transmits a signal for vibrating the remote control to the remote control in a case where contact between the first contact position and the work target is detected by the first sensor and where contact between the second contact position and the work target is detected by the second sensor.

18. A control method for controlling a remote-operated working device comprising:
controlling, using a processor, movement of the remote-operated working device remotely operated by a remote control;
detecting, using a first sensor and a second sensor, contact between a tool that performs a predetermined work on a work target and the work target is in a remote place; and
transmitting a signal for vibrating the remote control to the remote control in a case where contact between the tool and the work target is detected,
wherein the detecting further includes firstly detecting, using the first sensor, contact between a right portion of the tool and the work target and secondly detecting, using the second sensor, contact between a left portion of the tool and the work target, and
wherein the transmitting further includes transmitting a first signal for vibrating a right side of the remote control to the remote control in a case where contact between the right portion of the tool and the work target is detected by the first sensor, and transmitting a second signal for vibrating a left side of the remote control to the remote control in a case where contact between the left portion of the tool and the work target is detected by the second sensor.

* * * * *